(12) United States Patent
Fatehi et al.

(10) Patent No.: US 10,520,103 B1
(45) Date of Patent: Dec. 31, 2019

(54) INTELLIGENT RETROFIT SEISMIC WAVE DETECTOR AND VALVE SHUTOFF DEVICE

(71) Applicants: Mohammad Taghi Fatehi, Irvine, CA (US); Parham Reza Fatehi, Irvine, CA (US); Keyvan Fatehi, Irvine, CA (US)

(72) Inventors: Mohammad Taghi Fatehi, Irvine, CA (US); Parham Reza Fatehi, Irvine, CA (US); Keyvan Fatehi, Irvine, CA (US)

( * ) Notice: Subject to any disclaimer, the term of this patent is extended or adjusted under 35 U.S.C. 154(b) by 0 days.

(21) Appl. No.: 16/420,157

(22) Filed: May 22, 2019

Related U.S. Application Data

(60) Provisional application No. 62/788,723, filed on Jan. 4, 2019.

(51) Int. Cl.
*F16K 17/36* (2006.01)
*G01V 1/30* (2006.01)
*G01V 1/00* (2006.01)

(52) U.S. Cl.
CPC .............. *F16K 17/36* (2013.01); *G01V 1/008* (2013.01); *G01V 1/30* (2013.01)

(58) Field of Classification Search
CPC ........... F16K 17/36; G01V 1/008; G01V 1/30
See application file for complete search history.

(56) References Cited

U.S. PATENT DOCUMENTS

| | | | |
|---|---|---|---|
| 4,841,287 A * | 6/1989 | Flig | F16K 17/36 137/39 |
| 5,209,454 A | 5/1993 | Engdahl et al. | |
| 5,307,699 A | 5/1994 | Engdahl et al. | |
| 5,489,889 A * | 2/1996 | Kambouris | A62C 2/04 340/540 |
| 5,787,917 A | 8/1998 | Park et al. | |
| 6,170,509 B1 * | 1/2001 | Karta | F16K 31/06 137/78.4 |
| 6,311,714 B1 * | 11/2001 | Watanabe | F16K 17/36 137/38 |
| 6,374,850 B1 * | 4/2002 | Timm | A62C 2/04 137/39 |

(Continued)

OTHER PUBLICATIONS

U.S. Appl. No. 16/420,156, filed May 22, 2019, Mohammad T Fatehi, et al.

(Continued)

*Primary Examiner* — Eric Keasel
(74) *Attorney, Agent, or Firm* — Makoui Law, PC; Ali Makoui

(57) ABSTRACT

A retrofit valve shutoff device comprises a coupling key for coupling with an actuator of a shutoff valve, an accelerometer for making acceleration measurements in three directions, a motor, and a processing unit. The processing unit determines the arrival of seismic P-waves when the ratio of vibrations' power in the vertical direction with respect to a sum of the vibrations' power in the three directions exceeds a first threshold. The processing unit then determines the arrival of seismic S-waves when the sum of the vibrations' power in the three directions exceeds a second threshold. The processing unit then determines the arrival of seismic surface waves when the sum of the vibrations' power in the three directions exceeds a third threshold. The processing unit then sends a signal to the motor to rotate the coupling key and the actuator of the shutoff valve to close the shutoff valve.

26 Claims, 44 Drawing Sheets

(56) References Cited

U.S. PATENT DOCUMENTS

| | | | |
|---|---|---|---|
| 6,661,346 B1* | 12/2003 | Wood | G01V 1/008 340/601 |
| 6,789,560 B1 | 9/2004 | Stoner et al. | |
| 6,909,375 B2* | 6/2005 | Diaz-Lopez | G01V 1/008 340/521 |
| 6,968,852 B1 | 11/2005 | Sibley | |
| 7,346,432 B2* | 3/2008 | Matsumiya | G01V 1/008 52/167.1 |
| 7,375,646 B1* | 5/2008 | Diaz-Lopez | G01V 1/008 340/521 |
| 7,598,884 B2* | 10/2009 | Lachenit | G08B 21/10 340/286.02 |
| 7,918,239 B1 | 4/2011 | Ikegaya et al. | |
| 9,645,584 B2* | 5/2017 | Kucera | F23N 1/002 |
| 2014/0264111 A1* | 9/2014 | Porter | F16K 17/36 251/129.03 |

OTHER PUBLICATIONS

Wu, Yih-Min, et al., "Magnitude Estimation using the First three Seconds P-Wave Amplitude in Earthquake Early Warning", Geographical Research Letters, vol. 33, L16312, Aug. 2006, pp. 1-4.

Giovanna Monari "Understanding Resolution in Optical and Magnetic Encoders", Electronic Design, Jun. 2013, pp. 1-5.

Prasad L V, Narashimha, et al., "Analysis of Magnitude for Earthquake Detection using Primary Waves and Secondary Waves," IEEE 2013 International Conference on Human Computer Interactions (ICHCI), Aug. 2013, pp. 1-6.

Sherki, Yogesh, et al., "Design of Real time Sensor System for Detection and Processing of Seismic Waves for Earthquake Early Warning System", 2015 International Conference on Power and Advanced Control Engineering (ICPACE) Aug. 2015, pp. 285-289.

Kaur, Komalpreet, et al., "Detection and Identification of Seismic P-Waves using Artificial Neural Networks", Proceedings of International Joint Conference on Neural Networks, Aug. 2013, pp. 2949-2954.

Singh, Rajat Deep, et al., "Seismic Early Warning Alert System", 2014 International Conference on Signal Processing and Integrated Networks (SPIN), Feb. 2014, pp. 601-605.

Ross, Z. E., et al., "Automatic Picking of Direct P, S Seismic Phases and Fault Zone Head Waves," Geophysical Journal International (2014) 199, Oct. 2014, pp. 368-381.

Wang, James D B, "IMU General Introduction," slideshare.net, Apr. 4, 2017, pp. 6-7 and 10-11.

Wang, James D B, "IMU General Introduction," slideshare.net, Apr. 4, 2017, pp. 12-13 and 50-52.

Wang, James D B, "IMU Fusion Algorithm for Pose Estimation (mCube Invited Talk) 2018," slideshare.net, Nov. 2018, pp. 1 and 4-7.

Author Unknown, "BNO080 Data Sheet", Hillcrest Labs, Oct. 2017, pp. 1-57.

Saddam, "Earthquake Detector Alarm using Arduino," Jun. 2017, Circuit Design, pp. 1-18.

* cited by examiner

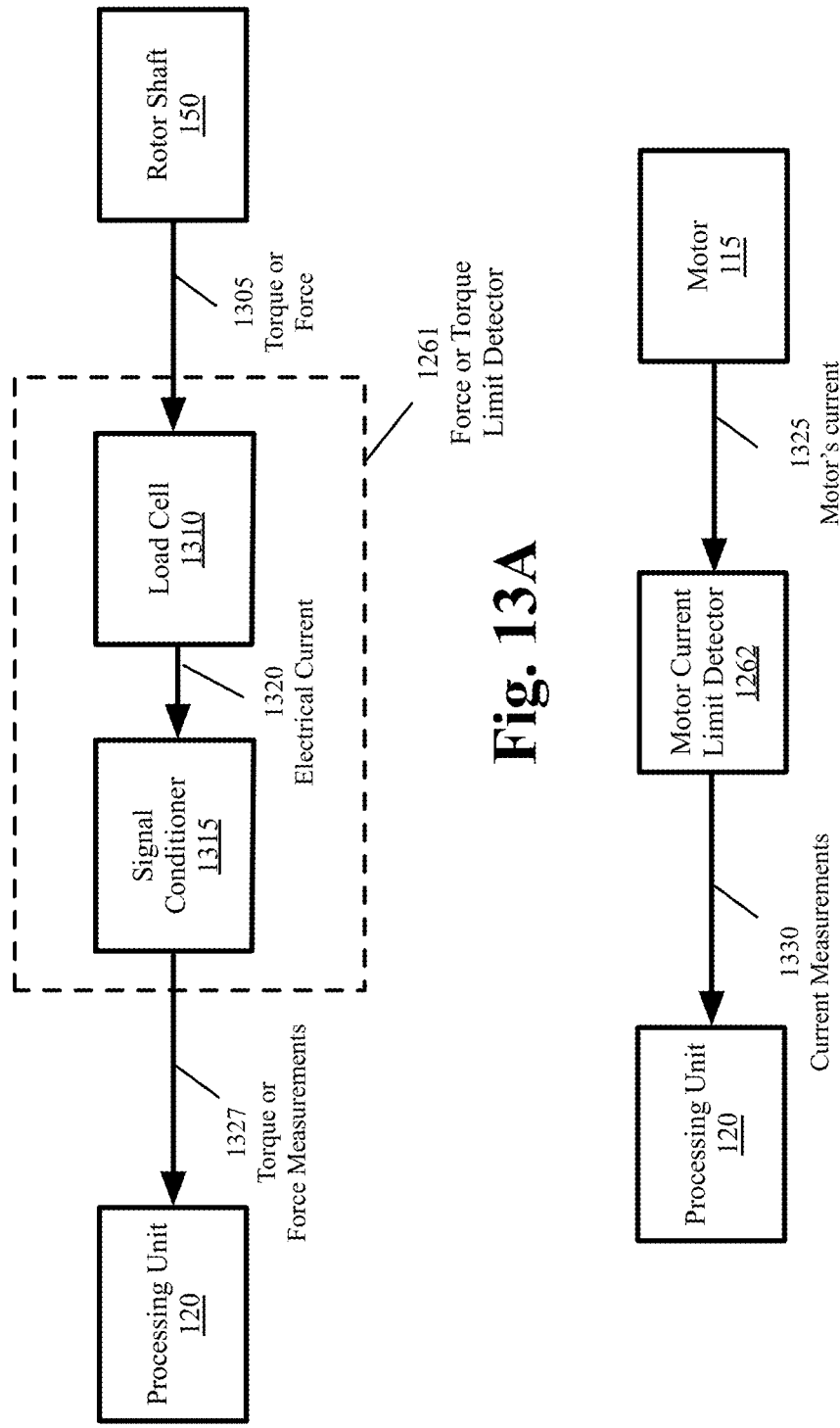

INTELLIGENT RETROFIT SEISMIC WAVE DETECTOR AND VALVE SHUTOFF DEVICE

CLAIM OF BENEFIT TO PRIOR APPLICATIONS

This application claims the benefit of U.S. Provisional Patent Application Ser. No. 62/788,723, filed on Jan. 4, 2019. The contents of U.S. Provisional Patent Application No. 62/788,723 are hereby incorporated by reference.

BACKGROUND

Automatic shut off valves have been used to shut off the gas supply to a structure during an earthquake. The shutoff of the flow of gas from pipes that may be ruptured during an earthquake prevents a fire or explosion due to a gas leak caused by the earthquake.

The automatic shut off valves are typically installed in a gas flow line. The existing automatic shut off valves use mechanical mechanisms to sense the shock and vibrations of an earthquake. Some of the automatic shut off valves use a metal ball which is displaced by the force of an earthquake from its normal rest position to cause the valve to close.

Other automatic shut off valves use a pivoted flapper arm that is held in open position (i.e., out of the line of the gas flow) by a holding magnet embedded in it. When the magnetic attractive force is reduced (e.g., an electromagnet may be activated after an earthquake, which opposes the field of the holding magnet), the pivoted flapper arm swings down by gravity into the closed position and a flapper seal element seals the valve seat. The flapper arm may also be released by a ball that normally rests in a cavity above the flapper's magnet to keep the flapper up and the valve open. The ball moves away from its resting position by the force of an earthquake causing the flapper to be released to close the valve.

BRIEF DESCRIPTION OF THE DRAWINGS

The various embodiments of the present intelligent retrofit seismic wave detector and valve shutoff device now will be discussed in detail with an emphasis on highlighting the advantageous features. These embodiments depict the novel and non-obvious intelligent retrofit seismic wave detector and valve shutoff device shown in the accompanying drawings, which are for illustrative purposes only. These drawings include the following figures, in which like numerals indicate like parts:

FIG. 13A is a functional diagram showing a force or torque limit detector, according to various aspects of the present disclosure;

FIG. 13B is a functional diagram showing motor current limit detector, according to various aspects of the present disclosure;

DETAILED DESCRIPTION

Figure 1A:
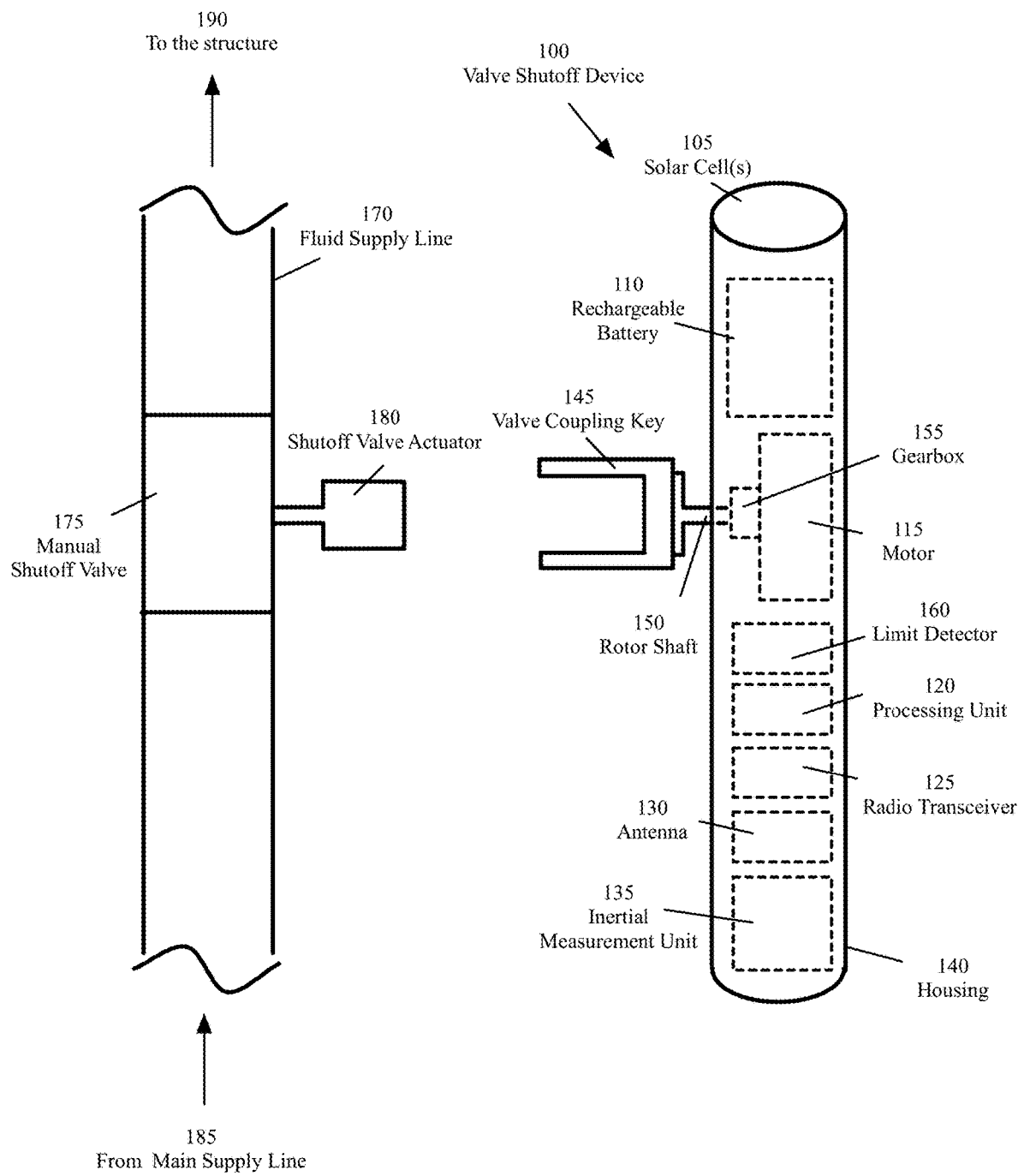
FIG. 1A is a schematic front view of an automatic valve shutoff device prior to installation on a fluid supply line's shutoff valve, according to various aspects of the present disclosure.

One aspect of the present embodiments includes the realization that the existing automatic shutoff valves use a mechanical component such as a ball or mass to detect movements related to seismic activities. Such systems require to be installed in a flat area and the ball may move due to vibration resulted from activities such as passing a vehicle or any other man-made vibrations that are unrelated to seismic activities.

The existing shutoff valves are typically installed inline to the fluid supply line and may require the expertise of an expert installer to cut the fluid pipe open and install the automatic valve shutoff device inline the fluid pipe. The use of a mechanical component to detect seismic activity may only approximately determine the intensity of the seismic waves. The exiting automatic valve shutoff devices do not include transceivers, cannot be remotely controlled, and do not provide health status and data to external devices.

The present embodiments, as described in detail below, solve the above-mentioned problems by providing an automatic valve shutoff device that may be installed as a retrofit device to engage and automatically rotate the manual shutoff valve of a fluid supply line without a need for cutting the fluid supply line open and installing the automatic shutoff valve inside the fluid supply line. The valve shutoff device may include one or more inertial measurement units or sensors to measure parameters related to seismic waves such as the primary, secondary, and surface waves caused by an earthquake. The valve shutoff device may include a processing unit to receive the measured seismic wave's parameters and use an algorithm to identify and determine the intensity of the seismic activities. The valve shutoff device may, therefore, determine the precise intensity of the seismic activities using the measured parameters of the seismic waves instead of using mechanical means to determine ground movements.

The processing unit may use an algorithm that distinguishes the seismic waves from man-made vibrations. The processing unit may band filter the parameters measured by the inertial measurement unit to limit these parameters to one or more frequency bands associated with seismic waves. The processing unit, by eliminating the parameters associated with frequencies outside the seismic waves' frequency bands, eliminates the possibility of false positives caused by vibrations unrelated to the seismic activities triggering the closure of the shutoff valve.

The valve shutoff device may include a motor that may rotate a rotor shaft and a coupling key that is connected to the manual shutoff valve. The processing unit may send one or more signals to start of stop the motor to rotate the rotor shaft, the coupling key, and the manual shutoff valve in order to open or close the shutoff valve.

The processing unit may collect health status and data from different components of the valve shutoff device. The valve shutoff device may include a transceiver and an antenna. The processing unit may send the health and status data to one or more external devices such as one or more authorized client devices or one or more authorized cloud or backend servers. The processing unit may turn on or off the shutoff valve in response to signals received from the authorized external devices. The valve shutoff device may, therefore, operate as an Internet of Things (IoT) device.

The remaining detailed description describes the present embodiments with reference to the drawings. In the drawings, reference numbers label elements of the present embodiments. These reference numbers are reproduced below in connection with the discussion of the corresponding drawing features.

Figure 1B:
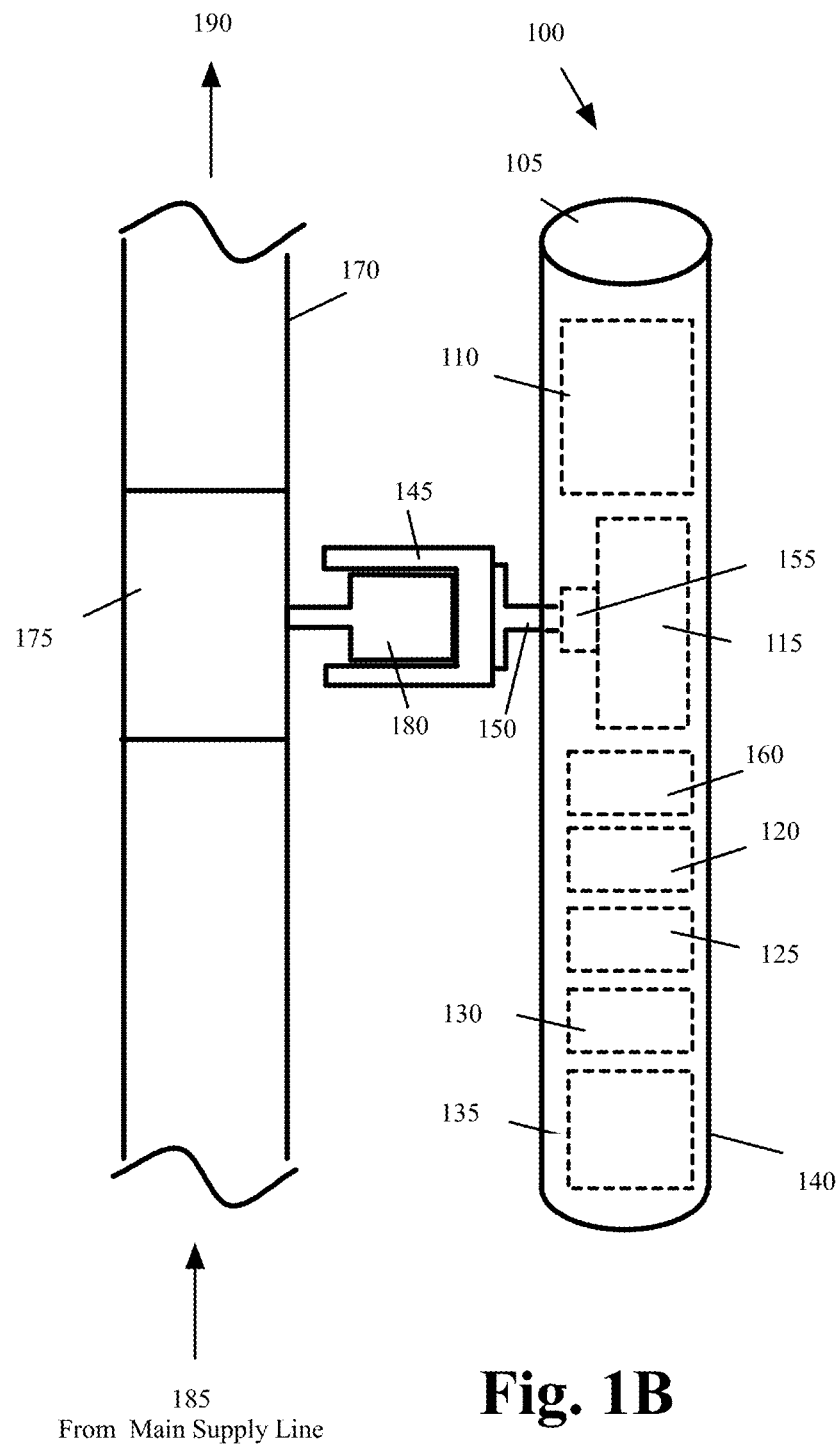
FIG. 1B is a schematic front view of the automatic valve shutoff device of FIG. 1A after installation on the fluid supply line's shutoff valve, according to various aspects of the present disclosure.

Some of the present embodiments provide an automatic valve shutoff device that is externally installed as a retrofit over an existing manual fluid supply line shutoff valve. FIG. 1A is a schematic front view of an automatic valve shutoff device prior to installation on a fluid supply line's shutoff valve, according to various aspects of the present disclosure. FIG. 1B is a schematic front view of the automatic valve shutoff device of FIG. 1A after installation on the fluid supply line's shutoff valve, according to various aspects of the present disclosure.

With reference to FIGS. 1A and 1B, the valve shutoff device 100 may include one or more solar cells 105, a rechargeable battery 110, a motor 115, a processing unit 120, a radio transceiver 125, an antenna 130, an inertial measurement unit (IMU) 135, a housing 140, a valve coupling key 145, a rotor shaft 150, a gearbox 155, and a limit detector 160. Although the motor 115, the gearbox 155, and the rotor shaft 150 are shown as separate components, in some of the present embodiments, the rotor shaft 150 and the gearbox 155 may be an integral part of the motor 115. The gearbox 155 may include one or more gears for transferring the rotational movement of the rotor shaft 150 to the valve coupling key 145.

The valve shutoff device 100 may be used as a retrofit device to automatically turn off an existing manual shutoff valve 175 of a fluid supply line 170. Examples of the fluid supply line 170 may include, without limitations, gas supply lines, liquid water supply lines, water vapor supply lines, fuel or other petroleum-derived supply lines, etc. The fluid supply line 170 may receive fluid from a main supply line (as shown by 185) and may supply the fluid (as shown by 190) to a structure such as a residential or commercial building.

The fluid supply line 170 may include a manual shutoff valve 175. The manual shutoff valve 175 may be, for example and without limitations, a ball valve or a gate valve. The manual shutoff valve 175 may include a shutoff valve actuator 180 (for example and without limitations, a lever, a handle, a handwheel, etc.) that is intended for a human to manually turn off or turn on the fluid supply through the fluid supply line. As described herein, the automatic valve shutoff device 100 of some of the present embodiments engages with the shutoff valve actuator 180 of the manual shutoff valve 175 and automatically rotates the shutoff valve actuator 180 when seismic activities exceed a threshold or when the automatic valve shutoff device 100 receives a signal from an external electronic device such as a client device or a server to turn the shutoff valve 175 on or off.

Figure 2:
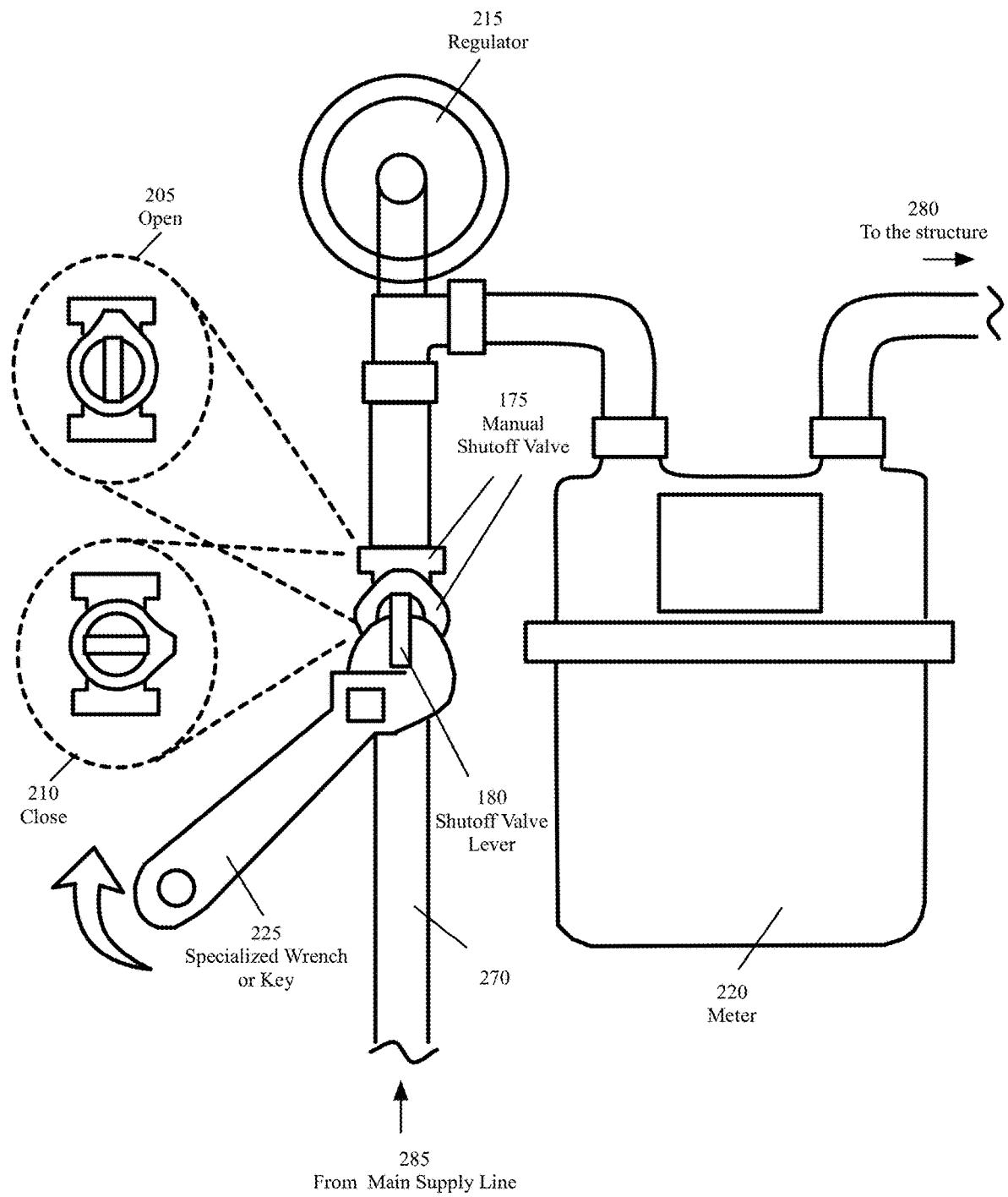
FIG. 2 is a functional diagram showing the manual closing of a gas shutoff valve, according to prior art.

FIG. 2 is a functional diagram showing the manual closing of a gas shutoff valve, according to prior art. With reference to FIG. 2, the fluid, in this example gas, is delivered through the pipe 270 from a main supply line to a structure (as shown by the arrows 285 and 280, respectively). The gas delivery system may include a meter 220 to determine the amount of gas delivered and a regulator 215 to deliver a steady flow of gas downstream from the main supply line to the structure.

With further reference to FIG. 2, the manual shutoff valve 175 includes a shutoff valve actuator 180 (in this example a lever). A specialized wrench or key 225 may be used to turn the actuator 180 by a human to close (as shown by 210) or open (as shown by 205) the manual shutoff valve 175. Some shutoff valve actuators may only turn by one quarter turn (i.e., by 90 degrees) in one direction to close the valve and by one quarter turn in the opposite direction to open the valve. Other shutoff valves may freely rotate. In either case, typically when the shutoff valve actuator 180 is parallel to the pipe 270 (as shown by 205) the gas flows through the pipe 270 and when the shutoff valve actuator 180 is perpendicular to the pipe 270 (as shown by 210) the gas stops flowing through the pipe 270. A water shutoff valve may operate similar to the gas shutoff valve of FIG. 2 or may include a gate valve with a handwheel (as described below with reference to FIG. 8) or a ball valve with a handle (as described below with reference to FIG. 10).

As described herein, in some of the present embodiments, the valve shutoff device (e.g., the valve shutoff device 100 of FIGS. 1A-1B) is installed as a retrofit device on the manual shutoff valve 175 to automatically shut off the fluid supply based on different criteria such as, for example and without limitations, detection of seismic waves, receiving a signal (or command) from a client device (e.g., a client device of a person associated with the structure that receive fluid from the fluid supply line 170), receiving a signal (or command) from a sever (e.g., a server associated with a government or business entity that provide the fluid to the fluid supply line 170 or a server associated with emergency responders such as firefighters, civil defense, etc.).

In the example of FIGS. 1A and 1B, the manual shutoff valve 175 includes a shutoff valve actuator 180 that may be turned to close the supply of the fluid in the fluid supply line 170. Example of a shutoff valve actuator 180 may include, without limitations, a lever, handle, a handwheel, etc. In some of the present embodiments, the shutoff valve actuator 180 may rotate by a limited angle (e.g., by 90 degrees from on to off or open to close and vice versa). In these embodiments, a mechanical stop may prevent the actuator 180 from turning any further. In some embodiments, the shutoff valve actuator 180 may be free rotating without a mechanical stop. For example, after each turn by 90 degrees, the actuator may turn the manual shutoff valve 175 from a position that fully closes the fluid supply to a position that fully opens the fluid supply in the fluid supply line 170.

With reference to FIG. 1B, the valve shutoff device 100 may be installed over the fluid supply line 170 such that the valve coupling key 145 is engaged with the shutoff valve actuator 180. As shown, the valve shutoff device 100 is externally installed as a retrofit without a need to cutoff the fluid supply line 170. The valve shutoff device 100 may be installed without the need to turn off the fluid supply and/or without the need to cut the fluid supply line 170.

In the example of FIGS. 1A-1B, the shutoff valve actuator 180 is a lever. In other embodiments, the shutoff valve actuator 180 may not be a lever. For example, a gate valve may have a handwheel to open and close the valve, or a ball valve may have a handle to open and close the valve. In these embodiments, the valve shutoff device 100 may have different types of valve coupling keys to match the shutoff mechanism of the manual shutoff valve. In some of the present embodiments, the valve coupling key may be replaceable to allow different types of valve coupling keys to be connected to the rotor shaft 150 in order to turn different shutoff valves actuators. Further examples of different types of valve coupling keys are described below with reference to FIGS. 7A-7C, 9A-9C, and 11A-11C.

With further reference to FIGS. 1A-1B, the rechargeable battery 110 may provide power to the motor 115, the limit detector 160, the processing unit 120, the radio transceiver 125, and/or the IMU 135. The solar cell(s) 105 may use solar or ambient light to recharge the rechargeable battery 110. In some of the present embodiments, in addition to, or in lieu of, the solar cell(s) 105, the rechargeable battery 110 may be rechargeable through a wired connection to an electric power outlet such as, without any limitations, a household electric power outlet. In these embodiments, the housing 140 may include a socket (not shown) for attaching a power plug to the valve shutoff device 100 to recharge the battery 110.

The rechargeable battery 110, in some embodiments, may be replaceable. As described below with reference to FIGS. 36-39, some embodiments may determine the health status of different components of the valve shutoff device 100, including the rechargeable battery 110, and may send one or more signals to one or more external devices.

The valve shutoff device 100 in some of the present embodiments is compatible with IoT and performs as an IoT device. The valve shutoff device 100 may receive signals and commands from external electronic devices to turn the fluid supply line's shutoff valve 175 on or off and/or to provide health status and data. The valve shutoff device 100 may provide health status and/or data on a pull basis (e.g., after receiving a request from an authorized external device) and/or on a push basis (e.g., on a periodic basis and/or after an event such as major seismic activity, a health check failure, a low battery level, etc., is detected). As described below with reference to FIG. 40, the valve shutoff device 100 may include a set of status lights and/or a display to provide the health status of different components of the valve shutoff device 100.

The motor 115 may be used to rotate the rotor shaft 150 through the gearbox 155. The motor may include, without any limitations, a continuous rotation motor or a motor with position control. Examples of a continuous rotation motor include, without limitations, a motor that, when starts rotating, requires an external signal/command to stop, a servomotor with its internal servomechanism bypassed, etc. Examples of a motor with position control include, without limitations, a servomotor with internal servomechanism, a stepper (or step) motor, etc. The motors with position control may receive one or more signals/commands to turn a rotor shaft by a specific number of turns or angular degrees and include internal circuitry to stop after the rotor shaft is turned by the specified number of turns or angular degrees.

With continued reference to FIGS. 1A-1B, the processing unit 120 may determine whether or not to rotate the rotor shaft 150 to turn the shutoff valve 175 on or off. Examples of the processing unit 120 may include, without any limitations, a microprocessor, a controller, a microcontroller, a processor (also referred to as a central processing unit or CPU), etc.

The IMU 135 may include one or more sensors. The IMU 135 may include an accelerometer (e.g., a three-dimensional (3D) accelerometer), a magnetometer (e.g., a 3D magnetometer), and/or a gyroscope (e.g., a 3D gyroscope) and may measure one or more parameters of mechanical (vibration) waves that may allow the computation of the seismic waves such as, without limitations, primary waves (P-waves), secondary waves (S-waves), and surface waves. The seismic waves may be caused, for example and without limitations, by an earthquake, an explosion, a ground movement (e.g., a landslide or an avalanche), etc.

The IMU 135, in some of the present embodiments, may include one or more micro electro-mechanical system (MEMS) sensors and may be a single chip. In other embodiments, the accelerometer and the magnetometer may be in different chips (e.g., different MEMS chips) instead of a single chip.

The IMU 135 may send the measured parameters to the processing unit 120. The processing unit 120 may use the seismic wave parameters and one or more algorithms to determine the intensity of the seismic waves. If the processing unit 120 determines that the intensity of the seismic waves is above a threshold (e.g., and without any limitations when the seismic waves are above a threshold that may be caused by an earthquake of greater than 5.2-5.4 on Richter scale that many municipalities require the gas supply to residential properties to be shutoff), the processing unit 120 may send one or more signals (or commands) to the motor 115 to rotate the rotor shaft 150 (e.g., through the gearbox 155) to turn the valve coupling key 145 that is engaged with the shutoff valve actuator 180 (as shown in FIG. 1B) in order to close the shutoff valve 175.

The processing unit 120 may use other criteria to close/turn off/shutoff (or open/turn on) the manual shutoff valve 175. For example, the radio transceiver 125 may receive one or more signals (or commands) through the antenna 130 from an external electronic device such a client device or a server to close (or open) the manual shutoff valve 175. The radio transceiver 125 may send the signal(s)/command(s) to the processing unit 120. The processing unit 120, in some of the present embodiments, may determine whether the sender of the signal(s)/command(s) is authorized to request the shutoff valve 175 to be closed (or opened). When the processing unit 120 determines that the sender is authorized, the processing unit 120 may send one or more signals/commands to the motor 115 to rotate the rotor shaft 150.

The limit detector 160 is a sensor that may provide a feedback to the processing unit 120 to determine whether the shutoff valve 175 is closed (or opened). The examples of the limit detector may include, without any limitations, a force or torque sensor external to the motor, a sensor for measuring the electric current used by the motor, a rotary position encoder sensor such as an optical or a magnetic position encoder. Servomotors may include an internal servomechanism (or sensor), such as a potentiometer, that may function as a limit detector.

With further reference to FIGS. 1A-1B, the radio transceiver 125 and the antenna 130 may receive data, commands, signals, and/or requests for status and data from electronic devices external to the valve shutoff device 100 and may pass the received data, commands, signals, and/or requests for status and data to the processing unit 120. The radio transceiver 125 and the antenna 130 may receive status and data from the processing unit and may transmit them to one or more electronic devices external to the valve shutoff device 100.

The radio transceiver 125 may be a cellular radio transceiver, a Bluetooth transceiver, a Bluetooth low energy (BLE) transceiver, an RFID transceiver, a Wi-Fi transceiver, etc. Although the example of FIGS. 1A-1B shows the processing unit 120, the radio transceiver 125, and the antenna 130 as separate units, in some of the present embodiments, the processing unit 120, the radio transceiver 125, and the antenna 130 may be on a single "system on a chip" integrated circuit (IC). In some of the present embodiments, the processing unit 120, the radio transceiver 125, the antenna 13, and the IMU (e.g., the accelerometer, the magnetometer, and/or the gyroscope) may be a single "system in package" (SIP). The SIP may include one or more ICs enclosed in a single carrier package. One or more of the ICs may include firmware to perform computationally intensive operations, such as coordinate rotation operations, using one or more predefined functions.

In some of the present embodiments, the processing unit 120 may receive and/or store data and health status from different components of the valve shutoff device 100. For example, and without any limitations, the processing unit 120 may receive the current position of the shutoff valve 180 (e.g., open, close, partially open, etc.), the level of voltage generated by the battery 110, the health status of the IMU 135, the health status of the radio transceiver 125, the health status of the limit detector 160, the health status of the solar cell(s) 105, etc. The processing unit 120 may transmit the data and the health status through the radio transceiver 125 to one or more external devices either upon request or as a push transfer.

In some of the present embodiments, the valve shutoff device 100 may include a GPS component (not shown). The GPS may be used to determine the location of the valve shutoff device and may be sent to one or more electronic devices, for example, along with the measurements of the seismic activities.

The valve shutoff device 100 may include a housing 140 with a hollow interior to cover, for example, one or more of the rechargeable battery 100, the motor 115, the gearbox 155, the limit detector 160, the processing unit 120, the radio transceiver 125, the IMU 135, etc. The housing 140 may be weatherproof or weather resistant to protect the components inside. The housing may be made of material such as, without any limitations, polyvinyl chloride (PVC), vinyl, plastic, metal, etc. The housing, in some of the present embodiments, may be in the shape of a pipe or a cylinder. The housing, in some of the present embodiments, may have one or more flat sides, may have an arbitrary shape, etc.

Figure 3:
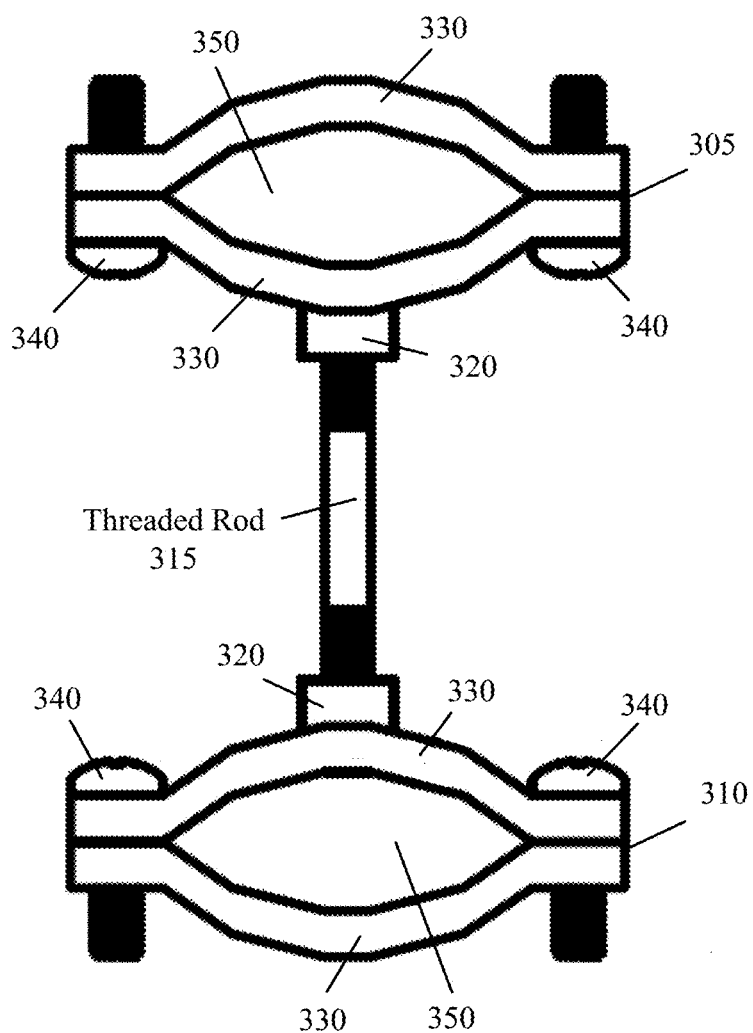
FIG. 3 is a schematic front view of a pair of clamps that are used to tie an automatic valve shutoff device as a retrofit on a fluid supply line, according to various aspects of the present disclosure.

Different embodiments may use different methods to attach/tie the valve shutoff device 100 to the fluid supply line 170 in order to keep the valve coupling key 145 engaged with the shutoff valve actuator 180. Some embodiments may use one or more clamps to tie the valve shutoff device 100 and the fluid supply line 170 together. FIG. 3 is a schematic front view of a pair of clamps that are used to tie an automatic valve shutoff device as a retrofit on a fluid supply line, according to various aspects of the present disclosure. With reference to FIG. 3, the two clamps 305 and 310 may be connected together by a threaded rod 315.

Each clamp 305 and 310 may include a threaded section 320 that may get engaged with the threaded rod 315. The distance between the clamps 305 and 310 may be adjusted by rotating one or both of the clamps 305 and 310 around the threaded rod 315. Each clamp 305 and 310 may have a pair of jaws 330. The open space 350 between the jaws 330 may be adjusted by a pair of bolts 340.

Figure 4:
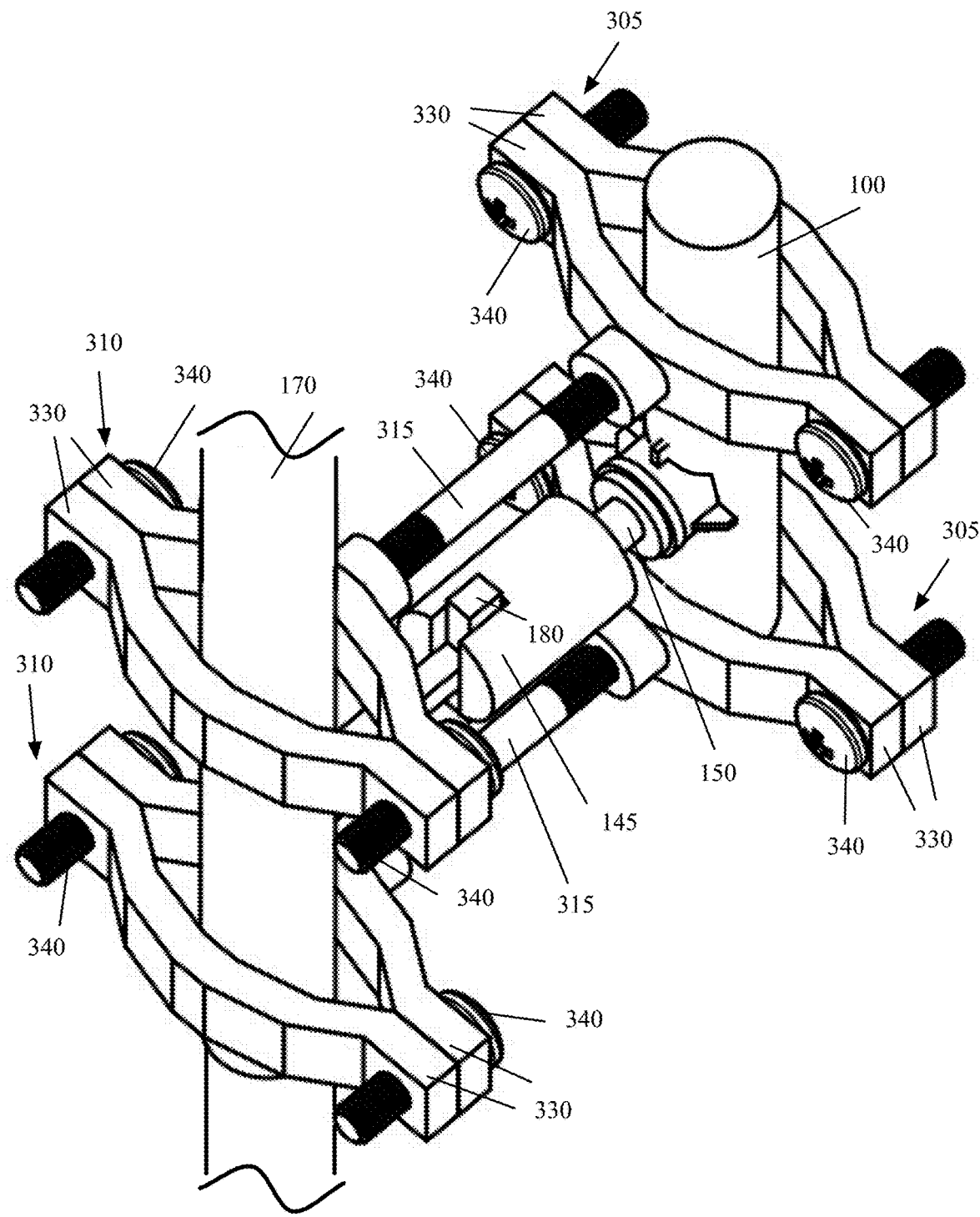
FIG. 4 is a perspective view of an automatic valve shutoff device that is connected, as a retrofit, by several clamps to a fluid supply line, according to various aspects of the present disclosure.

FIG. 4 is a perspective view of an automatic valve shutoff device that is connected, as a retrofit, by several clamps to a fluid supply line, according to various aspects of the present disclosure. With reference to FIG. 4, the valve shutoff device 100 may be installed over the fluid supply line 170 such that the valve coupling key 145 is engaged with the shutoff valve actuator 180.

The threaded rods 315 may be used, as described above with reference to FIG. 3, to adjust the distance between each pair of clamps 305 and 310 prior to the installation of the valve shutoff device 100. The bolts 340 may be used to adjust the space between the jaws 330 in order to tighten the grip of the clamps 305 and 310 around the valve shutoff device 100 and the fluid supply line 170, respectively.

Figure 5:
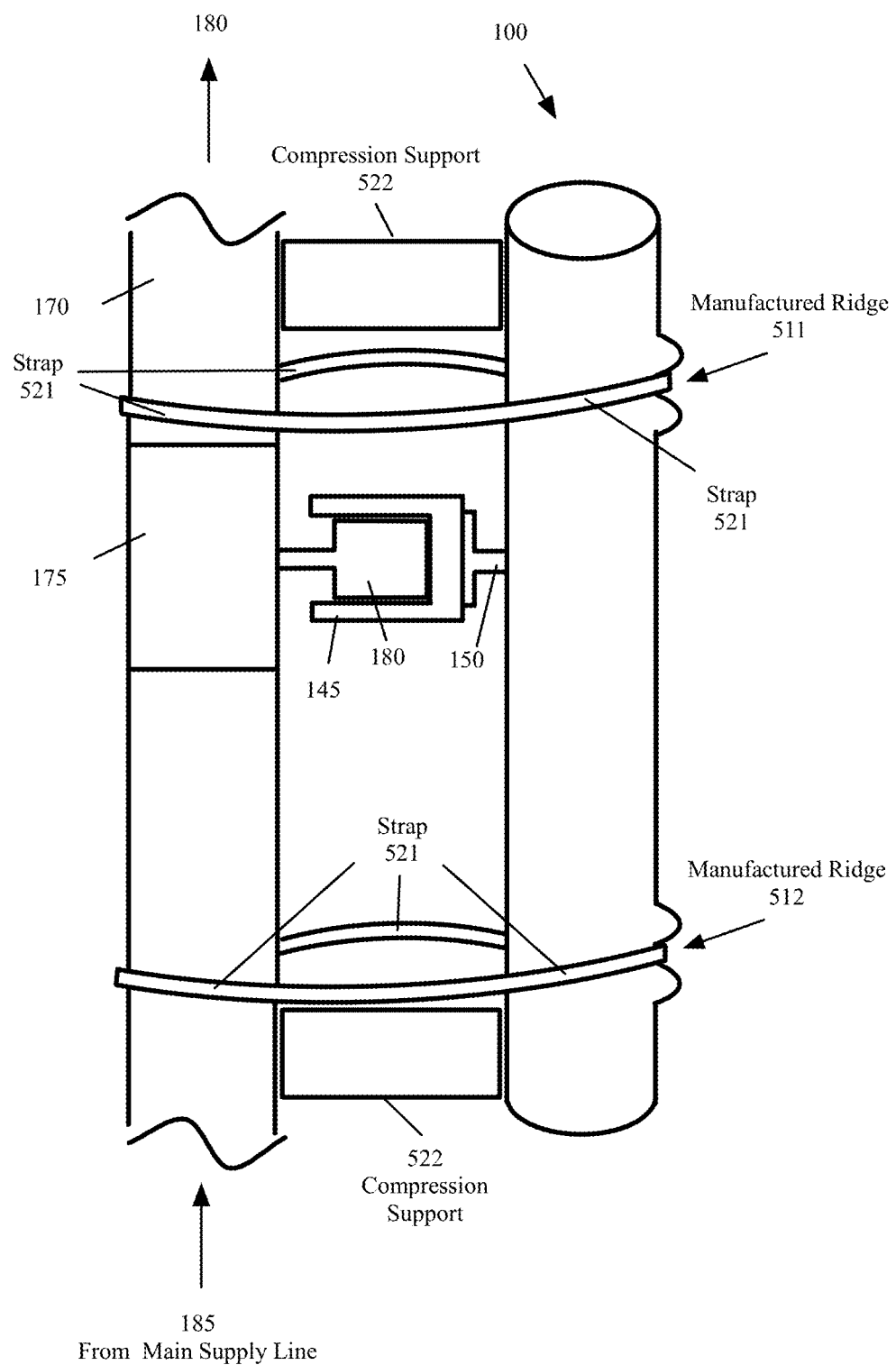
FIG. 5 is a schematic front view of an automatic valve shutoff device that is installed and tied as a retrofit on a fluid supply line, according to various aspects of the present disclosure.

FIG. 5 is a schematic front view of an automatic valve shutoff device that is installed and tied as a retrofit on a fluid supply line, according to various aspects of the present disclosure. With reference to FIG. 5, the valve shutoff device 100 may be installed over the fluid supply line 170 such that the valve coupling key 145 is engaged with the shutoff valve actuator 180.

The valve shutoff device 100 may be tied to the fluid supply line 170 with one or more straps (e.g., steel or other types of metal cables, metal wires, plastic, nylon, leather, etc.) 521. The strap 521, in some embodiments, may be a cable tie (or a zip tie) with teeth that engages with a pawl to form a ratchet such that when the free end of the cable tie is pulled, the cable tie tightens and does not come undone. The straps 521, in some embodiments, may be a cable or a wire. Some of the present embodiments may include one or more compression supports 522 between the valve shutoff device 100 and the fluid supply line 170. The compression supports 522 in some embodiments are rigid bodies that may keep the valve shutoff device 100 and the fluid supply line 170 separated at a desired distance. In some aspects of the present embodiments, the compression supports' length may be adjustable.

As shown in the examples of FIGS. 4 and 5, the valve shutoff device 100 may be installed as a retrofit without a need to cutoff the fluid supply line 170. The valve shutoff device 100 may be installed by a consumer without the need for a specialist to turn off the fluid supply and/or without the need to cut the fluid supply line 170.

Figure 6A:
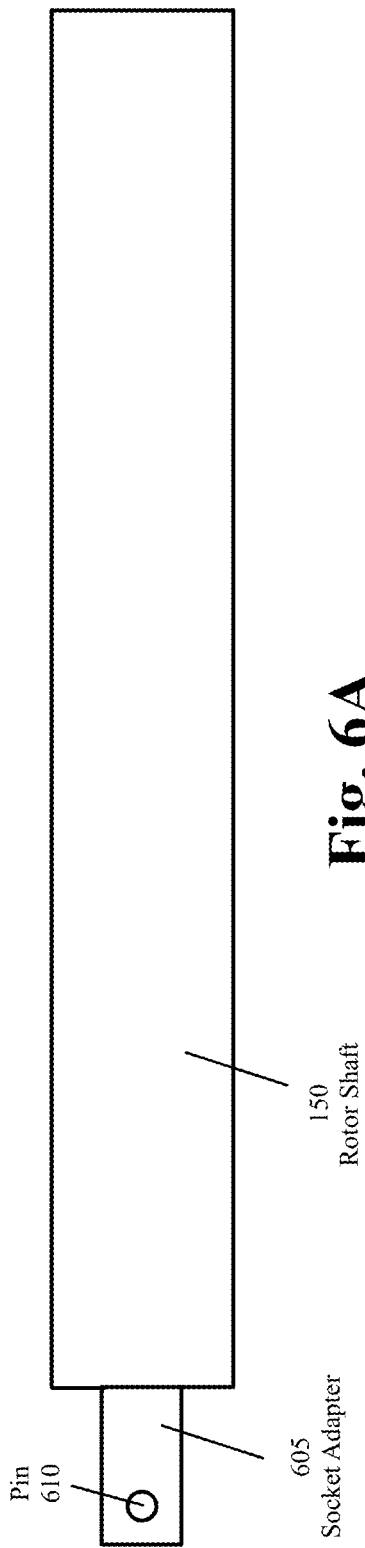
FIG. 6A is a schematic side view of the rotor shaft of a valve shutoff device, according to various aspects of the present disclosure.
Figure 6B:
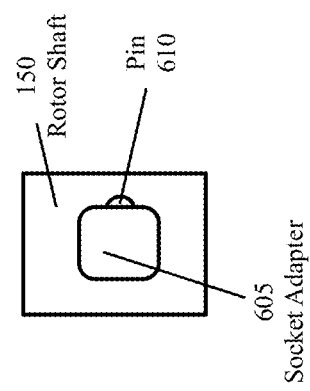
FIG. 6B is a schematic front view of the rotor shaft of FIG. 6A, according to various aspects of the present disclosure.

In some of the present embodiments, the rotor shaft 150 may have a socket adapter in order to fit into a socket at the base of the valve coupling key 145. FIG. 6A is a schematic side view of the rotor shaft of a valve shutoff device, according to various aspects of the present disclosure. FIG. 6B is a schematic front view of the rotor shaft of FIG. 6A, according to various aspects of the present disclosure.

With reference to FIGS. 6A-6B, the rotor shaft 150 may have a socket adapter 605 at one end in order to fit into a socket of different replaceable valve coupling keys as described below with reference to FIGS. 7A-7C, 9A-9C, and 11A-11C. The socket adapter 605 may have a spring action pin 610 to secure the socket adapter 605 into the socket of a valve coupling key.

Figure 7A:
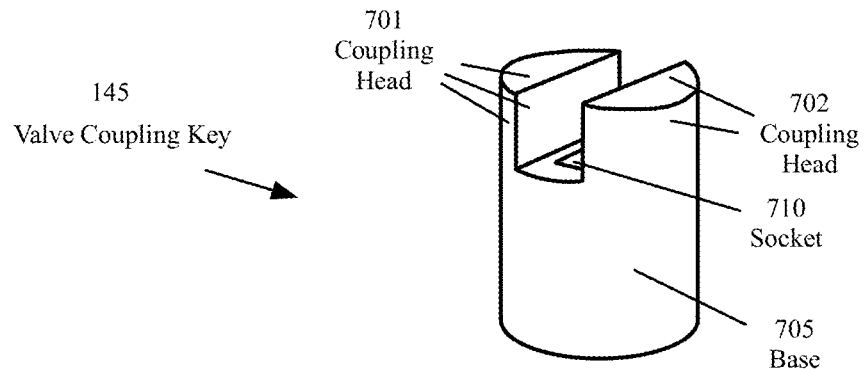
FIG. 7A is a perspective view of a valve coupling key, according to various aspects of the present disclosure.
Figure 7B:
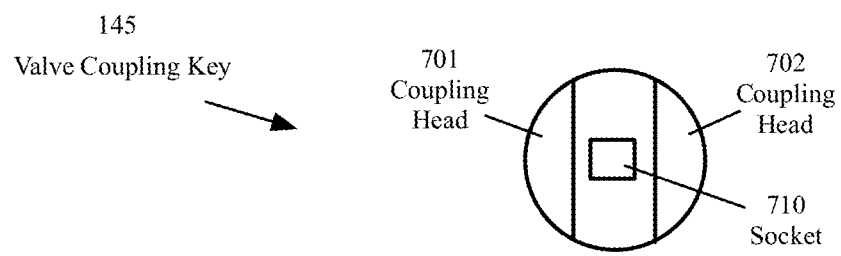
FIG. 7B is a schematic top view of the valve coupling key of FIG. 7A, according to various aspects of the present disclosure.
Figure 7C:
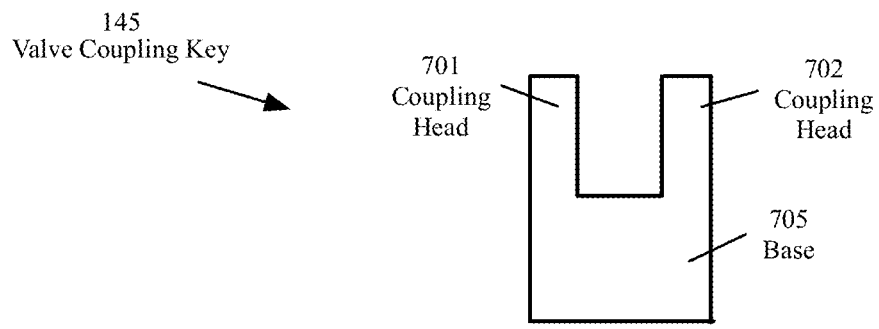
FIG. 7C is a schematic front view of the valve coupling key of FIG. 7A, according to various aspects of the present disclosure.

FIG. 7A is a perspective view of a valve coupling key, according to various aspects of the present disclosure. FIG. 7B is a schematic top view of the valve coupling key of FIG. 7A, according to various aspects of the present disclosure. FIG. 7C is a schematic front view of the valve coupling key of FIG. 7A, according to various aspects of the present disclosure.

With reference to FIGS. 7A-7C, the valve coupling key 145 may include the coupling heads 701 and 702 that protrude from a base 705. The coupling heads 701 and 702 may be made to have different shapes and sizes and the distance between the coupling heads 701 and 702 may be adjusted at manufacture time to match the shutoff valve actuators for different applications. The socket 710 may be used to attach the valve coupling key 700 to the socket adapter 605 (FIG. 6) at the end of the rotor shaft 150.

Figure 10:
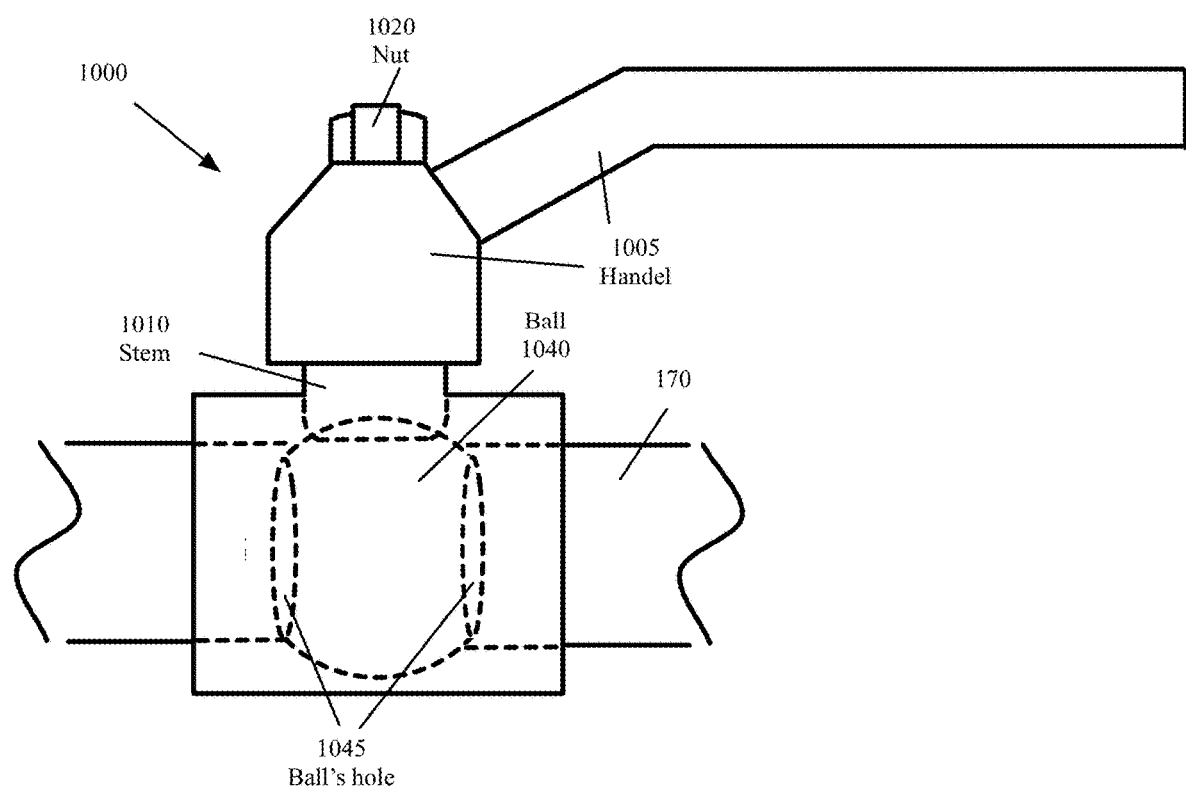
FIG. 10 is a schematic front view of a ball valve that includes a handle for opening and closing of the valve, according to prior art.

In the example of FIGS. 7A-7C, the coupling heads 701 and 702 may be designed to engage the shutoff valve actuator 180 of FIGS. 1A-1B, and 2-5. These examples show that the manual shutoff valve 175 on the fluid supply line includes a shutoff valve lever to open or close the flow of the fluid in the fluid supply line 170. As shown in the examples of FIGS. 8 and 10, other manual shutoff valves may include other mechanisms for opening or closing the flow of the fluid in the fluid supply line.

Figure 8:
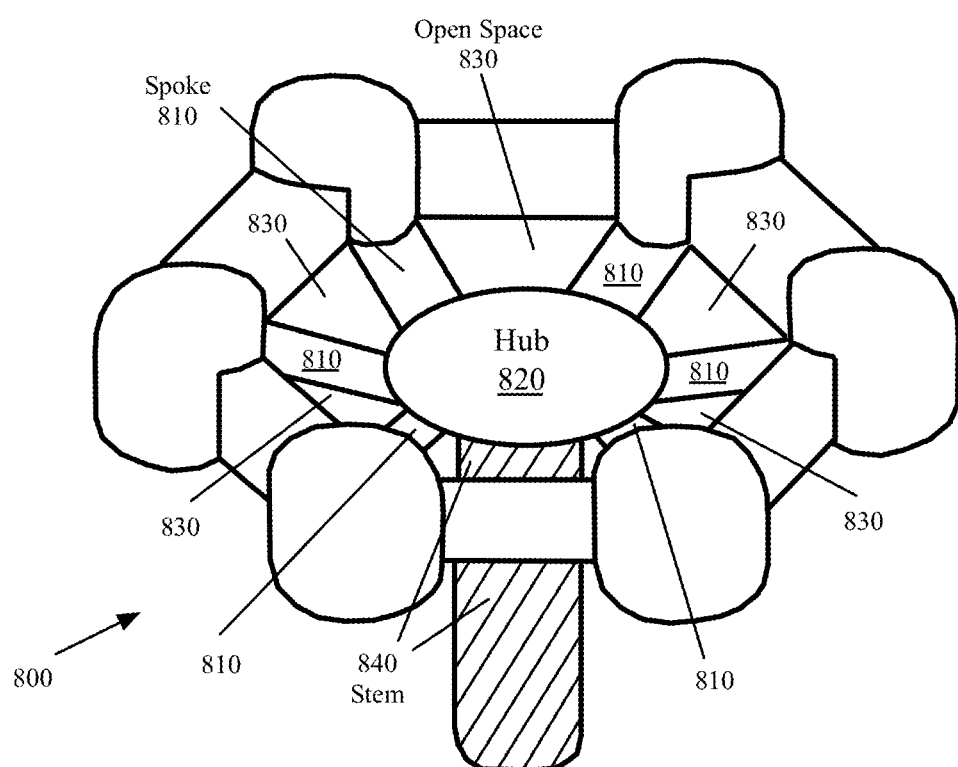
FIG. 8 is a perspective view of a portion of a gate valve's handwheel, according to prior art.

FIG. 8 is a perspective view of a gate valve's handwheel, according to prior art. With reference to FIG. 8, the gate valve handwheel 800 includes several spokes 810 that are connected to a hub (or wheel) 820. The hub 820 may be connected to the stem 840. There are several open spaces 830 between the spokes 810. The gate valve handwheel 800 may be used, for example and without any limitations, to open or close the flow of a liquid such as water or petroleum-based liquid in a supply line.

Figure 9A:
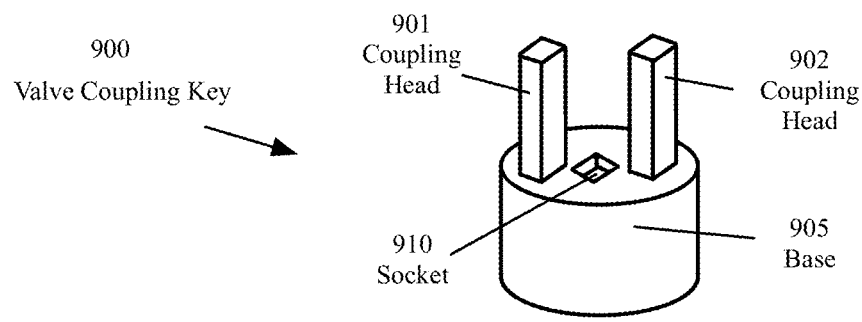
FIG. 9A is a perspective view of a valve coupling key that may be used to rotate a handwheel of a gate valve, according to various aspects of the present disclosure.
Figure 9B:
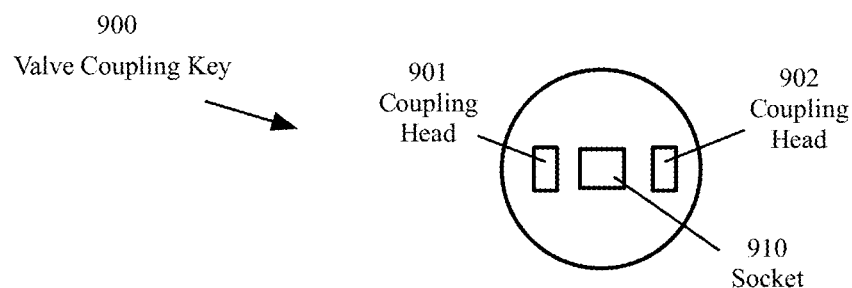
FIG. 9B is a schematic top view of the valve coupling key of FIG. 9A, according to various aspects of the present disclosure.
Figure 9C:
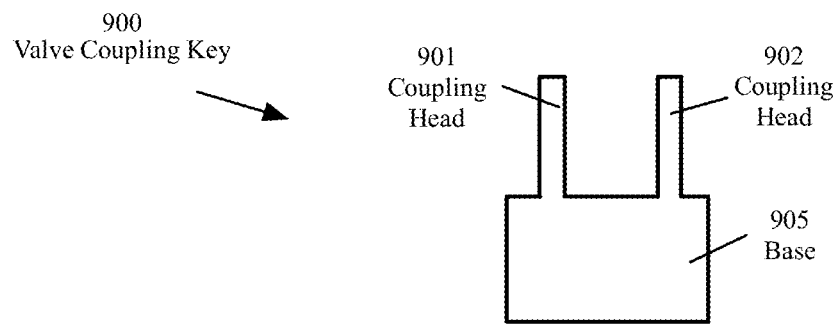
FIG. 9C is a schematic front view of the valve coupling key of FIG. 9A, according to various aspects of the present disclosure.

FIG. 9A is a perspective view of a valve coupling key that may be used to rotate a handwheel of a gate valve, according to various aspects of the present disclosure. FIG. 9B is a schematic top view of the valve coupling key of FIG. 9A, according to various aspects of the present disclosure. FIG. 9C is a schematic front view of the valve coupling key of FIG. 9A, according to various aspects of the present disclosure.

With reference to FIGS. 9A-9C, the valve coupling key 900 may be used to automatically rotate a handwheel such as the handwheel 800 of FIG. 8. The valve coupling key 900 may, for example, be attached to the rotor shaft 150 of FIGS. 1A-1B, and 2-5, instead of the valve coupling key 145, to engage the handwheel 800 of a gate shutoff valve.

With further reference to FIGS. 9A-9C, the valve coupling key 900 may include the coupling heads 901 and 902 that protrude from a base 905. The coupling heads 901 and 902 may be made to have different shapes and sizes and the distance between the coupling heads 901 and 902 may be adjusted at manufacture time to match the open spaces 830 between the spokes 810 of the handwheel 800 of FIG. 8. The valve coupling key 900 may have any number of coupling heads 901 (e.g., 1, 2, 3, 4, etc.) to match the open spaces between the spokes of different handwheels. The socket 910 may be used to attach the valve coupling key 900 to the socket adapter 605 (FIG. 6) at the end of the rotor shaft 150.

FIG. 10 is a schematic front view of a ball valve that includes a handle for opening and closing the valve, according to prior art. With reference to FIG. 10, the ball valve 1000 includes a handle 1305 that is used to rotate the stem 1010 to open or close the flow of fluid in the fluid supply line 170. The handle 1005 may be connected to the stem 1010 by a nut 1020.

The stem 1010 is connected to a ball 1040, which has a hole 1050. The valve 1000 is open and the fluid may flow in the fluid supply line 170 when the ball's hole 1050 is in line with the flow. The valve 1000 is closed when the handle 1005 is rotated such that the ball's hole is not facing the flow.

In the example of FIG. 10, the ball's hole is facing the flow and the valve 1000 is open. The ball valve 1000 is typically open when the handle is parallel to the fluid supply line 170 (as shown in FIG. 10) and is closed when the handle is perpendicular to the fluid supply line 170. The ball valve 1000 may be used, for example and without any limitations, to open or close the flow of a fluid such as water or gas in a fluid supply line.

Figure 11A:
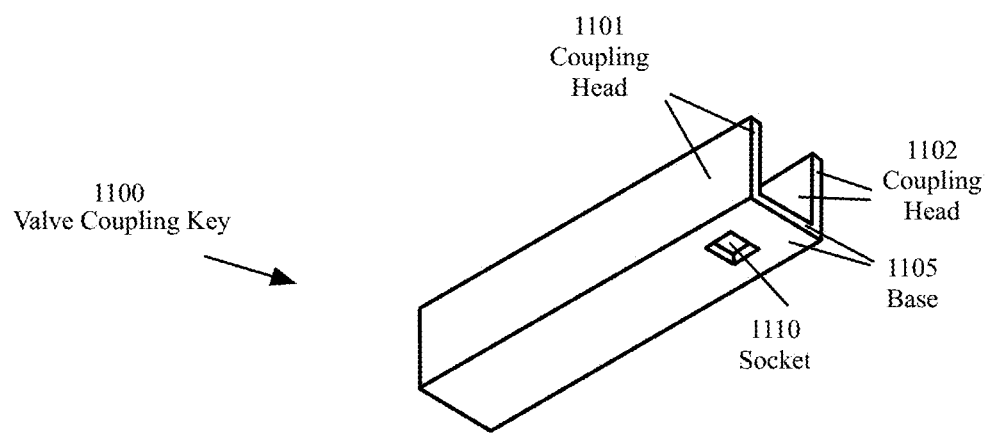
FIG. 11A is a perspective view of a valve coupling key that may be used to rotate the handle of a ball valve, according to various aspects of the present disclosure.
Figure 11B:
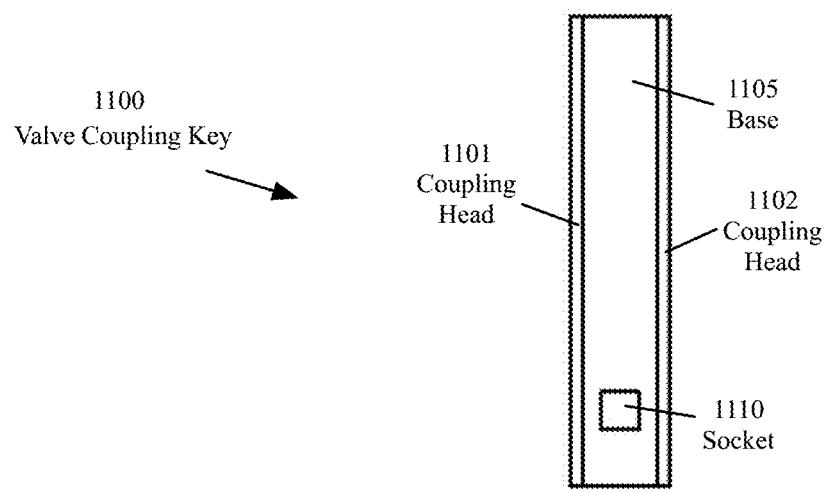
FIG. 11B is a schematic top view of the valve coupling key of FIG. 11A, according to various aspects of the present disclosure.
Figure 11C:
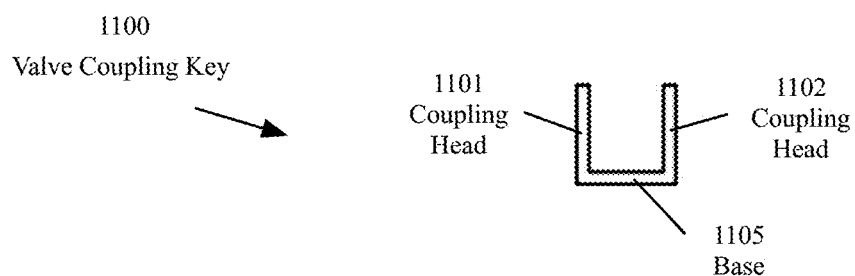
FIG. 11C is a schematic front view of the valve coupling key of FIG. 11A, according to various aspects of the present disclosure.

FIG. 11A is a perspective view of a valve coupling key that may be used to rotate the handle of a ball valve, according to various aspects of the present disclosure. FIG. 11B is a schematic top view of the valve coupling key of FIG. 11A, according to various aspects of the present disclosure. FIG. 11C is a schematic front view of the valve coupling key of FIG. 11A, according to various aspects of the present disclosure.

With reference to FIGS. 11A-11C, the valve coupling key 1100 may be used to automatically rotate the handle 1005 of the ball valve 1000 of FIG. 10. The valve coupling key 1100 may, for example, be attached to the rotor shaft 150 of FIGS. 1A-1B, and 2-5, instead of the valve coupling key 145, to engage the handle 1005 of the shutoff valve 1000.

With further reference to FIGS. 11A-11C, the valve coupling key 1100 may include the coupling heads 1101 and 1102 that protrude from a base 1105. The distance between the coupling heads 1101 and 1102 may be adjusted at manufacture time to match the handle 1005 of a ball valve such as the ball valve 1000 of FIG. 10. The socket 1110 may be used to attach the valve coupling key 1100 to the socket adapter 605 (FIG. 6) at the end of the rotor shaft 150.

Different embodiments may use different types of motors, limit detectors, and/or valve coupling keys to open and close different types of shutoff valves. Several examples of these components are described below. The invention is, however, not limited to the specific combination of components described in the following examples.

Figure 12A:
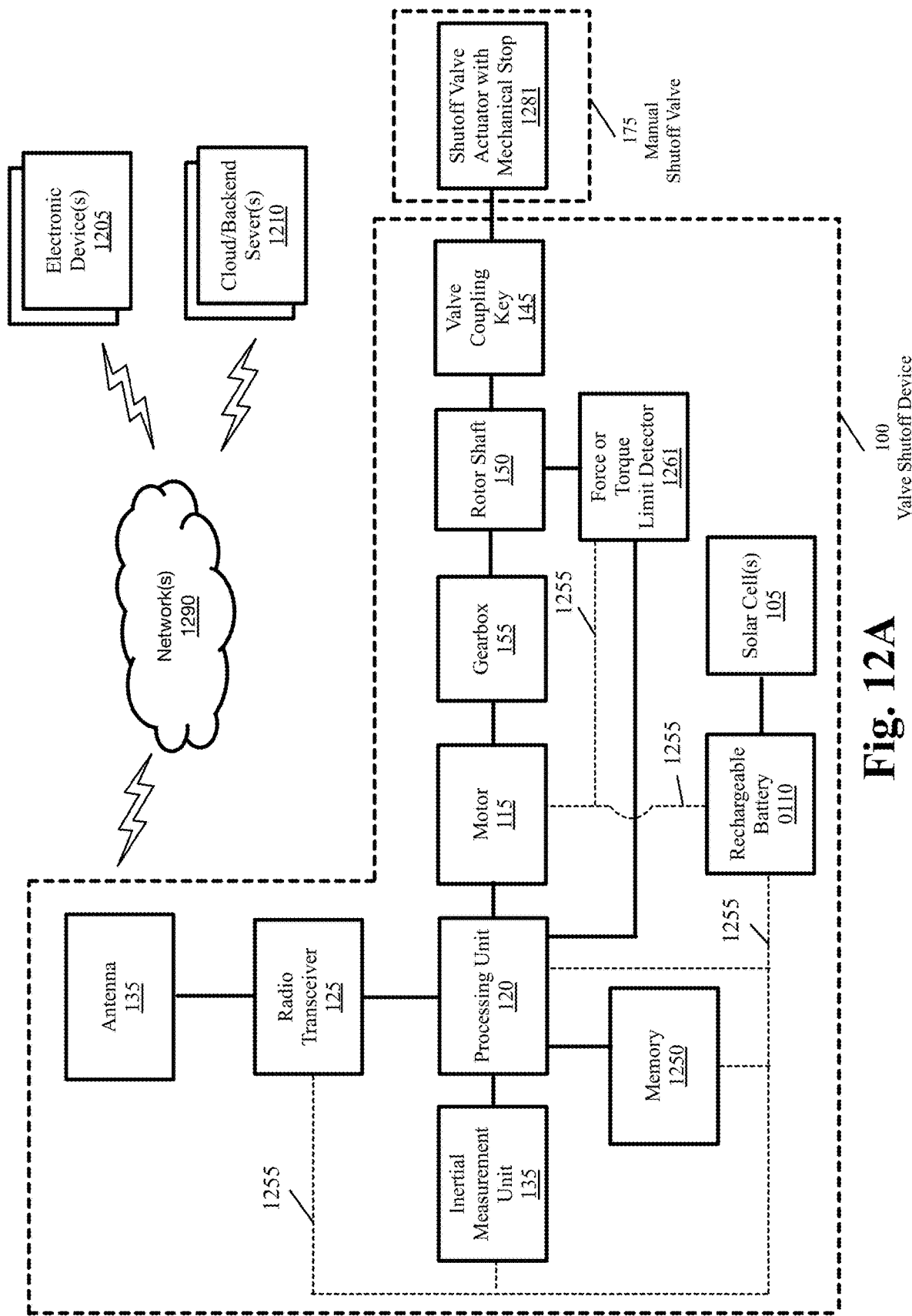
FIG. 12A is a functional block diagram illustrating an example system for an automatic valve shutoff device that includes a force or torque limit detector, according to various aspects of the present disclosure.

FIG. 12A is a functional block diagram illustrating an example system for an automatic valve shutoff device that includes a force or torque limit detector, according to various aspects of the present disclosure. With reference to FIG. 12A, the valve shutoff device 100 may be similar to the valve shutoff device 100 of FIGS. 1A and 1B and may include a rechargeable battery 110, one or more solar cell(s)

105, a motor 115, a processing unit 120, a radio transceiver 125, an antenna 130, an IMU 135, a valve coupling key 145, a coupling shaft 150, a gearbox 155, a valve coupling key 145, and a limit detector 1261.

The manual shutoff valve 175 may be similar to the shutoff valve 175 of FIGS. 1A and 1B and may include a shutoff valve actuator 1281 with mechanical stop. The mechanical stop may prevent the shutoff valve actuator 1281 to freely rotate around a center and may stop the actuator from rotating after a certain numbers (or a certain fraction) of a turn. For example, the mechanical stop may allow the shutoff valve actuator 1281 to only make a quarter turn (or 90 degrees) in one direction to open and to make a quarter turn (or 90 degrees) in the opposite direction to close.

The rechargeable battery 110 may be recharged, in addition to, or in lieu of, the solar cell(s) 105 from a wired connection (not shown). Although FIG. 12A and several other examples in the present disclosure shows only one rechargeable battery 110, some of the present embodiments may include several rechargeable batteries 110. The rechargeable battery 110 may provide electrical power (as shown by lines 1255) to different components of the automatic valve shutoff device 100.

With further reference to FIG. 12A, the processing unit 120 may determine whether or not to rotate the rotor shaft 150 to close or open the shutoff valve 175 based on feedbacks from the IMU 135 and/or based on one or more signals (or commands) from one or more electronic devices 1205 and/or cloud/backend servers 1210. The IMU 135 may measure one or more parameters of seismic waves such as, without limitations, primary waves (P-waves), secondary waves (S-waves), and surface waves.

The IMU 135 may send the measured parameters to the processing unit 120. The processing unit 120 may use the seismic wave parameters and one or more algorithms to determine the intensity of the seismic waves. If the processing unit 120 determines that the intensity of the seismic waves is above a threshold, the processing unit 120 may send one or more signals (or commands) to the motor 115 to rotate the rotor shaft 150 (e.g., through the gearbox 155) to turn the valve coupling key 145 that is engaged with the shutoff valve actuator 780 in order to close the shutoff valve 175.

The processing unit 120 may receive one or more signals (or commands) through the antenna 130 from one or more electronic devices 1205 and/or one or more cloud/backend servers 1210 to close (or open) the manual shutoff valve 175. The electronic device(s) may be client device(s) of person(s) associated with the valve shutoff device 100. The cloud or backend server(s) 1210 may be computing devices associated with one or more government agencies and/or utility companies such as, without limitations, firefighting departments, civil defense, unitality companies, gas companies, water companies, etc. The electronic device(s) 1205 and the cloud/backend server(s) 130 may communicate with the valve shutoff device 100 through one or more networks 1290 such as the Internet, the cellular network, etc. The processing unit 120 may send one or more signals (or commands) to the motor 115 to rotate the rotor shaft 150 after the processing unit 120 determines that the requesting electronic device(s) and/or server(s) has/have authorization to request the shutoff valve to be opened or closed.

Regardless of whether the processing unit 120 starts the motor 115 based on the analysis of seismic waves parameters or in response to receiving signals or commands from external devices, the processing unit 120 may need to know whether the shutoff valve actuator 1281 is stopped by the mechanical stop (e.g., after the valve is opened or closed), in order to send another set of commands (or signals) to the motor 115 to stop. One indication that may be used by the processing unit 120 is the amount of force (or torque) excreted by the motor to the rotor shaft 150. When the shutoff valve actuator 1281 is stopped by the mechanical stop, the force (or torque) excreted by the motor increases. The processing unit 120 may compare the force (or torque) excreted by the motor with a threshold to determine whether the shutoff valve actuator 1281 is stopped by the mechanical stop and the motor is to be stopped.

The limit detector 1261 in the example of FIG. 12A is a force or torque limit detector, which may provide measurements of the force (or torque) that is applied to the rotor shaft 150 to the processing unit 120. FIG. 13A is a functional diagram showing a force or torque limit detector, according to various aspects of the present disclosure. With reference to FIG. 13A, the force or torque limit detector 1261 may include a load cell 1310 (e.g., a torsion load cell) and a signal conditioner 1315. The load cell 1310 is a transducer that generates an electrical signal 1320 with a magnitude that is proportional with a force or torque that is generated by the rotor shaft 150.

When the rotor shaft 150 rotates, the shutoff valve actuator with mechanical stop 1281 of FIG. 12A comes to a point where the actuator is stopped by the mechanical stop. At this point, the rotor shaft 150 exerts more force (or torque) on the actuator 1281. With reference to FIG. 13A, the load cell measures the force (or torque) generated by the rotor shaft 150 and sends the electrical signal 1320 that is proportional to the force (or torque) to the signal conditioner 1315. The signal conditioner 1315 may amplify and/or rectify the electrical signal 1320 and send the force or torque measurement 1327 as one or more signals to the processing unit 120. The processing unit 120 may compare the force or torque measurement with a threshold and may send one or more signals or commands to the motor 115 to stop the motor 115 when the force or torque measurements exceed the threshold.

With further reference to FIG. 12A, the processing unit 120 may receive and/or store data and health status from different components of the valve shutoff device 100. For example, and without any limitations, the processing unit 120 may receive the current position of the shutoff valve actuator 1281, and therefore, the current position of the shutoff valve 175 (e.g., open, close, partially open, etc.), the level of voltage generated by the battery 110, the health status of the IMU 135, the health status of the radio transceiver 125, the health status of the limit detector 160, the health status of the solar cell(s) 105, etc.

The processing unit 120 may store the data and/or the health status in the memory 1250. The processing unit 120 may send the data and/or the health status to the radio transceiver 125 to transmit through the network(s) 1290 to one or more of the electronic devices 1205 and/or one or more cloud/backend servers 130 either upon request or as a push transfer. The valve shutoff device 100 may connect to and exchange signals and data as an IoT device with external electronic devices through the network(s) 1290.

Figure 12B:
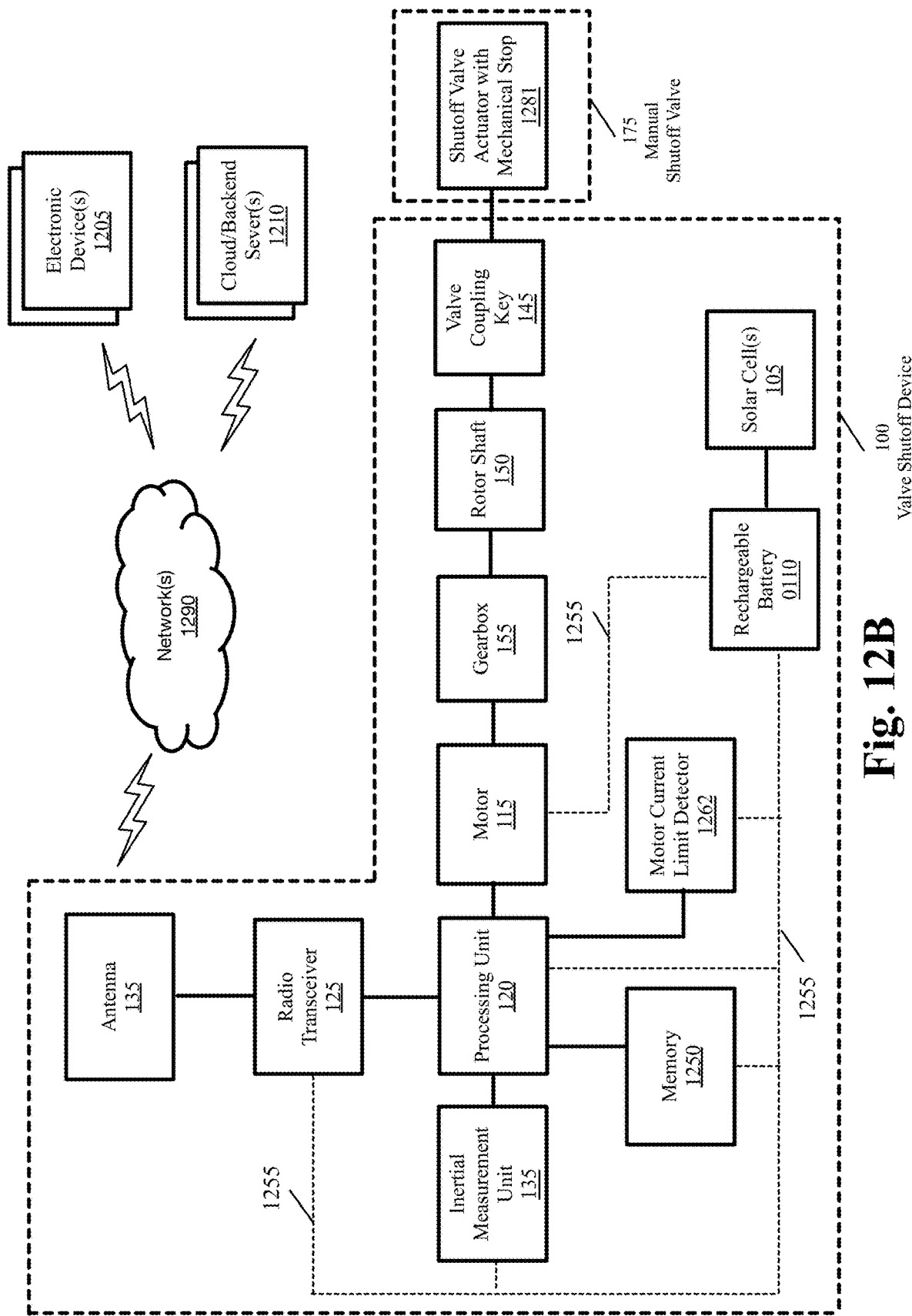
FIG. 12B is a functional block diagram illustrating an example system for an automatic valve shutoff device that includes a motor current limit detector, according to various aspects of the present disclosure.

Using the force or torque limit detector 1261 is one way for the processing unit 120 to receive feedback to determine whether or not to stop the motor 115. FIG. 12B is a functional block diagram illustrating an example system for an automatic valve shutoff device that includes a motor current limit detector, according to various aspects of the present disclosure. FIG. 12B may include similar components as FIG. 12A with the difference that the valve shutoff device 100 in the example of FIG. 12B includes a motor current limit detector 1262. The motor current limit detector 1262 may provide measurements of the current used by the motor 115.

FIG. 13B is a functional diagram showing a motor current limit detector, according to various aspects of the present disclosure. With reference to FIG. 13B, the motor current limit detector 1262 may receive and measure the motor's current 1325. The motor current limit detector 1262 may send the current measurements 1330 to the processing unit 120.

When the rotor shaft 150 rotates, the shutoff valve actuator with mechanical stop 1281 of FIG. 12B comes to a point where the actuator is stopped by the mechanical stop. At this point, the motor 115 may use more current in order to exerts more force (or torque) on the actuator 1281. The processing unit 120 may compare the current measurements 1330 with a threshold and may send one or more commands or signals to the motor 115 to stop the motor 115 when the current measurements exceed the threshold.

Figure 12C:
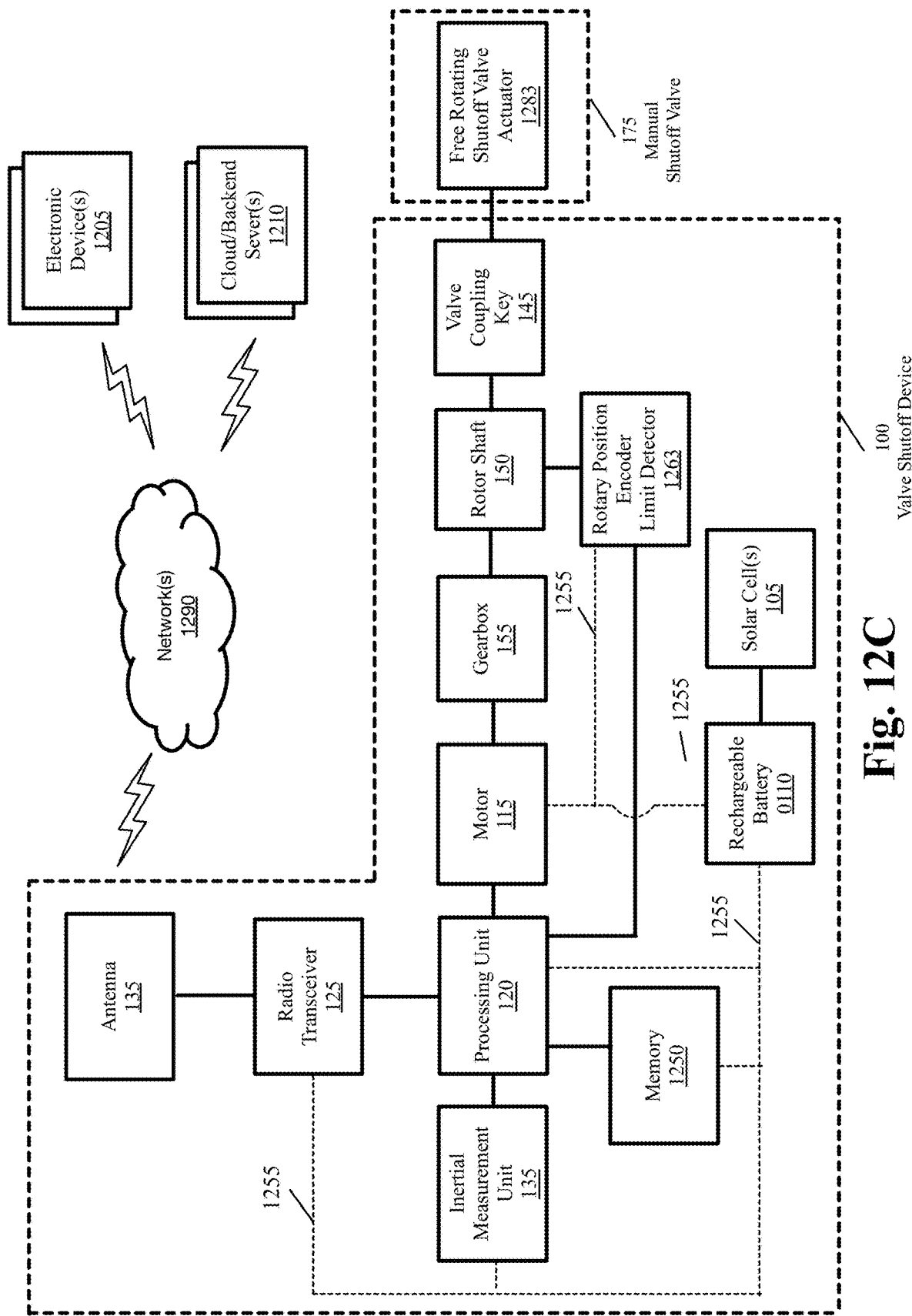
FIG. 12C is a functional block diagram illustrating an example system for an automatic valve shutoff device that includes a rotary position encoder limit detector, according to various aspects of the present disclosure.

FIG. 12C is a functional block diagram illustrating an example system for an automatic valve shutoff device that includes a rotary position encoder limit detector, according to various aspects of the present disclosure. With reference to FIG. 12C, the manual shutoff valve 175 includes a free rotating shutoff valve actuator 1283, instead of the shutoff valve actuator with mechanical stop 1281 of FIGS. 12A and 12B. The valve shutoff device 100 in the example of FIG. 12C includes a rotary position encoder limit detector to determine the angle or rotation and/or the speed of the rotor shaft 150. Other components of FIG. 12C are similar to the components of FIG. 12A.

Figure 13C:
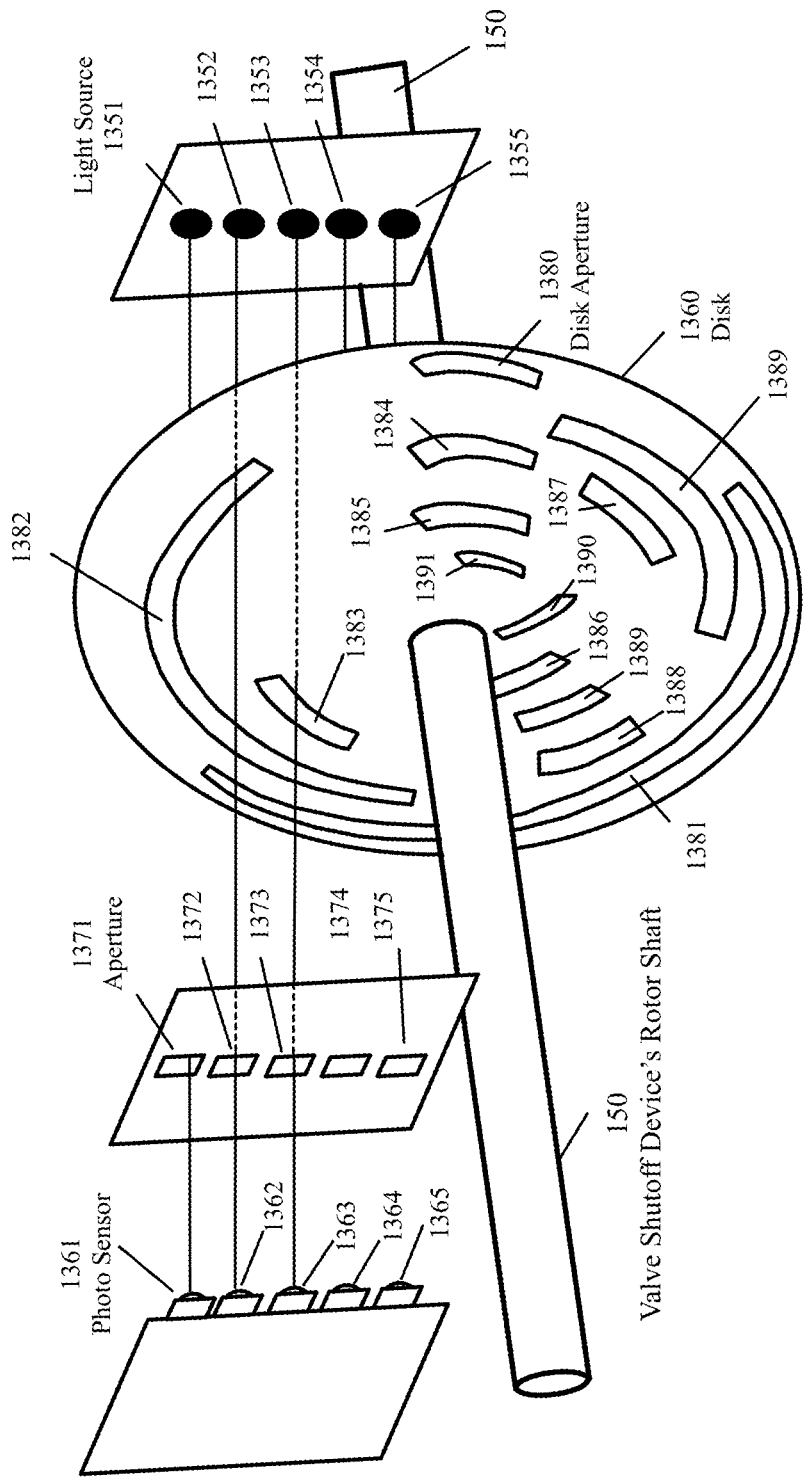
FIG. 13C is a perspective view of an optical rotary position encoder installed on the rotor shaft of the valve shutoff device, according to various aspects of the present disclosure.

The rotary position encoder 1263 may be an optical rotary position encoder or a magnetic rotary position encoder. FIG. 13C is a perspective view of an optical rotary position encoder installed on the rotor shaft of the valve shutoff device, according to various aspects of the present disclosure. With reference to FIG. 13C, the optical rotary position encoder may include a disk 1360 that is installed on the rotor shaft 150 (e.g., the rotor shaft 150 of FIG. 12C), several light sources 1381-1385, several apertures 1371, and several photo sensors 1361.

The optical rotary position encoder is an electro-mechanical device that converts the angular position of the rotation of the rotor shaft 150 to a digitized output signal (e.g., a series of pulses). The encoder's disk 1360 includes a group of tracks, which are arranged concentrically around the rotor shaft 150. Each track may have one or more apertures 1380-1391 for allowing light to pass through the disk 1360. For simplicity, only a subset of the apertures are shown in FIG. 13C.

In the example of FIG. 13C, the encoder's disk 1360 has five concentric tracks. For example, the aperture 1381 is on the first track, the aperture 1388 is on the second track, the aperture 1389 is on the third track, the aperture 1386 is on the fourth track, and the aperture 1390 is on the fifth track. The number of concentric tracks determines the number of output bits generated by the optical rotary position encoder. The optical encoder in the example of FIG. 13C has five concentric tracks and, therefore, generates five bits of output. In other embodiments, the optical encoder may have fewer or more bits to satisfy a desired resolution. For an n bit encoder, the encoder resolution is shown by Equation 1:

$$\frac{360 \text{ degress}}{(2^n)} \qquad \text{Eq. (1)}$$

The number of light sources 1351-1355, apertures 1371-1375, and photo sensors 1361-1365 may be the same as the number of concentric tracks of the disk 1360. The light sources 1351-1354 may be, for example and without limitations, LED lights. Each light source 1351-1355 may pass light through a corresponding aperture 1371-1375. The light passed through each aperture 1371-1375 may be captured by a corresponding photo sensor 1361-1365. The light emitted by each light source 1351-1355 may reach the corresponding aperture 1371-1375 only if it passes through one of the apertures 1380-1391 on the disk 1360. Otherwise, the emitted light may be blocked by the opaque portion of the disk 1360 (i.e., the portion that has no aperture 1380-1391). Accordingly, as the disk 1360 rotates, the light is either transmitted through or blocked by the disk 1360 according to the pattern of the apertures 1380-1391 on the disk 1360.

The received light provides an n bit word (in the example of FIG. 13C a five-bit word) that indicates the position of the rotor shaft 150. The optical rotary position encoder may include a signal conditioner (not shown) that generates signals (e.g., a series of pluses) to encode the n-bit word output of the encoder. The output may be received by the processing unit 120. The processing unit may use the encoder's output to determine whether the shutoff valve is open or close and/or to determine the current position of the rotor shaft, for example, as described below with reference to FIGS. 26-28.

Figure 13D:
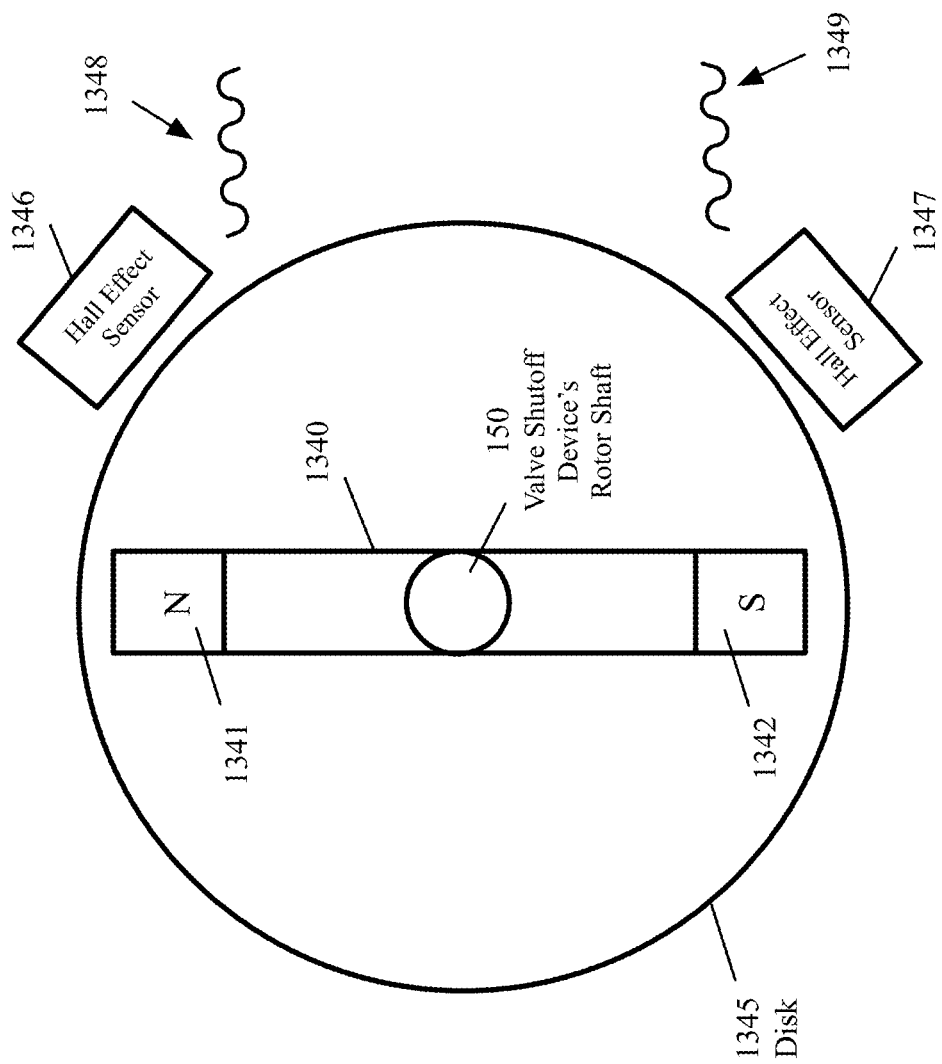
FIG. 13D is a schematic front view of a magnetic rotary position encoder installed on the rotor shaft of the valve shutoff device, according to various aspects of the present disclosure.

FIG. 13D is a schematic front view of a magnetic rotary position encoder installed on the rotor shaft of the valve shutoff device, according to various aspects of the present disclosure. With reference to FIG. 13C, the rotor shaft 150 may be similar to the rotor shaft 150 of FIG. 12C. The magnetic rotary position encoder includes a disk 1345, one or more magnets 1340, and one or more hall effect sensors 1346 and 1347. In the example of FIG. 13D, only one magnet 1340 and two hall effect sensors 0446 and 1347 are shown.

The magnet 1340 has a north pole 1341 and a south pole 1342. Higher precisions may be achieved by increasing the number of magnetic poles 1341-1342 and hall effect sensors 1346-1347. Each hall effect sensor measures the magnitude of a magnetic field and generates an output voltage that is directly proportional to the magnetic field strength going through the sensor. As the rotor shaft 150 rotates, each hall effect sensor 1346-1347 generates a sinusoidal wave 1348-1349, respectively. In the example of FIG. 13D, each sinusoidal wave 1348-1349 has a frequency that is equal to the rotational speed of the rotor shaft 150.

The hall effect sensor 1347 may be set 90 degrees apart from the hall effect sensor 1346 such that the hall effect sensor 1346 may generate a sine wave 1348 and the hall effect sensor 1347 may generate a cosine wave 1349. The sine wave 1348 and the cosine wave 1349 may be used to determine the direction of rotation of the rotor shaft 150. The sine wave 1348 and the cosine wave 1349 may be interpolated to determine the absolute position of the rotor shaft 150. The precision of the absolute position is increased by increasing the number of the magnetic poles 1341-1342 and the number of hall effect sensors 1346-1347.

The magnetic rotary position encoder may include a signal conditioner (not shown) that generates signals to encode the n-bit word output of the encoder. The output may be received by the processing unit 120. The processing unit may use the encoder's output to determine whether the shutoff valve is open or close and/or to determine the current position of the rotor shaft, for example, as described below with reference to FIGS. 26-28.

Although the shutoff valve actuator 1283 is free rotating, the rotary position encoder limit detector 1263 may be used to provide feedback to the motor 115 for turning the shutoff valve actuator with mechanical stop 1281 of FIGS. 12A-12B. For example, the rotary position encoder limit detector 1263 may be used to measure that the angular speed of the rotor shaft and the processing unit 120 may determine that the shutoff valve actuator has reached the machinal stop when the angular speed of the rotor shaft 150 becomes zero.

Figure 14:
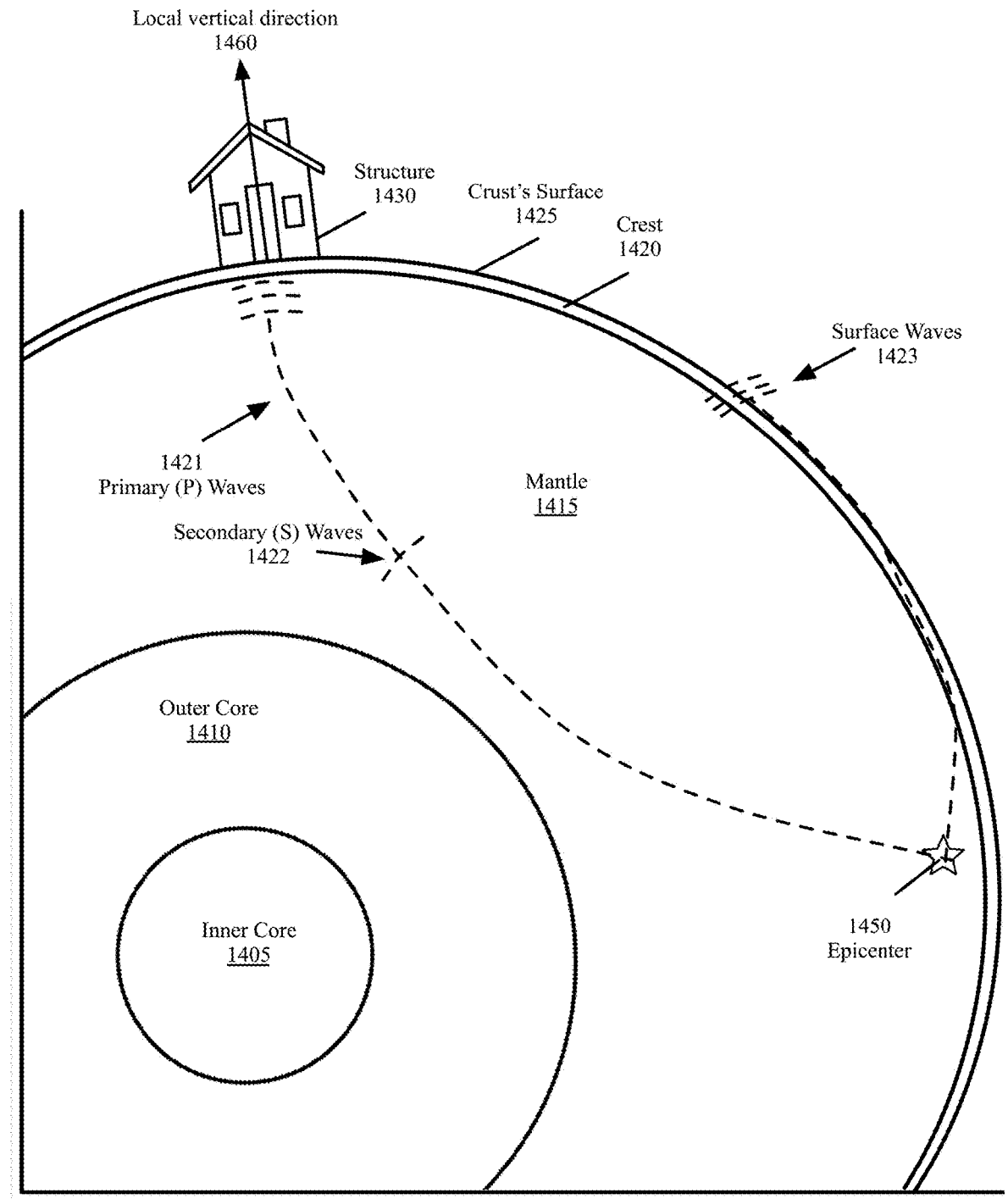
FIG. 14 is a functional diagram showing different types of seismic waves, according to prior art.

Some embodiments may use the seismic waves parameters measured by one or more sensors such as the IMU 135 (FIGS. 1A-1B and 12A-12C) to identify and determine the intensity of seismic activities. FIG. 14 is a functional diagram showing different types of seismic waves, according to prior art. With reference to FIG. 14, the seismic waves may include primary waves 1421 (or P waves), secondary waves 1422 (or S waves), and surface waves 1423. The seismic waves 1421-1423 may originate from an epicenter 1450 (e.g., an earthquake epicenter, an explosion epicenter, etc.) and may travel through different parts of Earth to reach a structure 1430.

The simplified view of Earth's structure in FIG. 14 shows the inner core 1405, the outer core 1410, the mantle 1415, and the crest 1420. The P-waves 1421 are the fastest seismic waves and are the first to reach a location (such as the structure 1430) after a seismic event. The P-waves 1421 are mostly compression waves and arrive at a substantially vertical angle when they reach the crust's surface 1425 as opposed to the S-waves 1422 and the surface waves 1422 that are substantially shear type waves that may arrive in all three dimensions.

The S-waves 1422 start from the epicenter 1450 at the same time as the P-waves 1421 and travel at about half the speed of the primary waves 1421. The P-waves 1410 and the S-waves 1422 may travel through the interior of Earth until they reach the crust's surface 1425. The P-wave 1421 and the S-wave 1422 are referred to as body waves.

The surface waves 1423 travel only through the crust 290 and the crest's surface 1425. The surface waves 1423 may have lower frequencies than the body waves 1421-1422 and are the most destructive of the seismic waves and may make the ground shake side by side or roll up and down.

The surface waves 1423 that move the ground from side to side are referred to as Love waves (named after the mathematician who first derived the mathematical model for these waves). The Love waves are the faster of the two surface waves. The surface waves 1423 that roll the ground up or down (similar to waves in an ocean) as well as side by side are referred to as Rayleigh waves (named after the mathematician who first predicted their existence). Most of the shaking caused by seismic activities are typically caused by Rayleigh waves.

In some of the present embodiments, the processing unit 120 of the valve shutoff device 100 may use an algorithm that distinguishes seismic waves caused by seismic activities from man-made vibrations and shuts off a shutoff valve on a fluid line when the seismic activities exceed a threshold. The algorithm may include an initial setup and a main loop.

The initial setup may be performed upon installation, power up, and/or reset where the valve shutoff device may be self-calibrated and self-oriented. The valve shutoff device may then enter the main loop that implements a state machine and moves between one of the following states. A no seismic activity state, an alert state, an armed state, and an end state. The state machine remains in the no seismic activity state when none of the P, S, or surface waves related to seismic activity is detected.

The state machine enters the alert state when the P-waves are detected and there is an expectation of further seismic activities. The state machine may move from the alert state into the armed state when the S-waves are detected after the P-waves. The state machine may move from the armed state into the end state when the magnitude of the seismic activities exceeds a threshold. The state machine may move from either the alert state or the armed state into the no seismic activity state if no seismic activities are detected for a threshold time period. In the end state, the valve shutoff device may close the shutoff valve on the fluid supply pipe to prevent a fluid leak in case the pipe ruptures during seismic activities. Further details of the operations performed for the identification and determination of the intensity of seismic activities are described below with reference to FIGS. 17-22.

In order to be able to differentiate the compression-type waves (e.g., P-waves) from the shear-type waves (e.g., the S or surface waves), the valve shutoff device may automatically learn/determine the orientation of the coordinate systems during installation, power up, or reset. In some embodiments, the IMU is in a chip such as a MEMS chip with miniaturized mechanical and electro-mechanical elements. The accelerometer of the IMU measures the acceleration parameters and the magnetometer of the IMU measures the magnetic field parameters in a coordinate system that is relative to the orientation of the IMU chip. When the valve shutoff device is installed on a fluid supply line 170 (FIG. 1B), the IMU chip may not be in the same orientation as the local coordinate system.

The valve shutoff device, therefore, requires translating the coordinate system used by the IMU into the local coordinate system, for example and without any limitations, to identify the local z-coordinate (i.e., the local vertical or up and down direction) in order to determine whether the parameters measured by the IMU are related to the P-waves 1421 (FIG. 14), which are compression waves that arrive substantially in the local vertical direction 1460.

The orientation may be determined by detecting the local vertical direction, z, by calculating the direction of gravity vector (g) using the 3D accelerometer and making the required coordinate transformation to differentiate the z direction from the x-y plane. The local vertical direction is in opposite direction of the gravity and always has a constant acceleration of gravity (g=−9.81 meters per square seconds, $m/s^2$) which is reported from three acceleration components, measured by the accelerometer.

Figure 15A:
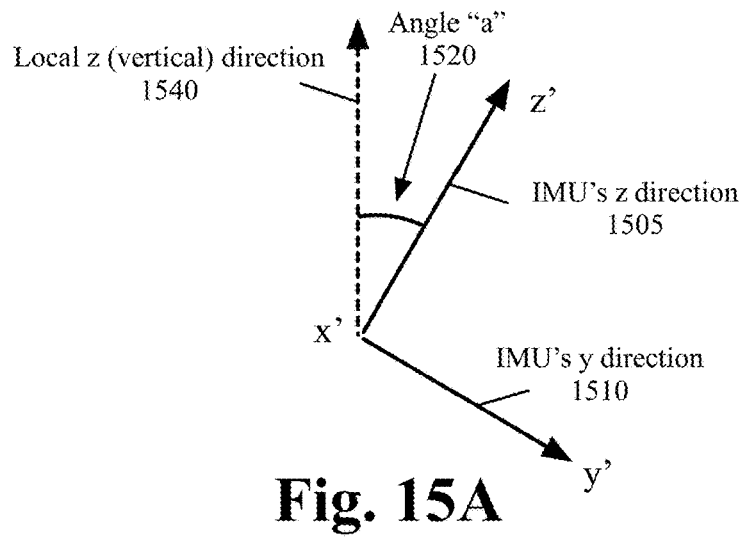
FIGS. 15A and 15B are functional diagrams illustrating the orientation of local coordinates versus the coordinates used by an accelerometer of a valve shutoff device, according to various aspects of the present disclosure.
Figure 15B:
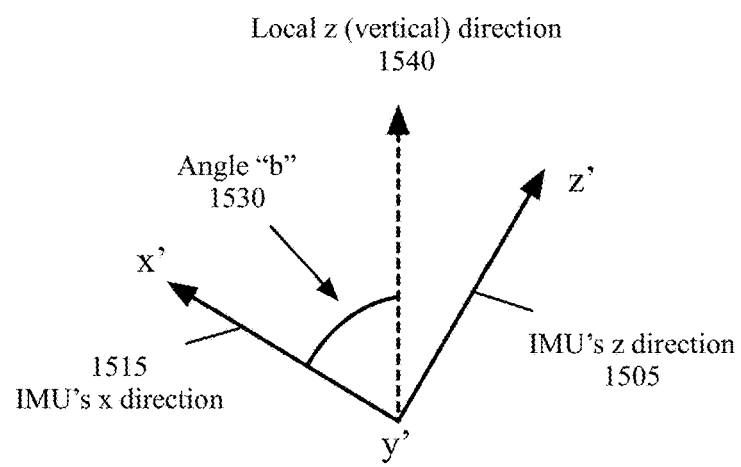

FIGS. 15A and 15B are functional diagrams illustrating the orientation of local coordinates versus the coordinates used by an accelerometer of a valve shutoff device, according to various aspects of the present disclosure. With reference to FIGS. 15A and 15B, the accelerometer may be a MEMS sensor that is using the coordinates 1505-1515 that are determined based on the orientation of a corresponding IC chip. For example, if the IC chip is in the shape of a rectangular box, the coordinates x' 1515 and y' 1510 used by the accelerometer may be parallel to the perpendicular sides of one of the box's surfaces and the coordinate z' 1505 may be perpendicular to the x' and y'.

With further reference to FIGS. 15A and 15B, the direction of gravity 1540 may be determined from the values of a three dimensional acceleration vector measured by the accelerometer. For example, the direction of gravity (which is always up in the local coordinates) may be determined from one or more values derived from the three dimensional acceleration vector.

The accelerometer may measure rotational angle "a" 1520 and the rotational angle "b" 1530 with respect to the gravity direction, which is along the local z (or vertical) direction 1540. The angles "a" 1520 and "b" 1530 represent the tilting of the IMU's vertical coordinate, z', with respect to the direction of gravity, which is the local vertical direction, z.

Figure 16:
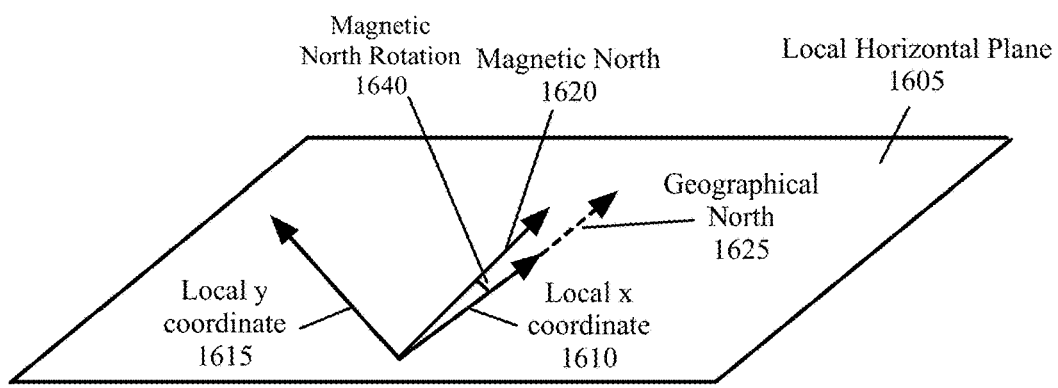
FIG. 16 is a functional diagram illustrating the rotation between the geographical north and the magnetic north at an exemplary location where a valve shutoff device is installed, according to various aspects of the present disclosure.

When the IMU 135 (FIGS. 1A-1B), in addition to a 3D accelerometer, is equipped with a 3D magnetometer, the two local horizontal directions x and y (which may not be the same x and y directions used by the IMU) may be resolved based on the detection of the local magnetic north. FIG. 16 is a functional diagram illustrating the rotation between the geographical north and the magnetic north at an exemplary location where a valve shutoff device is installed, according to various aspects of the present disclosure. With reference to FIG. 16, the magnetometer may detect the local magnetic north 1620 and determine the amount of magnetic north rotation 1640 with respect to the geographical north 1625.

The IMU's 3D magnetometer may measure the three components of magnetic field vector and may determine the magnetic north direction as the direction of the highest field. Since the magnetic north rotation 1640 is typically a small amount, some of the present embodiments may set the geographical north 1625 direction to the magnetic north direction 1620.

As discussed above, in some of the present embodiments, the processing unit 120 and the IMU 135 may be in a SIP. In some of these embodiments, the SIP may include firmware and/or software that implements a motion engine. The motion engine may include digital signal processing firmware or software that may receive raw motion data from the MEMS sensors (e.g., the accelerometer and/or the magnetometer) and may translate the raw data into motion information.

For example, and without limitations, some of the present embodiments may use a SIP such as BNO080 or BNO085 SIP developed by Hillcrest Labs. The BNO080 or BNO085 SIPs include a firmware "motion engine", which may perform coordinate rotation operations. For example, the BNO080 or BNO085 SIPs may include a "tare" function that uses quaternion mathematics to perform coordinate rotation from the IMU's frame of reference (x', y', z') to the local coordinate (x, y, z). This function, which may be invoked by the processing unit, may remove the burden of computational resources from the processing unit by performing the computations with firmware. The quaternion is a number system that extends the complex numbers. Quaternions are represented in the form of a+bi+cj+d k, where a, b, c, and d are real numbers and i, j, and k are the symbols that can be interpreted as unit-vectors pointing along the three spatial axes. The "taring" allows the SIP to be mounted in the valve shutoff device 100 in an arbitrary manner and invoking the tare function may determine the orientation that needs to be applied to the outputs to align with the local coordinates (e.g., up, north, east) frame of reference. This orientation may then be applied to all motion outputs.

In the example of FIG. 16, the local horizontal plane 1605 is perpendicular to the local z direction (or the opposite direction of gravity). The local x coordinate 1610 is in the local horizontal plane 1605 and, in this example, is set along the geographical north 1625. In the embodiments that set the magnetic north rotation 1640 to 0, the local x coordinate 1610 is set along the magnetic north direction 1620.

The local y coordinate 1615 is set in the local horizontal plane 1605 at 90 degrees to the local x coordinate 1610. The horizontal x 1610 and y 1615 directions, in some embodiments, may be used in reporting or recording the direction of propagation of incoming seismic waves and reporting the direction to the cloud/backend server(s) 1210 (FIGS. 12A-12C) to help in global studies and analysis.

Details of the operations performed for the identification and determination of the intensity of seismic activities are described below with reference to FIGS. 17-22. As described below, one of the key features of the algorithm to determine whether the shutoff valve is to be closed due to seismic activities is avoiding false-positive triggers, without unnecessarily increasing the threshold used for the detection of the surface waves 1423 (FIG. 14), which are the most destructive of the seismic waves.

The algorithm may identify and distinguish various components of seismic activities in order to eliminate false positives and to close the valve when the intensity of the seismic waves exceed a threshold. The algorithm attempts to differentiate between seismic waves and man-made vibratory noises, such as without any limitations, a sudden jerk (e.g., an object, like a ball or a toy, accidentally hitting the valve shutoff device and/or the associated pipes), vibrations (e.g., a truck moving near the valve shutoff device), or bursty vibrations (e.g., a jackhammer operating in the neighborhood, and thus vibrating the ground and the pipes).

This differentiation, in some of the present embodiments, may be made based on the known features of the seismic waves such as the frequency content (spectrum), the duration and the shape of the wave envelope (much like the amplitude modulation (AM) wave detection in radio communication systems), or calculating a "power" ratio of various vibration components.

Figure 17:
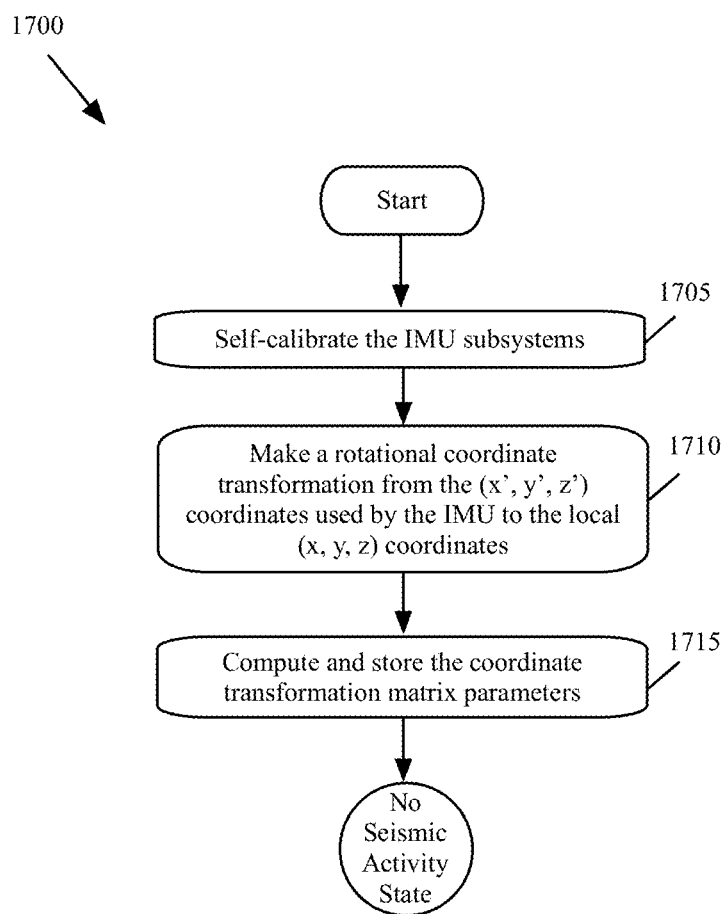
FIG. 17 is a flowchart illustrating an example process for performing an initial setup for identification and determination of the intensity of seismic activities, according to various aspects of the present disclosure.

FIG. 17 is a flowchart illustrating an example process 1700 for performing an initial setup for identification and determination of the intensity of seismic activities, according to various aspects of the present disclosure. The process 1700, in some of the present embodiments, may be performed by the processing unit 120 (FIGS. 12A-12C) and/or by firmware of a valve shutoff device 100 during installation, power up, and/or reset of the valve shutoff device 100.

With reference to FIG. 17, the subsystems of the IMU may be self-calibrated (at block 1710) as needed. For example, the IMU MEMS chip in some embodiments may have built-in self-calibration. In these embodiments, the processing unit 120 may send a signal to the IMU 125 to perform self-calibration.

Next, a rotational coordinate transformation may be made (at block 1710) from the (x', y', z') coordinates used by the IMU to the local coordinates (x, y, z). The x and y may be in the two local horizontal directions 1610 and 1615 (FIG. 16) (e.g., east-west and north-south directions) and z may be in the local vertical direction (e.g., direction of the local zenith). The coordinate transformation matrix parameters may be computed and stored (at block 1715). The processing may then proceed to the "no seismic activity" state, which is described below with reference to FIG. 19.

The specific operations of the process 1700 may not be performed in the exact order shown and described. Furthermore, the specific operations described with reference to FIG. 17 may not be performed in one continuous series of operations in some embodiments, and different specific operations may be performed in different embodiments. For example, in some aspects of the present embodiments, the rotational coordinate transformation from the (x', y', z') coordinates used by the IMU to the local coordinates (x, y, z) may be made (at block 1710) by performing a process such as process 1800 described below with reference to FIG. 18.

In other embodiments, the rotational coordinate transformation from the (x', y', z') coordinates used by the IMU to the local coordinates (x, y, z) may be made (at block 1710), for example and without any limitations, by the processing unit and/or by firmware by performing a predefined function of a motion engine such as the tare function described above. In some aspects of the present embodiments, the coordinate transformation matrix parameters may be computed and stored (at block 1715) by the processing unit 120 and/or by firmware.

Figure 18:
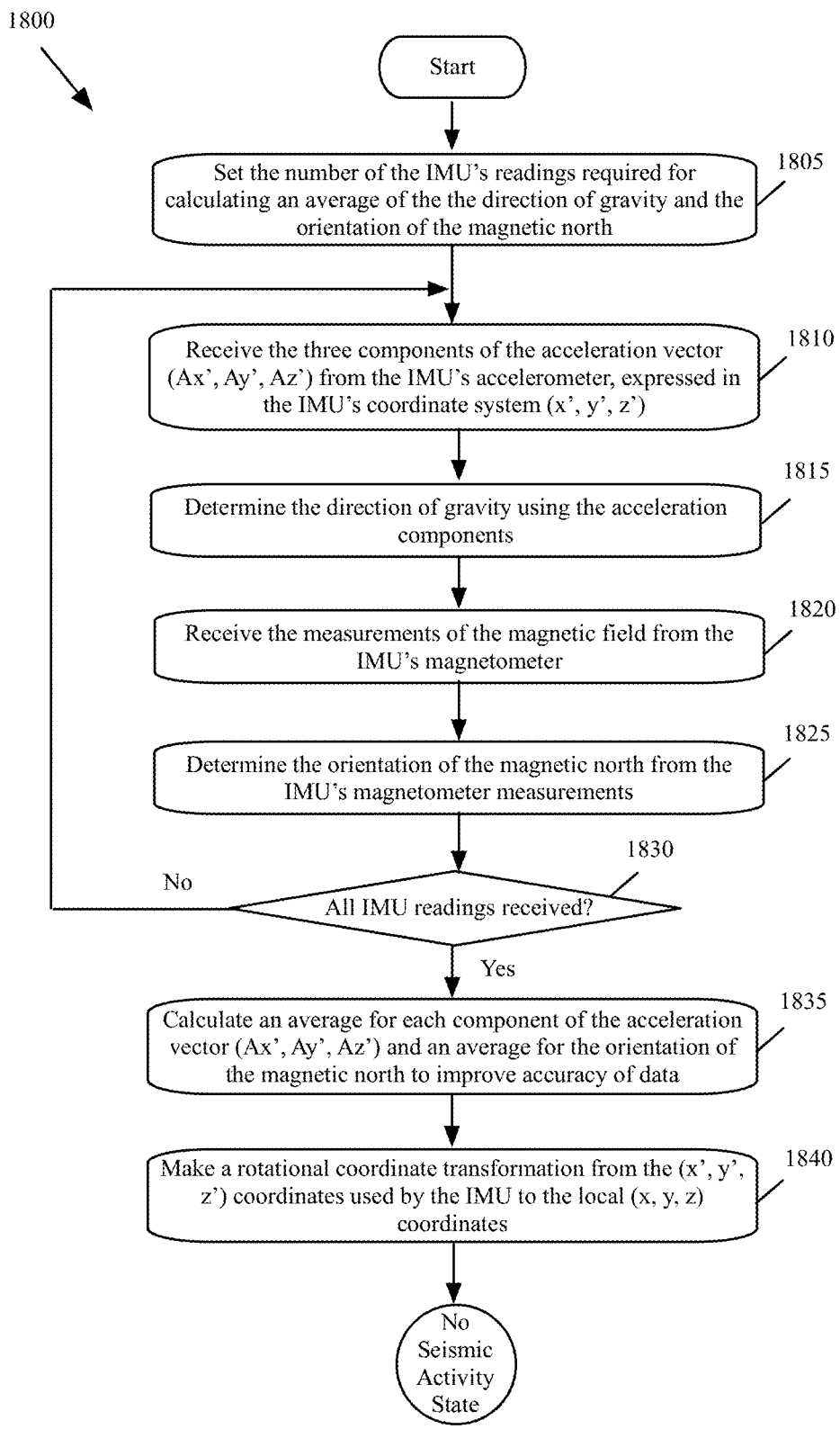
FIG. 18 is a flowchart illustrating an example process 1800 for performing the rotational coordinate transformation from the (x', y', z') coordinates used by the IMU to the local coordinates (x, y, z), according to various aspects of the present disclosure.

FIG. 18 is a flowchart illustrating an example process 1800 for performing the rotational coordinate transformation from the (x', y', z') coordinates used by the IMU to the local coordinates (x, y, z), according to various aspects of the present disclosure. The process 1800, in some of the present embodiments, may be performed by the processing unit 120 (FIGS. 12A-12C) and/or by firmware of a valve shutoff device 100 during installation, power up, and/or reset of the valve shutoff device 100. Process 1800, in some of the present embodiments, provides details of block 1710 of FIG. 17.

With reference to FIG. 18, the number of the IMU's orientation readings used for getting an average orientation reading may be set (at block 1805). The number of the IMU's orientation readings is denoted as N in the following equations. This number, which may be an integer greater or equal to 1, may be a predetermined value, may be set during the provisioning of the valve shutoff device (e.g., through the client device 2535 of FIGS. 25, 31, and 39), or may be provided by the cloud/backend servers 1210 (FIGS. 12A-12C and 36) over the network(s) 1290.

In some embodiments, any other constants used by the processes of FIGS. 18-22 may be a predetermined value, may be set during the provisioning of the valve shutoff device, or may be provided by the cloud/backend servers 1210. Some of the present embodiments may not get an average of orientation readings. In these embodiments, the value of N is set to 1. With reference to FIG. 18, a loop with N iterations may be performed through blocks 1810-1830.

The three components of the acceleration vector ($A_x'$, $A_y'$, $A_z'$) may be received (at block 1810) from the IMU's accelerometer, expressed in the IMU's coordinate system (x', y', z'). The direction of gravity may be determined (at block 1815) using the acceleration vector's parameters. For example, the direction of gravity may be determined as described above with reference to FIGS. 15A-15B.

Next, the measurements of the magnetic field may be received (at block 1820) from the IMU's magnetometer. The orientation of the magnetic north may be determined (at block 1825) from the parameters measured by IMU's magnetometer. For example, the orientation of magnetic north may be determined as described above with reference to FIG. 16. Next, a determination may be made (at block 1830) whether all N IMU's readings are received. If not, the processing may proceed to block 1810, which was described above.

Otherwise, an average for each component of the acceleration vector (Ax', Ay', Az') and an average for the orientation of the magnetic north may be calculated (at block 1835), for example to improve the accuracy of data. In the embodiments that N is set to 1, the blocks 1830 and 1835 may be skipped. Next, a rotational coordinate transformation may be made (at block 1840) from the (x', y', z') coordinates used by the IMU to the local coordinates (x, y, z). The x and y may be in the two local horizontal directions 1610 and 1615 (FIG. 16) (e.g., east-west and north-south directions) and z may be in the local vertical direction (e.g., direction of the local zenith). The processing may then end.

Figure 19:
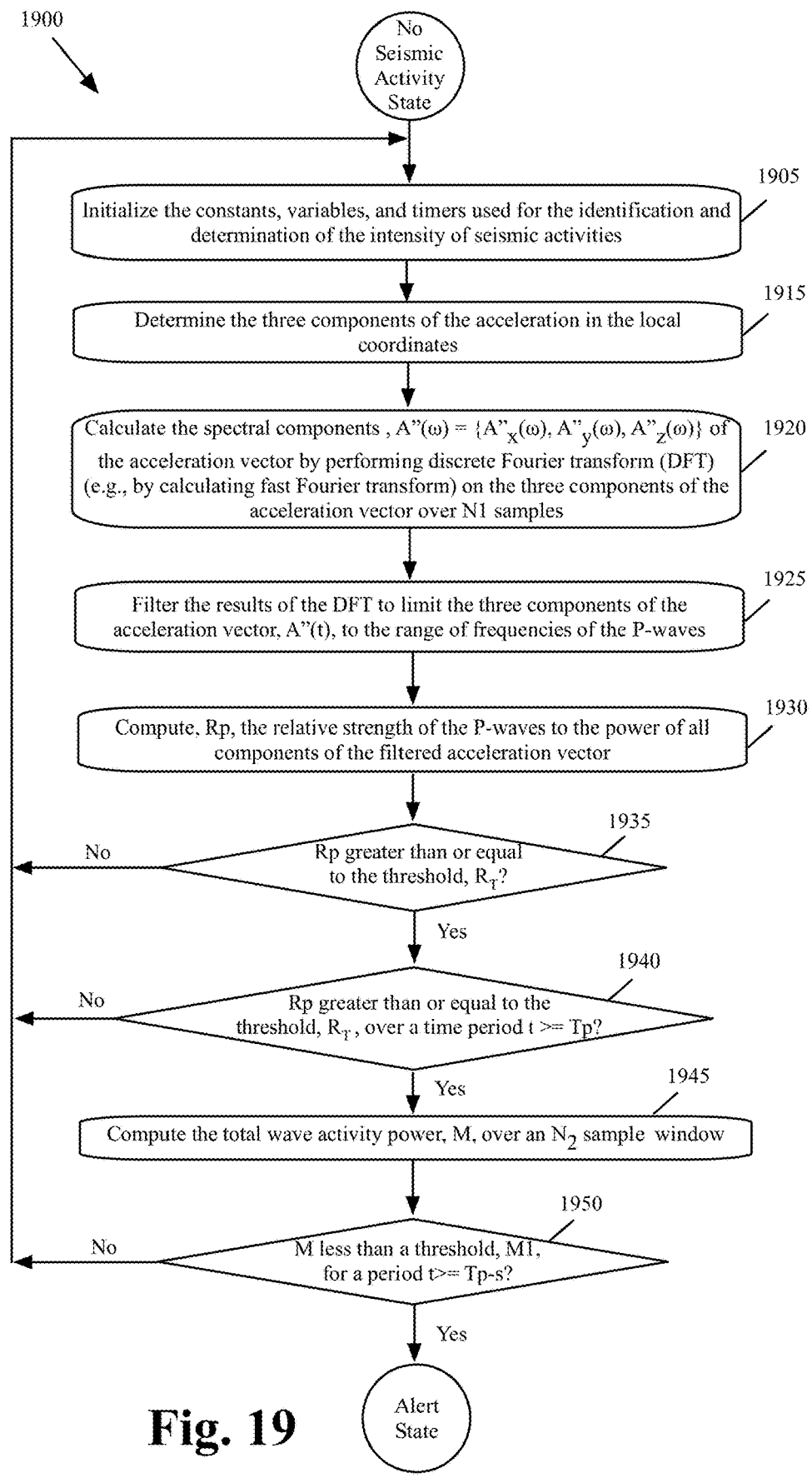
FIG. 19 is a flowchart illustrating an example process for identifying P-waves related to seismic activities, according to various aspects of the present disclosure.

FIG. 19 is a flowchart illustrating an example process 1900 for identifying P-waves related to seismic activities, according to various aspects of the present disclosure. The process 1900, in some of the present embodiments, may be performed by the processing unit 120 (FIGS. 12A-12C) and/or the firmware of a valve shutoff device 100.

With reference to FIG. 19, the constants, variables, timers and variables used for the identification and determination of the intensity of seismic activities may be initialized (at block 1905). The followings are an exemplary list of the constants, variables, and timers that may be used in some of the present embodiments.

N1: The number of samples (or time) used for discrete Fourier transformation (DFT)

RT: The threshold value for the ratio of the power of P-wave (the vertical component of the acceleration vector) to the total power of all components of the acceleration vector Tp: The minimum duration threshold of the P-wave activity Tp-s: The minimum quiet period between P and S waves Ts: The minimum expected duration of the S wave activity T3: The time threshold for the surface waves magnitude for executing the shutoff procedure N2: The number of samples for measuring the P-waves power ratio N3: The number of samples for measuring the S-waves power N4: The number of samples for measuring the surface waves power M1: The low activity threshold M2: The magnitude threshold for the armed state M3: The shut-off magnitude threshold Lt: The loop timer Tout-1: The timeout value for detecting the S-waves Tout-2: The timeout value for detecting the surface waves With further reference to FIG. 19, the three components of the acceleration vector in the local coordinates may be determined (at block 1915). In some of the present embodiments, the three components of the acceleration vector in the local coordinates may be computed by firmware (e.g., the firmware associated with a motion engine). For example, the firmware may perform a coordinate rotations from the (x', y', z') coordinates used by the IMU to the local coordinates (x, y, z). The gravity may in some embodiments be subtracted from the z acceleration components.

In other embodiments, the processing unit 120 may compute the three components of the acceleration vector in the local coordinates. For example, the processing unit 120 may the three components of the acceleration vector ($A_x'$, $A_y'$, $A_z'$) may be received (at block 1915) from the IMU's accelerometer. The processing unit 120 may perform a coordinate rotation (transformation) to compute the acceleration vector relative to the local coordinate system (x, y, z). The coordinate rotation (transformation) may be performed by using the parameters received in the initial setup state (FIG. 17) for identifying the directions of gravidity and the local magnetic north. The processing unit 120 may subtract gravity from the z acceleration components.

At block 1920, discrete Fourier transform may be performed on the three components of the acceleration vector, $A(t)=\{A_x(t), A_y(t), A_z(t)\}$ over N1 samples in order to obtain the spectral components, $A''(\omega)=\{A''_x(\omega), A''_y(\omega), A''_z(\omega)\}$ of the acceleration vector. For example, some embodiments may perform a fast Fourier transform (FFT) algorithm to compute the discrete Fourier transform of the components of the acceleration vector, A"(ω). In order to distinguish seismic waves from man-made vibrations, some embodiments may filter the parameters received from the IMU to limit the data to the frequencies of the seismic waves. Performing the DFT (or FFT) converts the normalized (re-oriented) IMU measurements to a function of frequency, allowing the measurements to be filtered by their frequencies as described below.

Next, the results of the DFT is filtered (at block 1925) to limit the three components of the acceleration vector to the range of frequencies of the P-waves. In some of the present embodiments, the three components of the acceleration vector may be filtered to components with frequencies in the range of frequencies of the P-waves to eliminate the components (e.g., the components caused by man-made activities) that are not related to the P-waves. Eliminating these components are similar to applying a band pass filter in the range of frequencies of the P-waves to the parameters received from the IMU. The band limited acceleration vector, as a function of time, is referred herein as $A''(t)=\{A''_x(t), A''_y(t), A''_z(t)\}$.

Next, the relative power of the P-waves to the power of all components of the acceleration vector may be computed (at block 1930). Since the P-waves are mostly compression waves and propagate from below the surface of the earth, the P-waves arrive substantially in the vertical direction. The P-waves may, therefore, be identified by analyzing the vertical component of the acceleration vector, i.e., the z component, $A''_z(t)$, of the band-limited acceleration vector, $A''(t)$ with respect to the local coordinate system.

The relative power of the P-waves, in some embodiments, may be computed as the ratio, $R_p$, of the magnitude of the envelope of the normalized (and band-limited) vertical component of the acceleration to the normalized horizontal component. In other embodiments, the ratio of the magnitude of power (under the curve) of the vertical component to the total seismic vector power magnitude ($A''^2$) is computed as shown in Equation (2) and the result is compared with the threshold value $R_T$. When the P-waves arrive, the ratio of the vertical power to the total power increases above a threshold value and may then slowly decrease.

The relative strength of the P-wave to the total vector power ratio is given in Equation (2):

$$R_p = \frac{\sum_{t=1}^{N1} A''^2_z(t)}{\sum_{t=1}^{N1} (A''^2_x(t) + A''^2_y(y) + A''^2_z(t))} \qquad \text{Eq. (2)}$$

where, $A''_x(t), A''_y(t), A''_z(t)$ are instantaneous acceleration components along each local coordinate axes after filtering, and $R_P$ is the ratio of the vertical vibrations' power to the total vibrations' power in the three directions.

With further reference to FIG. 19, a determination may be made (at block 1935) whether the relative strength of the P-wave to the total vector power ratio is greater than or equal to a threshold, $R_T$. If not, the P-waves are not detected and the processing may proceed to block 1905, which was described above.

Otherwise, a determination may be made (at block 1940) whether the P-waves bursts have lasted for a time period, $T_p$. The valve of $R_p$ may be monitored and if for a period $t>=T_p$, the value is greater than or equal to the threshold, $R_T$, the processing may proceed to block 1945, which is described below. Otherwise, the P-waves are not detected and the processing may proceed to block 1905, which was described above. In some embodiments, the determination of whether the P-waves bursts have lasted for a time period is optional. These embodiments may skip block 1940.

At block 1945, the total wave activity power magnitude over an $N_2$ sample window may be computed as shown by Equation (3):

$$M = \sum_{t=1}^{N2}(A''^2_x(t) + A''^2_y(t) + A''^2_z(t)) \qquad \text{Eq. (3)}$$

Since the P-waves travel faster than the S-waves, the detection of the P-waves may be followed by a period of relatively low activity, $T_{p-s}$. At block 1950, a determination may be made whether M is less than the threshold $M_1$ for a time period $t>=T_{p-s}$. If not, the P-waves are not detected and the processing may proceed to block 1905, which was described above. Otherwise, the detection of the P-waves is conformed and the processing may proceed to the alert state, which is described below with reference to FIG. 20.

When the epicenter of the seismic waves is close to where the valve shutoff device is installed, the S-waves may arrive in a relatively short time period after the P-waves. In some of the present embodiments, the valve of $T_{p-s}$ may be set to a small value (e.g., less than 5 seconds, less then 1 second, less than a fraction of a second, etc.) to account for the situations where the epicenter may be close to the location of the valve shutoff device. Some of the present embodiments may set the $T_{p-s}$ to 0. These embodiments may skip blocks 1945 and 1950.

Some of the present embodiments may close the shutoff valve after detecting the P-waves and without waiting for the S-waves or surface waves to be detected. In these embodiments, after the P-waves are detected, the processing may proceed to the end state (instead of the alert state), described below with reference to FIG. 22, to close the shutoff valve.

Figure 20:
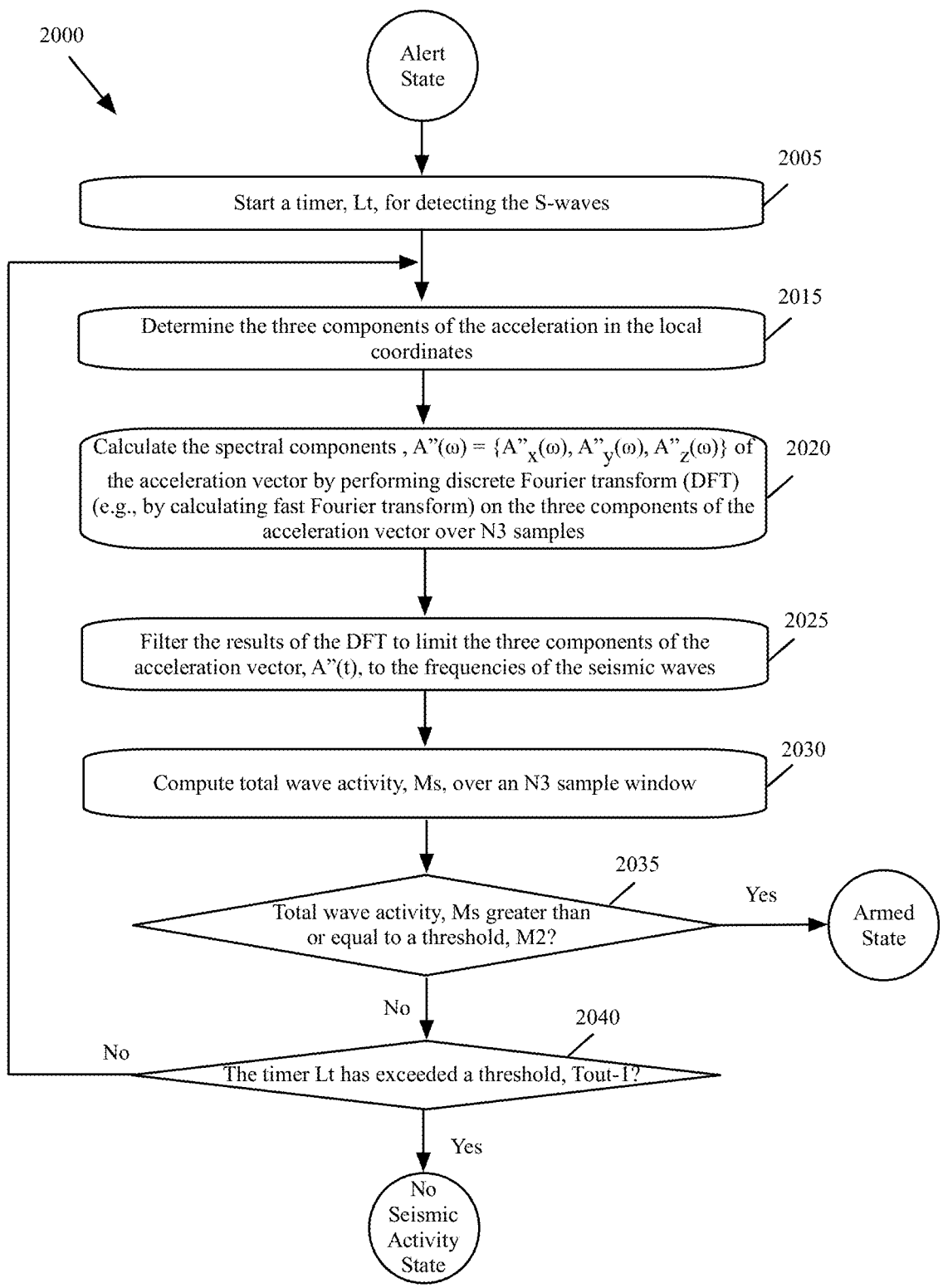
FIG. 20 is a flowchart illustrating an example process for identifying the S-waves related to seismic activities, according to various aspects of the present disclosure.

FIG. 20 is a flowchart illustrating an example process 2000 for identifying the S-waves related to seismic activities, according to various aspects of the present disclosure. The process 2000, in some of the present embodiments, may be performed by the processing unit 120 (FIGS. 12A-12C) and/or the firmware of a valve shutoff device 100.

With reference to FIG. 20, a timer, Lt, may be started (at block 2005) for detecting S-waves. Next, the three components of the acceleration vector in the local coordinates may be determined (at block 2015). In some of the present embodiments, the three components of the acceleration vector in the local coordinates may be computed by firmware (e.g., the firmware associated with a motion engine). For example, the firmware may perform a coordinate rotations from the (x', y', z') coordinates used by the IMU to the local coordinates (x, y, z). The gravity may in some embodiments be subtracted from the z acceleration components.

In other embodiments, the processing unit 120 may compute the three components of the acceleration vector in the local coordinates. For example, the processing unit 120 may the three components of the acceleration vector $(A_x', A_y', A_z')$ may be received (at block 2015) from the IMU's accelerometer. The processing unit 120 may perform a coordinate rotation (transformation) to compute the acceleration vector relative to the local coordinate system (x, y, z). The coordinate rotation (transformation) may be performed by using the parameters received in the initial setup state (FIG. 17) for identifying the directions of gravity and the local magnetic north. The processing unit 120 may subtract gravity from the z acceleration components.

At block 2020, discrete Fourier transform may be used on the three components of the acceleration vector, A (t)={$A_x$(t), $A_y$(t), $A_z$(t)} over $N_3$ samples to obtain A" ($\omega$)={A"$_x$($\omega$), A"$_y$($\omega$), A"$_z$($\omega$)}. For example, some embodiments may perform a fast Fourier transform (FFT) algorithm to compute the discrete Fourier transform of the components of the acceleration vector, A (t).

Next, the results of the DFT may be filtered (at block 2025) to band-limit the three components of the acceleration vector, A"($\omega$), to the range of frequencies of the seismic waves. For example, the three components of the acceleration vector, A (t), may be filtered to components with frequencies of the seismic waves to eliminate the components (e.g., the components caused by man-made activities) that are not related to the seismic waves. Eliminating these components are similar to applying a band pass filter in the range of the seismic waves to the parameters received from the IMU after coordinate transformation from the IMU's coordinates into the local coordinates (e.g., by performing a "taring" function as described above). The band-limited acceleration vector, in time-domain, is referred herein as A"(t)={A"$_x$(t), A"$_y$(t), A"$_z$(t)}. During the alert state, the range of frequencies that are considered may be different than the range of frequencies considered for the detection of the P-waves during the "no seismic activity" state.

With further reference to FIG. 20, the total wave activity power magnitude over an $N_3$ sample window may be computed (at block 2030) as shown in Equation (4):

$$M_S = \Sigma_{t=1}^{N3}(A"_x{}^2(t) + A"_y{}^2(t) + A"_z{}^2(t)) \quad \text{Eq. (4)}$$

where, A"$_x$(t), A"$_y$(t), A"$_z$(t) are the instantaneous band-limited acceleration components along each local coordinate axes. Since the S-waves may have any polarization, Equation (4) computes the total vector magnitude (power) of the seismic waves.

Next, a determination may be made (at block 2035) whether the total wave activity power magnitude over an $N_3$ sample window exceeds a threshold, $M_2$. If yes, S-waves are detected and the processing may proceed to the armed state, which is described below with reference to FIG. 21. Otherwise, a determination may be made (at block 2040) whether the timer Lt has exceeded a threshold, Tout-1. If not, the processing may proceed to block 2010, which was described above. Otherwise, the time period for expecting the S-waves is expired and the processing may proceed to the "no seismic activity" state, which was described with reference to FIG. 17.

Some of the present embodiments may close the shutoff valve after detecting the S-waves and without waiting for the surface waves to be detected. In these embodiments, when the determination is made (at block 2035) that the total wave activity power magnitude over an $N_3$ sample window exceeds a threshold, $M_2$ (i.e., when the S-waves are detected), the processing may proceed to the end state (instead of the armed state), described below with reference to FIG. 22, to close the shutoff valve.

Figure 21:
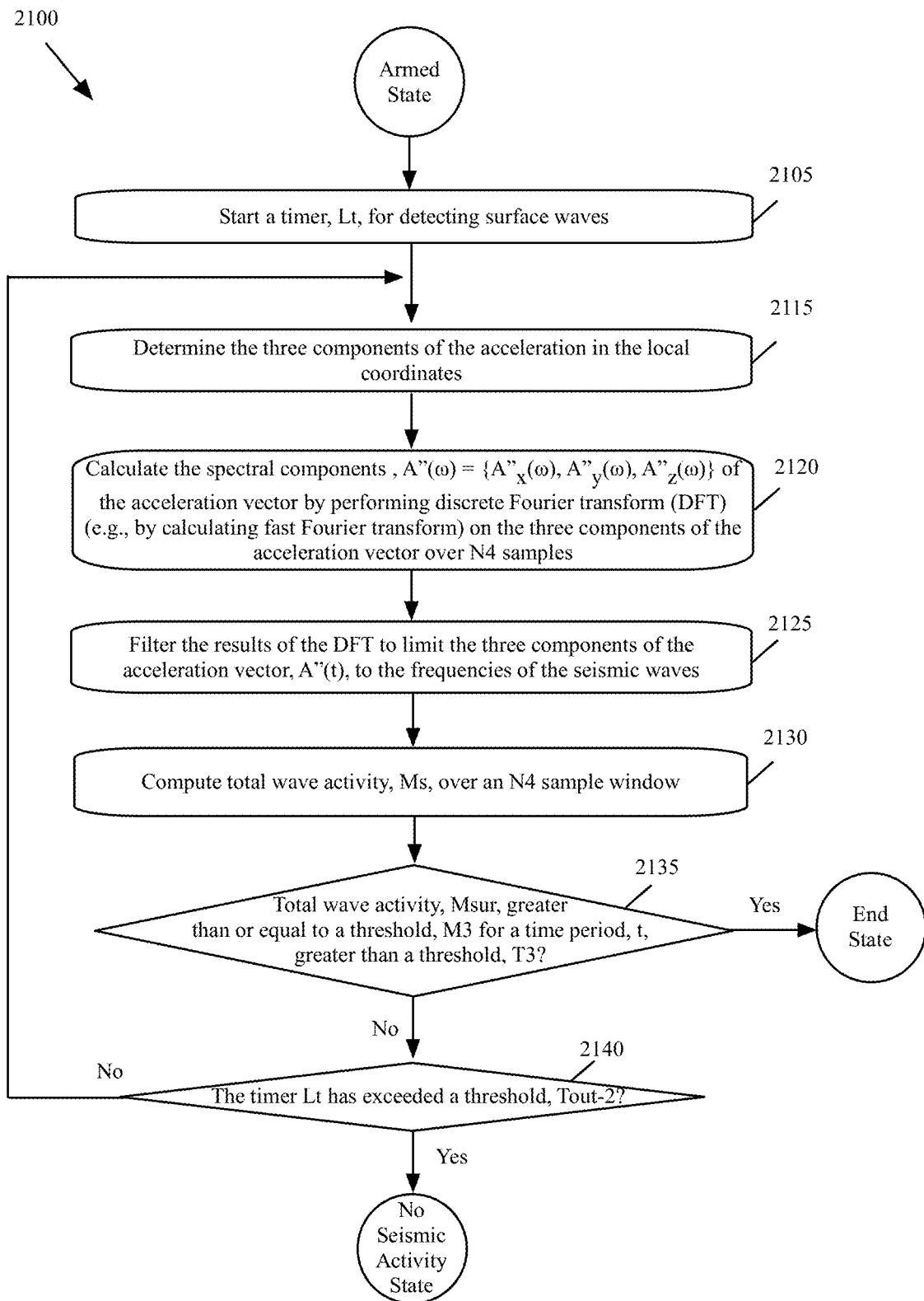
FIG. 21 is a flowchart illustrating an example process for identifying the surface waves related to seismic activities, according to various aspects of the present disclosure.

FIG. 21 is a flowchart illustrating an example process 2100 for identifying the surface waves related to seismic activities, according to various aspects of the present disclosure. The process 2100, in some of the present embodiments, may be performed by the processing unit 120 (FIGS. 12A-12C) and/or the firmware of a valve shutoff device 100.

With reference to FIG. 21, a timer, Lt, may be started (at block 2105) for detecting the surface waves. As described above with reference to FIG. 14, the surface waves 1423 may include the Love waves and the Rayleigh waves.

Next, the three components of the acceleration vector in the local coordinates may be determined (at block 2115). In some of the present embodiments, the three components of the acceleration vector in the local coordinates may be computed by firmware (e.g., the firmware associated with a motion engine). For example, the firmware may perform a coordinate rotations from the (x', y', z') coordinates used by the IMU to the local coordinates (x, y, z). The gravity may in some embodiments be subtracted from the z acceleration components.

In other embodiments, the processing unit 120 may compute the three components of the acceleration vector in the local coordinates. For example, the processing unit 120 may the three components of the acceleration vector ($A_x'$, $A_y'$, $A_z'$) may be received (at block 2115) from the IMU's accelerometer. The processing unit 120 may perform a coordinate rotation (transformation) to compute the acceleration vector relative to the local coordinate system (x, y, z). The coordinate rotation (transformation) may be performed by using the parameters received in the initial setup state (FIG. 17) for identifying the directions of gravidity and the local magnetic north. The processing unit 120 may subtract gravity from the z acceleration components.

At block 2120, discrete Fourier transform may be used on the three components of the acceleration vector, A (t)={$A_x$(t), $A_y$(t), $A_z$(t)} over $N_4$ samples to obtain the frequency-domain vector A ($\omega$)={$A_x$($\omega$), $A_y$($\omega$), $A_z$($\omega$)}. For example, some embodiments may perform a fast Fourier transform (FFT) algorithm to compute the discrete Fourier transform of the components of the acceleration vector, A"($\omega$).

Next, the results of the DFT may be filtered (at block 2125) to band-limit the three components of the acceleration vector, A"(t), to the range of frequencies of the seismic waves. The three components of the acceleration vector, A (t), may be filtered to components in the range of frequencies of the seismic waves to eliminate the components that are not related to the seismic waves (e.g., the components caused by man-made activities). Eliminating these components are similar to applying a band pass filter in the range of frequencies of the seismic waves to the parameters received from the IMU. The band-limited acceleration vector is referred herein as A"(t)={A"$_x$(t), A"$_y$(t), A"$_z$(t)}. In some of the present embodiments, the range of frequencies that are considered during the armed state may be similar to the range of frequencies considered during the alert state, which may be wider than the range of frequencies considered for the detection of the P-waves during the "no seismic activity" state.

With further reference to FIG. 21, the total wave activity power magnitude over an $N_4$ sample window may be computed (at block 2130) as shown in Equation (5):

$$M_{Sur} = \Sigma_{t=1}^{N4}(A"_x{}^2(t) + A"_y{}^2(t) + A"_z{}^2(t)) \quad \text{Eq. (5)}$$

where, A"$_x$(t), A"$_y$(t), A"$_z$(t) are instantaneous band-limited acceleration components along each local coordinate axes. Equation (5) in some embodiments is similar to Equation (4) used for detecting the S-waves.

Next, a determination may be made (at block 2135) whether the total wave activity power magnitude over an $N_4$ sample window, Msur, exceeds a threshold, $M_3$ over a time period t greater than a threshold, T3. In the armed state, the Love and Rayleigh seismic activity components are expected. These waves are characterized by high intensity acceleration in all three directions. Therefore, the magnitude of the acceleration vector may be used to identify an occurrence of a severe earthquake and its severity or intensity. The threshold $M_3$ may be higher than the threshold $M_2$ used above for detecting the S-waves.

When the total wave activity power magnitude over an $N_4$ sample window, Msur, is determined (at block 2135) to exceed the threshold, $M_3$ over the time period t greater than a threshold, T3, the surface waves are detected and the processing may proceed to the end state, which is described below with reference to FIG. 22. Otherwise, a determination may be made (at block 2140) whether the timer Lt has exceeded a threshold, Tout-2. If not, the processing may proceed to block 2110, which was described above. Otherwise, the time period for expecting the surface waves is expired and the processing may proceed to the "no seismic activity" state, which was described with reference to FIG. 17.

Figure 22:
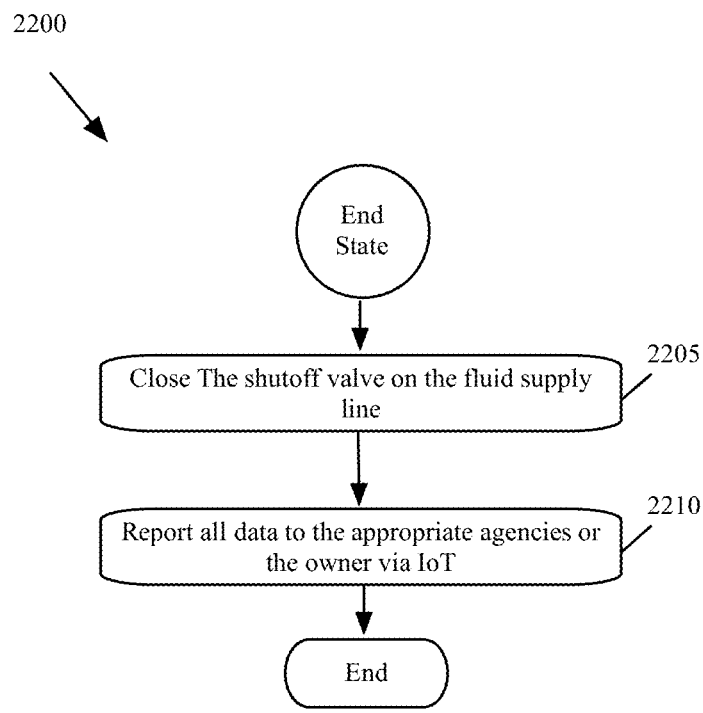
FIG. 22 is a flowchart illustrating an example process for closing a shutoff valve on a fluid supply line after the surface waves related to seismic activities exceed a threshold, according to various aspects of the present disclosure.

FIG. 22 is a flowchart illustrating an example process 2200 for closing a shutoff valve on a fluid supply line after the surface waves related to seismic activities exceed a threshold, according to various aspects of the present disclosure. The process 2200, in some of the present embodiments, may be performed by the processing unit 120 (FIGS. 12A-12C) of a valve shutoff device 100.

With reference to FIG. 22, the shutoff valve on the fluid supply line may be closed (at block 2205). For example, the processing unit 120 (FIG. 1B) may send a signal to the motor 115 to turn the rotor shaft 150 and the valve coupling key 145 in order to turn the shutoff valve actuator 180 and close the shutoff valve 175. Several examples of processes for closing the shutoff valve are described below with reference to FIGS. 23-24 and 27-28.

With further reference to FIG. 22, one or more data items related to the seismic activities may be sent (at block 2210) to one or more electronic devices. The examples of the data items sent to the one or more electronic devices may include without limitations, the status of the shutoff valve (e.g., open or close), the parameters received from the accelerometer, the parameters received from the magnetometer, the calculations related to the power and/or the duration of the P-waves, the calculations related to the power and/or the duration of the S-waves, the calculations related to the power and/or the duration of the surface waves, the time period between the detection of the P-waves and S-waves, the time period between the detection of the S-waves and surface-waves, the location of the valve shutoff device, etc.

The data items may be sent by the processing unit 120 (FIGS. 12A-12C) through the radio transceiver 125, the antenna 135, and the network(s) 1280 one or more of the electronic devices 1205 and/or one or more of the cloud/backend servers 1210. The processing may then end. In some of the present embodiments, the valve shutoff device may include a global positioning system (GPS) chip. In these embodiments, the location of the valve shutoff device may be determined through the GPS.

In some of the present embodiments, the location of the shutoff valve (e.g., a physical address and/or the geographic coordinates (e.g., the longitude and the latitude) of the location where the shutoff valve is installed may be entered through a client device 2535 (FIG. 25) during the provisioning of the valve shutoff device. Some of the present embodiments may not send any data. These embodiments may skip block 2210.

Figure 23:
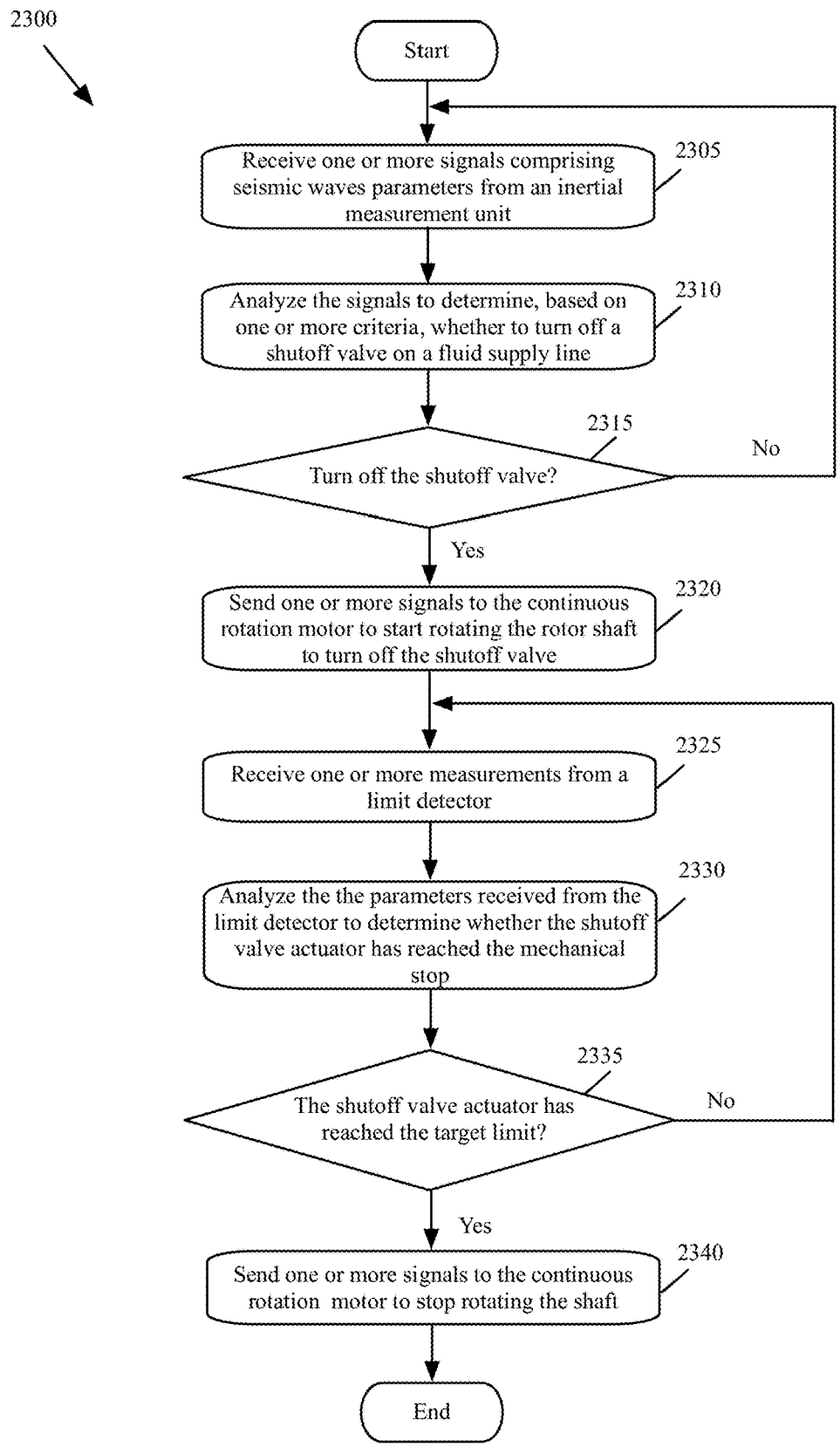
FIG. 23 is a flowchart illustrating an example process for turning of a shutoff valve, which has a mechanical stop, by a processing unit based on the analysis of seismic waves, according to various aspects of the present disclosure.

FIG. 23 is a flowchart illustrating an example process 2300 for turning off a shutoff valve that has a mechanical stop, by a continuous rotation motor, according to various aspects of the present disclosure. A continuous rotation motor may be a motor without a feedback loop. The continuous rotation motor may be a motor that lacks a feedback loop or may be a servomotor that is modified to offer open-loop position control instead of the usual closed-loop position control. A continuous rotation motor may need to receive a set of one or more signals to start rotating and another set of one or more signals to stop rotating. In some of the present embodiments, the process 2300 may be performed by the processing unit 120 (FIGS. 1A-1B and 12A-12C).

With reference to FIG. 23, one or more signals comprising seismic waves parameters may be received (at block 2305) from an IMU. For example, the processing unit 120 (FIG. 12A) may receive one or more parameters related to seismic waves 1421-1423 of FIG. 14 from the IMU 135.

With further reference to FIG. 23, the signals 2310 may be analyzed (at block 2310) to determine, based on one or more criteria, whether to turn off a shutoff valve on a fluid supply line. For example, the processing unit 120 (FIG. 12A) may analyze the seismic waves parameters as described above with reference to FIGS. 17-22 to determine whether the seismic activities are above a threshold (e.g., a threshold to ensure the seismic activities, when translated into the Richter scale, are above a predetermined limit such as for example and without limitations, 5.2 level, 5.3 level, 5.4 level, etc.)

Next, a determination may be made (at block 2315) whether to turn off the shutoff valve. For example, the processing unit 120 may determine whether to turn off the shutoff valve based on the analysis. The details of blocks 2305-2315 were described above with reference to FIGS. 17-22. When it is determined (at block 2315) that the shutoff value is not to be turned off, the processing may return to block 2305, which was described above. Otherwise, one or more signals may be sent (at block 2320) to the continuous rotation motor to start rotating the rotor shaft to turn off the shutoff valve. For example, the processing unit 120 may send a signal to the motor 150 (FIGS. 1A-1B and 12A-12C) to start rotating the rotor shaft 150 to turn off the shutoff valve 175.

At block 2325, one or more parameters from a limit detector may be received. Since the motor in the example of process 2300 is a continuous rotation motor and the shutoff valve actuator 1281 has a mechanical stop, the processing unit 120 has to know when the shutoff valve actuator is no longer rotating in order to turn off the motor.

The limit detector, in some of the present embodiments, may be a force or torque limit detector 1261 (FIGS. 12A and 13A) and the parameters received from the limit detector 1261 may include measurements of force and/or torque exerted on the rotor shaft 150. The limit detector in some embodiments may be a motor current limit detector 1262 (FIGS. 12B and 13B) and the parameters received from the limit detector 1262 may include measurements of electrical current used by the motor 115. The limit detector in some embodiments may be a rotary position encoder 1263 such as the optical rotary position encoder of FIG. 13C or the magnetic rotary position encoder of FIG. 13D and the measurements may include the position and/or the speed of the rotor shaft 150.

With further reference to FIG. 23, the parameters received from the limit detector may be analyzed (at block 2330) to determine whether the shutoff valve actuator has reached the mechanical stop. For example, if the limit detector is a force or torque limit detector, the processing unit 120 may determine whether the force or torque exerted on the rotor shaft 150 has exceeded a limit. If the limit detector is a motor current limit detector, the processing unit 120 may determine that the current used by the motor 115 has exceeded a limit. If the limit detector is a rotary encoder, the processing unit 120 may determine that the rotational speed of the rotor shaft 150 has reached zero and/or whether the angular position of the rotor shaft 150 has reached a predetermined angle.

At block 2335, a determination may be made whether the shutoff valve actuator has reached the target limit (e.g., a mechanical stop). If not, the processing may proceed to block 2325, which was described above. Otherwise, one or more signals may be sent (at block 2340) to the continuous rotation motor to stop rotating the shaft. The processing may then end.

Figure 24:
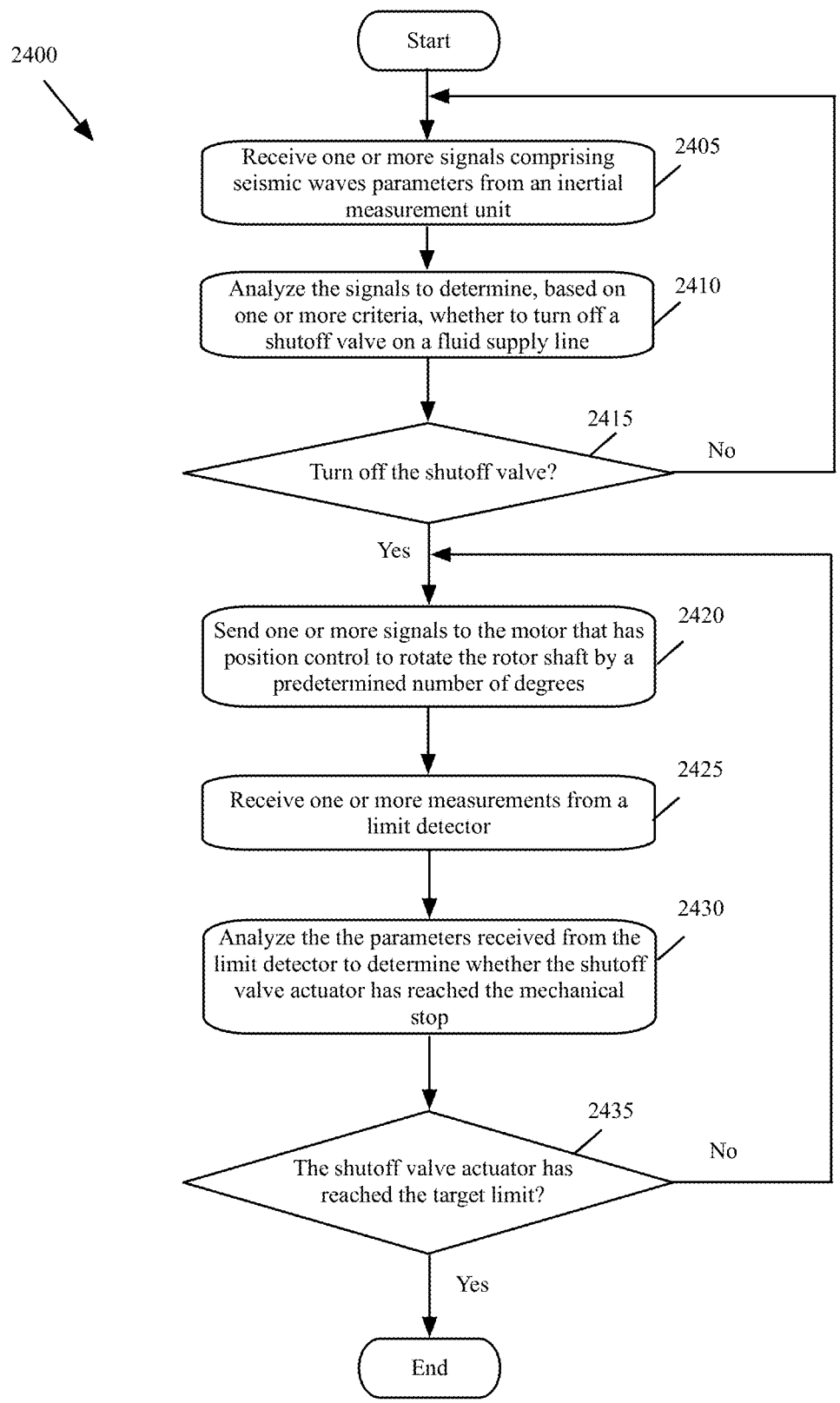
FIG. 24 is a flowchart illustrating an example process for turning off a shutoff valve, which has a mechanical stop, by a motor that has position control, according to various aspects of the present disclosure.

FIG. 24 is a flowchart illustrating an example process 2400 for turning off a shutoff valve, which has a mechanical stop, by a motor that has position control, according to various aspects of the present disclosure. In some of the present embodiments, the process 2400 may be performed by the processing unit 120 (FIGS. 12A-12C).

A motor with position control may be a servomotor that is a motor with a feedback circuitry, for example, and without any limitations, a potentiometer, and a control circuit. As the servomotor rotates, the potentiometer's resistance may change and the control circuit may precisely control how much movement is made by the servomotor and in which direction. The processing unit 120 of the automatic valve shutoff device 100 may send one or more signals and/or commands to the control circuit of the servomotor to rotate the rotor shaft 150 by a certain amount.

A motor with position control may be a stepper motor (or step motor). A stepper motor divides a full rotation into a number of equal steps. The motor's position may then be controlled by sending signals to the motor to move and hold at one of these steps.

With reference to FIG. 24, blocks 2405-2415 are similar to blocks 2305-2315 of FIG. 23, respectively. The details of blocks 2305-2315 and 2405-2415 were described above with reference to FIGS. 17-22. At block 2420, one or more signals may be sent to the motor that has position control to rotate the rotor shaft by a predetermined number of degrees (or number of turns). For example, the processing unit 120 may send a signal or command to the motor 115 to turn the rotor shaft 150 by a number of degrees. The rotor shaft 150 may be connected to the valve coupling key 145, which in turn may be engaged with the shutoff valve level 180.

The shutoff valve actuator 180 may, for example, be the shutoff valve lever 180 (FIG. 2) or the ball valve handle 1005 (FIG. 10) that typically turns 90 degrees from open to close. The processing unit may not know whether the shutoff valve is currently open, closed, or partially closed. The shutoff valve actuator 180 may, for example, be the gate valve handwheel 800 (FIG. 8) that may need to be turned around several times in order to be closed. The processing unit may not know the current position of the handwheel and/or how many turns the handwheel 800 has be turned to close. The processing unit may, therefore, send one or more signals or commands to the motor (at block 2420) to turn the rotor shaft 150 in a direction that closes the valve and check one or more parameters to make sure the shutoff valve actuator 180, the handle 1005, or the handwheel 800 have reached the mechanical stop and the valve is closed.

With further reference to FIG. 24, one or more measurements may be received (at block 2425) from a limit detector. The limit detector may be one of the limit detectors described above with reference to block 2325 of FIG. 23. The limit detector may be external to or an integral part of the servomotor. For example, the limit detector may be a potentiometer that is integral to the motor.

With continued reference to FIG. 24, the parameters received from the limit detector may be analyzed (at block 2430) to determine whether the shutoff valve actuator has reached the mechanical stop. For example, if the limit detector is a force or torque limit detector, the processing unit 120 may determine whether the force or torque exerted on the rotor shaft 150 has exceeded a limit. If the limit detector is a motor current limit detector, the processing unit 120 may determine that the current used by the motor 115 has exceeded a limit. If the limit detector is a rotary encoder, the processing unit 120 may determine that the rotational speed of the rotor shaft 150 has reached zero and/or whether the angular position of the rotor shaft 150 has reached a predetermined angle.

At block 2435, a determination may be made whether the shutoff valve actuator has reached the target limit (e.g., a mechanical stop). If not, the processing may proceed to block 2420, which was described above. Otherwise, the processing may end.

In some aspects of the present embodiments, the shutoff valve actuator 180 (FIG. 2) or the ball valve handle 1005 (FIG. 10) may be free rotating devices. For example, the ball valve connected to the shutoff valve actuator 180 or the ball valve handle 1005 may be free rotating ball valves. The ball valve may open or close the fluid supply line 170 (FIG. 1A) after each 90 degree turns but the valve may not have a mechanical stop and may keep on rotating when a force or torque is applied to it. A ball valve may initially have a mechanical stop that may become worn out over time, causing the ball valve to freely rotate.

Figure 25:
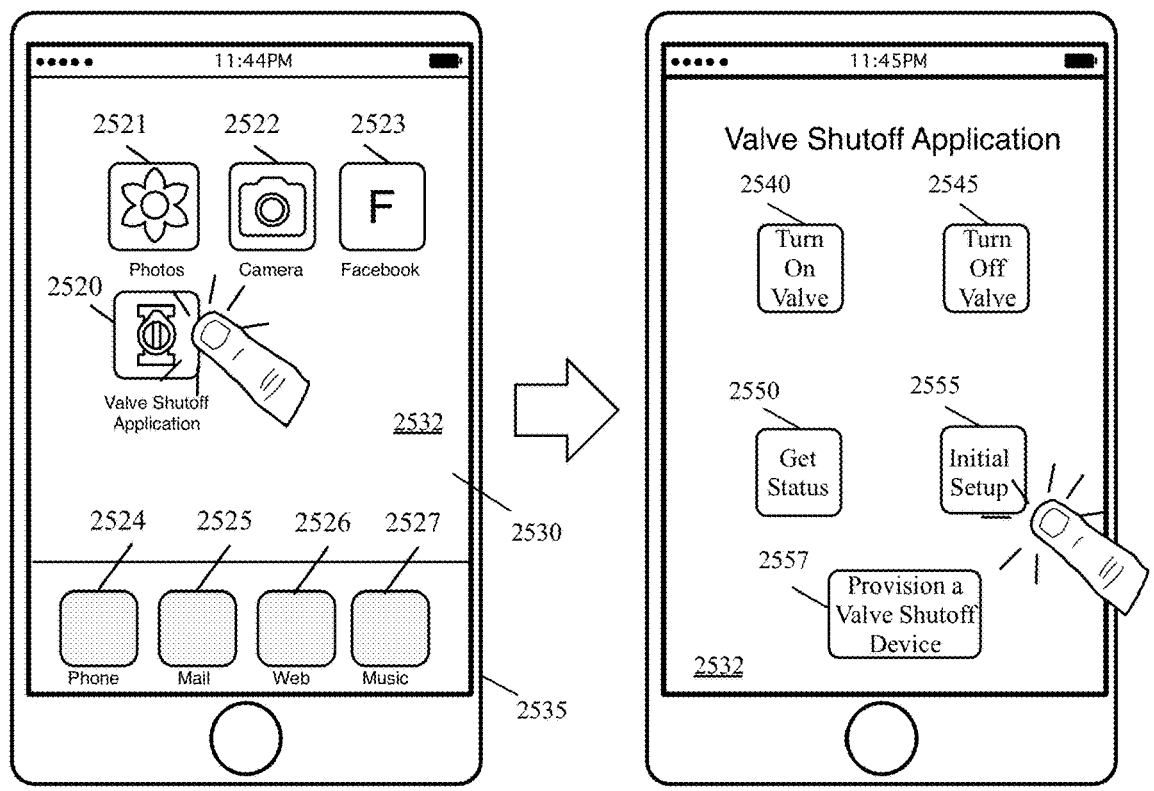
FIG. 25 is a schematic front view of a client device that may include an application program for identifying the position of the rotor shaft when the valve is on or off, according to various aspects of the present disclosure.
Figure 25:
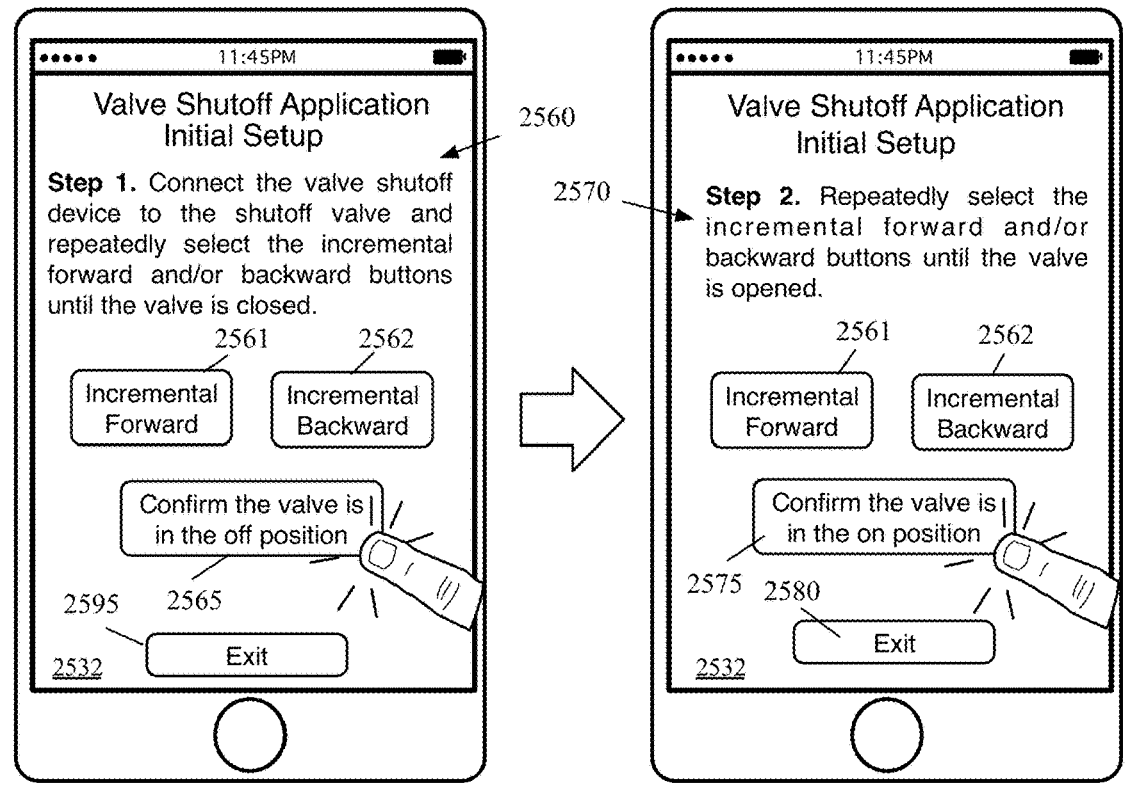

In some of the present embodiments, the processing unit may learn the positions of the rotor shaft when the valve is on or off. FIG. 25 is a schematic front view of a client device 2535 that may include an application program for identifying the position of the rotor shaft when the valve is on or off, according to various aspects of the present disclosure. The figure illustrates, through four stages 2501-2504, a client device 2535 using an application program 2520 to identify the position of the rotor shaft when the valve is on or off.

With reference to FIG. 25, stage 2501 shows a graphical user interface (GUI) 2532 displayed on a display (e.g., a touch screen) 2530 of the client device 2535, which may include several selectable user interface (UI) items (e.g., icons) of several applications 2520-2527. As shown, the valve shutoff application 2520 is selected in stage 2501. In response to the selection of the valve shutoff application 2520, the GUI 2532 in stage 2502 may display several options 2540-2557. The valve shutoff application 2520 may be a program that is installed on the client device 2535 to provision, setup, and/or control a valve shutoff device.

The "provision a valve shutoff device" option 2557 may be selected to associate a valve shutoff device with the client device 2535. For example, the client device 2535 may be one of electronic devices 1205 in FIGS. 12A-12C and the client device 2535 and the valve shutoff device 100 may be connect to the network(s) 1290. The client device and the valve shutoff device may discover each other. The valve shutoff device 100 may be provisioned to recognize the client device 2535 as a client device that is authorized to communicate and exchange signals, commands, and data with the valve shutoff device 100.

During the provisioning, one or more data items related to the valve shutoff device may be set. For example, the GUI 2532 may include an option (not shown) for entering the physical address and/or the geographical coordinates (e.g., the latitude and the longitude) of the location where the shutoff valve is being installed. In some of the present embodiments, the valve shutoff device 100 may include a GPS component (e.g., a GPS receiver chip). In these embodiments, the location information (e.g., the geographical coordinates) may be automatically set by the valve shutoff device without the client device intervention. The location information may be used, for example, to send the location of the valve shutoff device to one or more electronic devices as described above with reference to FIG. 22. In the example of FIG. 25, it is assumed that the valve shutoff device is already provisioned using the provision option 2557.

As shown in step 2502, the initial setup option 2555 may be selected. In response to the selection of the initial setup option 2555, the GUI 2532 in stage 2503 may display an incremental forward option 2561, an incremental backward option 2562, an option 2565 to confirm that the valve is placed in the off position, and an option 2595 to exit. The GUI 2532 may display a message 2560 requesting the valve shutoff device to be connected to the manual shutoff valve and the incremental forward 2561 and/or the incremental backward 2562 buttons to be repeatedly selected until the valve is closed.

Each selection of the incremental forward 2561 option may cause the client device 3335 to send a signal to the valve shutoff device 100 to rotate the rotor shaft 150 by a number of degrees in a direction (e.g., in clockwise or counter clockwise direction). Each selection of the incremental backward 2562 option may cause the client device 2535 to send a signal to the valve shutoff device 100 to rotate the rotor shaft 150 by a number of degrees in the opposite direction (e.g., in counter clockwise or clockwise direction).

In stage 2503, the option 2565 is selected (e.g., after the shutoff valve is turned off by selecting options 25361 and/or 2562 one or more times). As described below with reference to FIG. 26, the client device 2535 may send a signal to the processing unit 120 to measure and store the current position of the rotor shaft 150 as the position corresponding to the shutoff valve being turned off.

In response to the selection of the option 2565, the GUI 2532 in stage 2504 may display a message 2570 requesting the incremental forward 2561 and/or the incremental backward 2562 buttons to be repeatedly selected until the valve is opened. The GUI 2532, in stage 2504, may provide the incremental forward option 2561, the incremental backward option 2562, an option 2575 to confirm the valve is placed in the on position, and an option 2580 to exit. In stage 2504, the option 2575 is selected (e.g., after the shutoff valve is turned on by selecting options 25361 and/or 2562 one or more times). As described below with reference to FIG. 26, the client device 2535 may send a signal to the processing unit to measure and store the current position of the rotor shaft 150 as the position corresponding to the shutoff valve being turned on.

Figure 26:
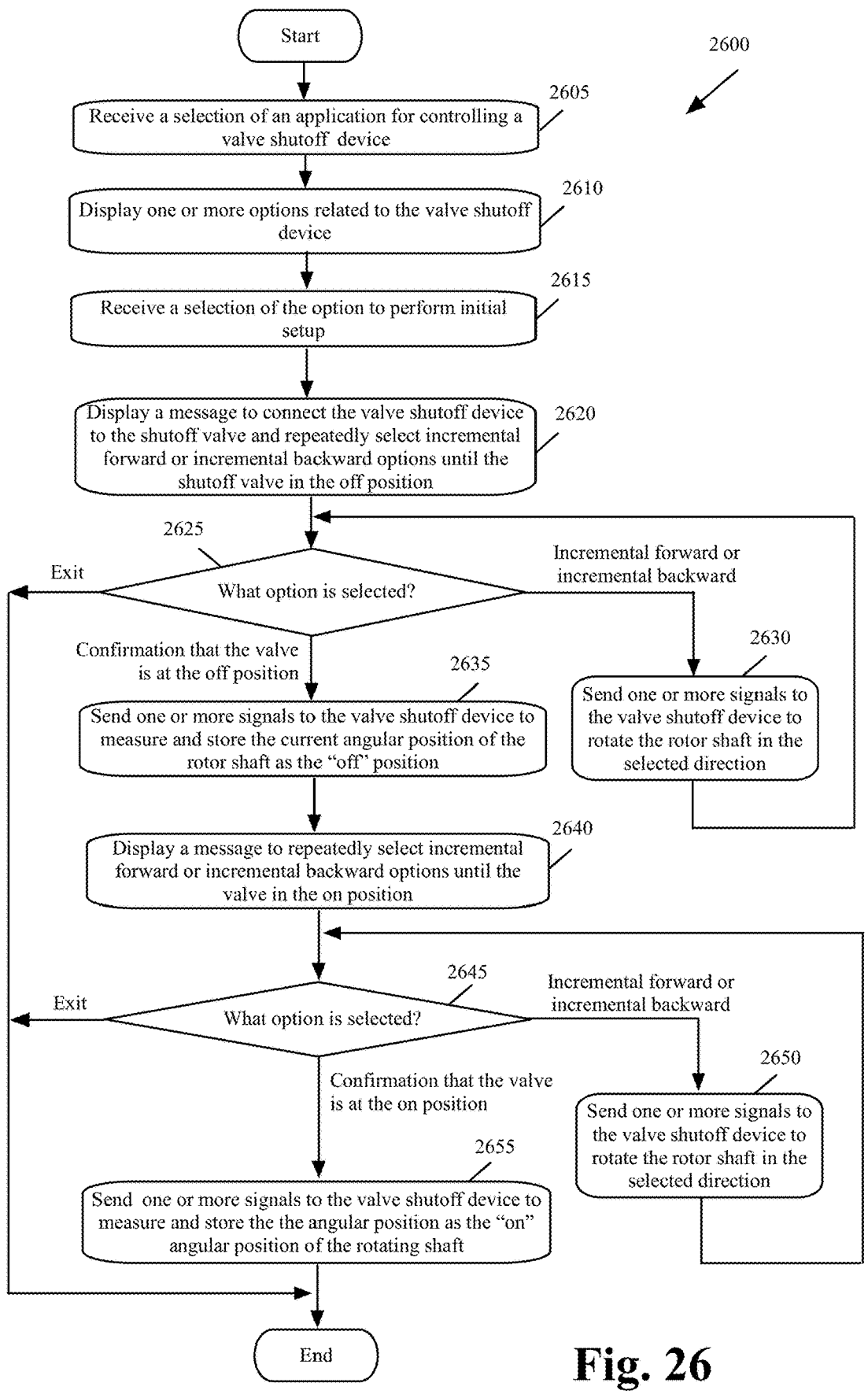
FIG. 26 is a flowchart illustrating an example process for identifying the on and off positions of a shutoff valve, according to various aspects of the present disclosure.

FIG. 26 is a flowchart illustrating an example process 2600 for identifying the on and off positions of a shutoff valve, according to various aspects of the present disclosure. In some of the present embodiments, the process 2600 may be performed by a processing unit of the client device 2535 of FIG. 25.

With reference to FIG. 26, at block 2605, a selection of an application for controlling a valve shutoff device may be received. For example, a selection of the valve shutoff application 2520 may be received in stage 2501 of FIG. 25. In response to the selection of the application, one or more options related to the valve shutoff device may be displayed (at block 2610). For example, options 2540-2557 may be displayed in stage 2502 of FIG. 26.

At block 2615, a selection of the option to perform initial setup may be received. For example, a selection of the initial setup option 2555 may be received in stage 2502 of FIG. 25. In response to the selection of the initial setup option, a message may be displayed (at block 2520) to connect the valve shutoff device to the shutoff valve and repeatedly select an incremental forward option and/or an incremental backward option until the shutoff valve is closed. For example, the client device 2535 may display the message 2560 of stage 2503 (FIG. 25).

Next, the option selected may be determined (at block 2625). When the selected option is the incremental forward or the incremental backward, one or more signals may be sent (at block 2630) to the valve shutoff device to rotate the rotor shaft in the selected direction. For example, the client device 2535 (FIG. 25) or an electronic device 1205 (FIGS. 12A-12C) may send one or more signals to the valve shutoff device 100 to rotate the rotor shaft 150 by a predetermined number of degrees (or turns, fraction of turn, etc.) in either clockwise or counter clockwise direction based on which one of the incremental forward or the incremental backward options is selected. The processing may then return to block 2625, which was described above.

With reference to FIG. 26, when the selected option at block 2625 is exit, the processing may end. For example, when the option 2595 of FIG. 25 is selected, the valve shutoff application 2520 may be terminated. With further reference to FIG. 26, when the selected option is the confirmation that the shutoff valve 175 is in the off position, one or more signals may be sent (at block 2635) to the valve shutoff device to measure and store the current angular position of the rotor shaft as the "off" position. The signals may cause the processing unit 120 of the valve shutoff device 100 to use, for example, the measurements provided by a rotary position encoder (FIGS. 13C-13D) while the rotor shaft 150 was rotating to determine the position of the rotor shaft 150 when the motor stops.

Next, a message may be displayed (at block 2540) to repeatedly select the incremental forward option and/or the incremental backward option until the valve is opened. For example, the client device 2535 may display the message 2570 of stage 2504 (FIG. 25). Next, the option selected may be determined (at block 2645). When the selected option is the incremental forward or the incremental backward, one or more signals may be sent (at block 2650) to the valve shutoff device to rotate the rotor shaft in the selected direction. For example, the client device 2535 (FIG. 25) or an electronic device 1205 (FIGS. 12A-12C) may send one or more signals to the valve shutoff device 100 to rotate the rotor shaft 150 by a predetermined number of degrees (or turns, fraction of turn, etc.) in either clockwise or counter clockwise direction based on which one of the incremental forward or the incremental backward options is selected. The processing may then return to block 2645, which was described above.

With reference to FIG. 26, when the selected option is exit, the processing may end. For example, when the option 2580 of FIG. 25 is selected, the valve shutoff application 2520 may be terminated. With reference to FIG. 26, when the selected option is the confirmation that the shutoff valve 175 is in the on position, one or more signals may be sent (at block 2655) to the valve shutoff device to measure and store the current angular position of the rotor shaft as the "on" position. The signals may cause the processing unit 120 of the valve shutoff device 100 to use, for example, the measurements provided by a rotary position encoder (FIGS. 13C-13D) while the rotor shaft 150 was rotating to determine the position of the rotor shaft 150 when the motor stops. The processing may then end.

Figure 27:
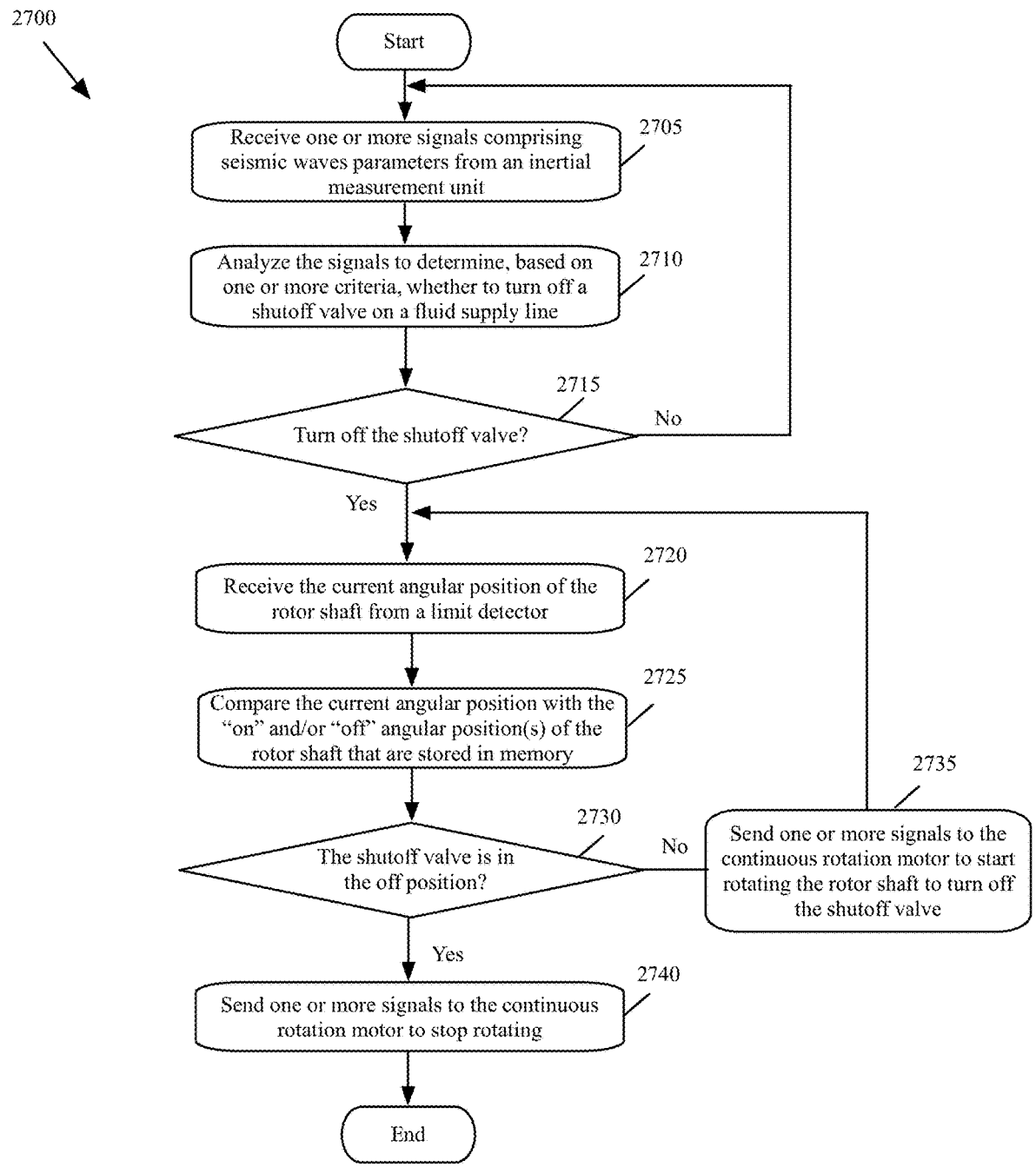
FIG. 27 is a flowchart illustrating an example process for turning off a shutoff valve by a continuous rotation motor using the stored angular positions of the rotor shaft that correspond to the "on" and/or "off" positions of the shutoff valve, according to various aspects of the present disclosure.

After the angular positions of the rotor shaft that correspond to the "on" and "off" positions of the shutoff valve are measured and stored by the valve shutoff device, these positions may be used to move the rotor shaft to open or close the shutoff valve. FIG. 27 is a flowchart illustrating an example process 2700 for turning off a shutoff valve by a continuous rotation motor using the stored angular positions of the rotor shaft that correspond to the "on" and/or "off" positions of the shutoff valve, according to various aspects of the present disclosure. In some of the present embodiments, the process 2700 may be performed by a processing unit 120 of a valve shutoff device 100 (FIG. 12C).

With reference to FIG. 27, blocks 2705-2715 are similar to blocks 2305-2315 of FIG. 23, respectively. The details of blocks 2305-2315 and 2705-2715 were described above with reference to FIGS. 17-22. At block 2720, the current angular position of the rotor shaft may be received. For example, the processing unit 120 of FIG. 12C may receive the angular position of the rotor shaft 150 from the rotary encoder limit detector 1263.

The current angular position of the rotor shaft may then be compared (at block 2725) with the "on" and/or the "off" angular positions of the rotor shaft that are stored in memory. For example, the processing unit 120 may compare the current angular position of the rotor shaft with the on" and/or the "off" angular positions of the rotor shaft that were stored by the valve shutoff device during the initial setup using process 2600 (FIG. 26).

At block 2730 it may be determined whether the shutoff valve is in the off position based on the comparison. When the shutoff valve is not in the off position, one or more signals may be sent (at block 2735) to the continuous rotation motor to start rotating the rotor shaft to turn off the shutoff valve. For example, the processing unit 120 may send one or more signals to the motor 115 to start rotating the rotor shaft 150 in the direction to close the shutoff valve. The processing may proceed back to block 2720, which was described above. Otherwise, when the shutoff valve is in the off position one or more signals may be sent (at block 2740) to the continuous rotation motor to stop rotating. The processing may then end.

Figure 28:
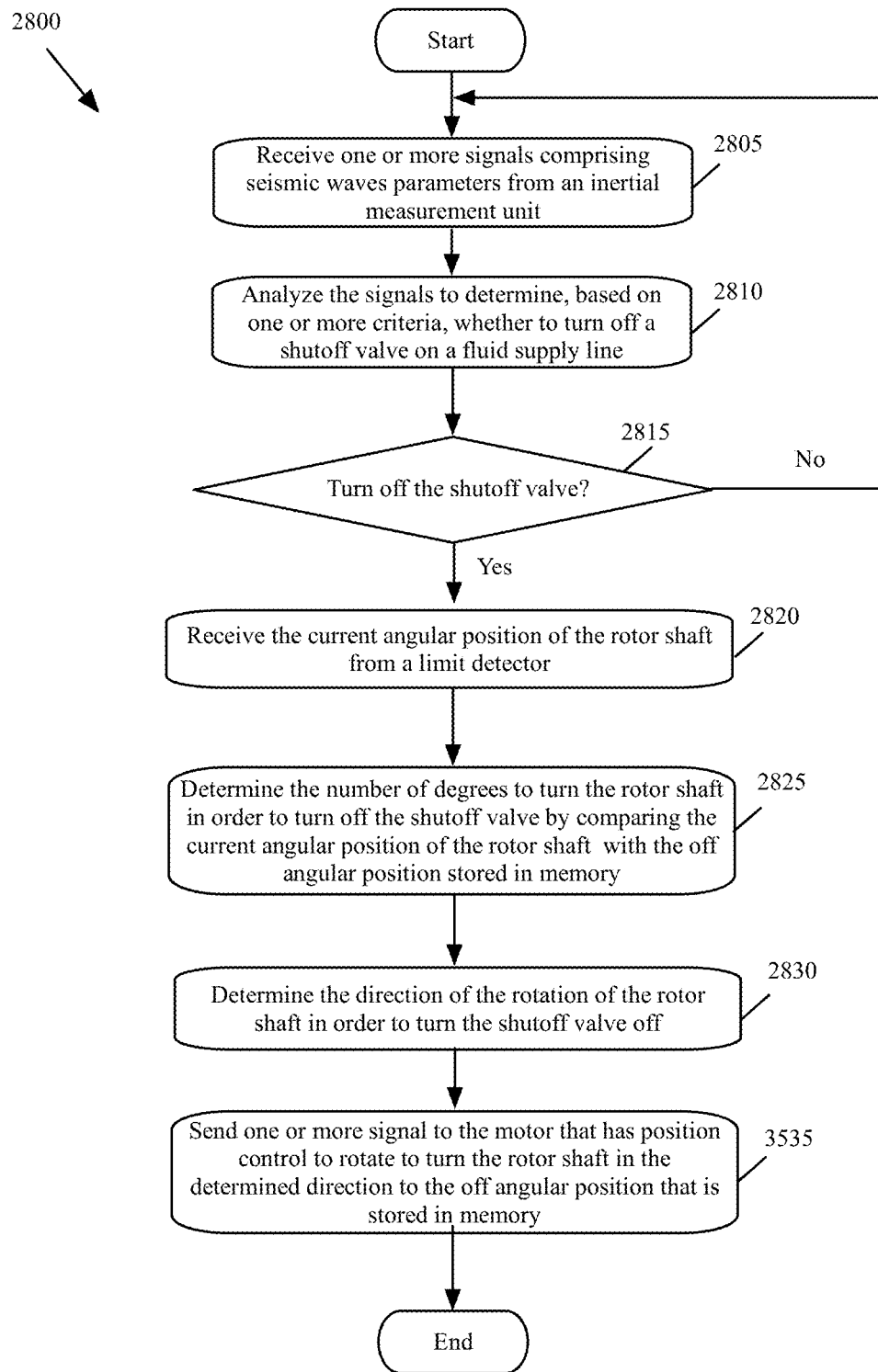
FIG. 28 is a flowchart illustrating an example process for turning off a shutoff valve by a motor that has position control using the stored angular positions of the rotor shaft that correspond to the "on" and/or "off" positions of the shutoff valve, according to various aspects of the present disclosure.

FIG. 28 is a flowchart illustrating an example process 2800 for turning off a shutoff valve by a motor that has position control using the stored angular positions of the rotor shaft that correspond to the "on" and/or "off" positions of the shutoff valve, according to various aspects of the present disclosure. In some of the present embodiments, the process 2800 may be performed by a processing unit 120 of a valve shutoff device 100 (FIG. 12C).

With reference to FIG. 28, blocks 2805-2815 are similar to blocks 2305-2315 of FIG. 23, respectively. The details of blocks 2305-2315 and 2805-2815 were described above with reference to FIGS. 17-22. At block 2820, the current angular position of the rotor shaft may be received. For example, the processing unit 120 of FIG. 12C may receive the angular position of the rotor shaft 150 from the rotary encoder limit detector 1263. The processing unit 120 may, for example, use the rotary position encoder limit detector (e.g., the optical rotary position encoder of FIG. 13C or the magnetic rotary position encoder of FIG. 13D) to determine and store the angular position of rotor shaft 150 each time the motor comes to a stop.

With further reference to FIG. 28, the number of degrees to turn the rotor shaft in order to turn off the shutoff valve may be determined (at block 2825) by comparing the current angular position of the rotor shaft with the off angular position of the rotor shaft stored in memory. The off angular position of the rotor shaft may be stored by the processing unit 120 during the initial setup using process 2600 (FIG. 26).

Next, the direction of the rotation of the rotor shaft may be determined (at block 2830). For example, the direction to turn off the shutoff valve may be clockwise (or counter clockwise direction depending on the valve design). Next, one or more signals may be sent (at block 2835) to the motor that has position control to rotate to turn the rotor shaft in the determined direction to the "off" position that is stored in memory. Since the motor has position control, the motor does not require receiving separate signals to stop. The processing may then end.

Figure 29:
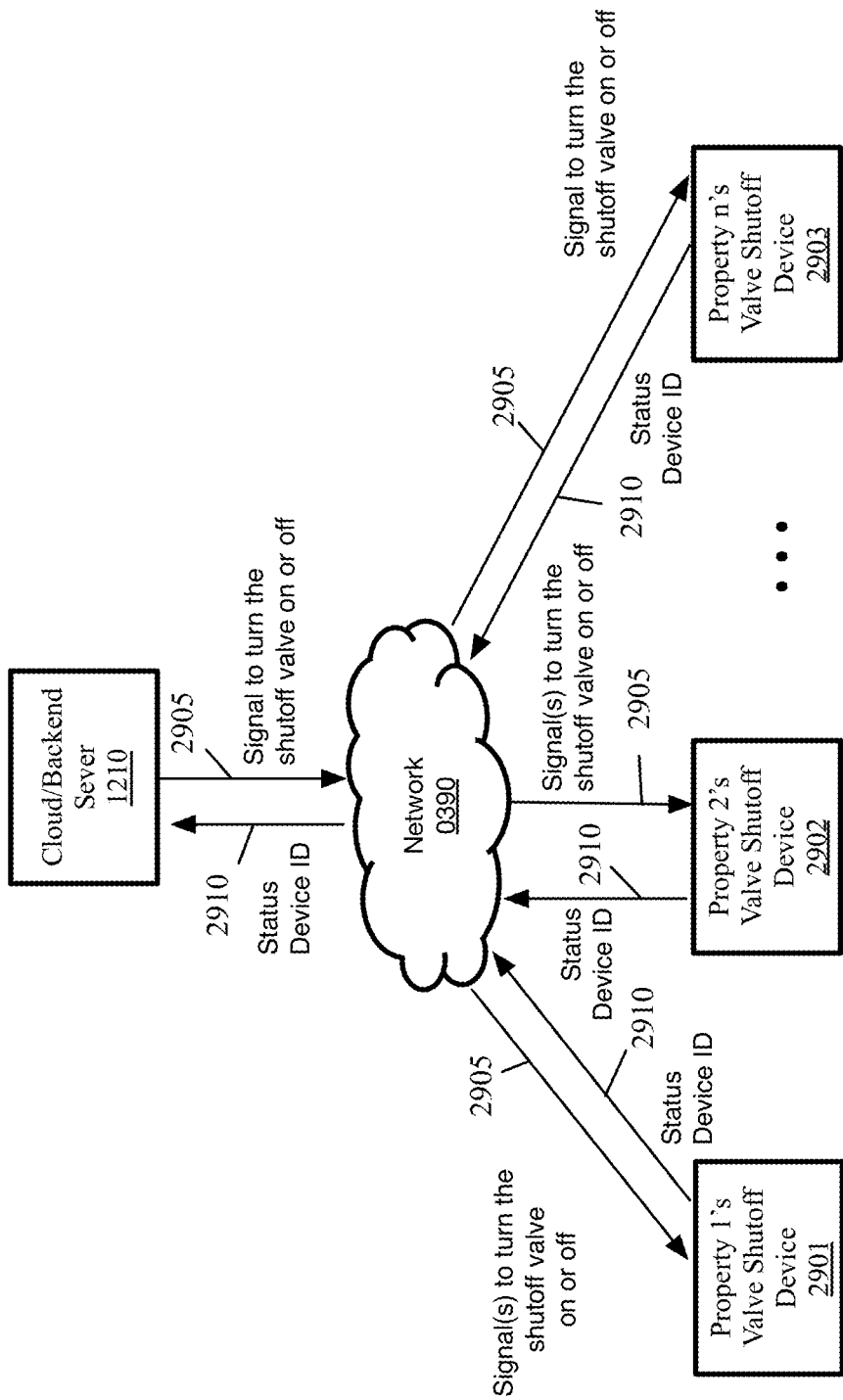
FIG. 29 is a functional block diagram illustrating a system for remotely turning a shutoff valve on or off by a cloud or backend server using a valve shutoff device, according to various aspects of the present disclosure.

In addition to turning off a shutoff valve based on the analysis of seismic waves, some of the present embodiments may turn the shutoff valve on or off based on signals that are received from authorized remote devices. The valve shutoff device, in these embodiments may operate as an IoT device. FIG. 29 is a functional block diagram illustrating a system for remotely turning a shutoff valve on or off by a cloud or backend server using a valve shutoff device, according to various aspects of the present disclosure.

With reference to FIG. 29, a cloud or backend server 130 may send one or more signals 2905 to one or more valve shutoff devices 2901-2903 to turn the shutoff valve(s) on or off. The cloud or backend server 1210 may be associated with one or more government agencies and/or utility companies such as, without limitations, firefighting department, civil defense, gas company, water company, etc. The shutoff valves devices 2901-2903 may be installed in different properties. The cloud or backend server 1210 may send the signal(s) 2905 to many valve shutoff devices 2901-2903 during an emergency event such as an earthquake, fire, war, explosion, landslide, etc., to turn off the associated shutoff valves. The cloud or backend server 1210 may send the signal(s) 2905 to an individual valve shutoff device to turn the corresponding shutoff valve on or off, for example when a utility subscriber takes possession or leaves a premise where the shutoff valve is installed (e.g., a utility company may remotely shutoff the gas shutoff valve of a property when a utility company's customer informs the utility company that the customer no longer lives in the premise.

With reference to FIG. 29, the signal(s) 2905 may go through the network(s) 1290 and may be received by the valve shutoff devices 2901-2903 that may be associated with different properties. The valve shutoff devices 2901-2903 may determine that the cloud/backend server 30310 is authorized to send the signal(s), and may turn the associated shutoff valves on or off based on the received signal. The valve shutoff devices 2901-2903 may send their status and device identification 2910 to the cloud or backend server 1210. The status may include an indication that the shutoff valve has or has not been successfully turned on or off.

Figure 30:
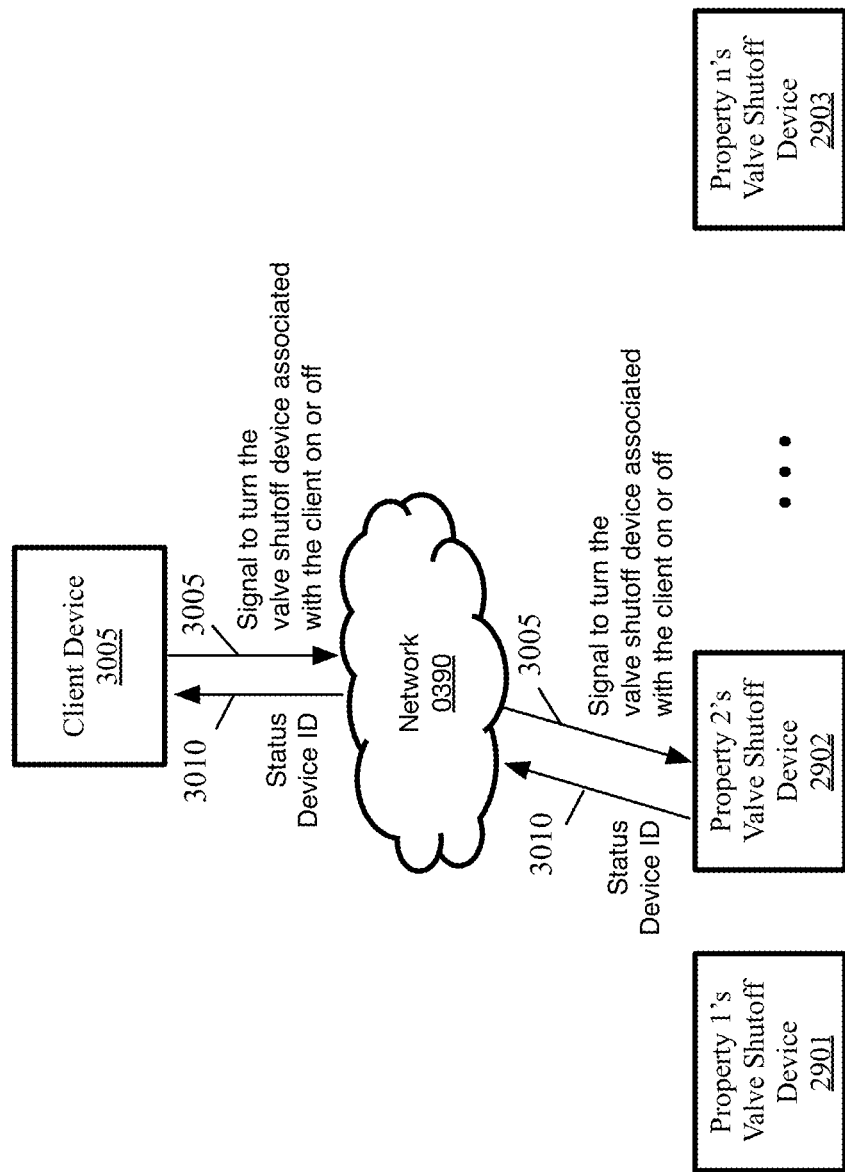
FIG. 30 is a functional block diagram illustrating a system for remotely turning a shutoff valve on or off by a client device using a valve shutoff device, according to various aspects of the present disclosure.

FIG. 30 is a functional block diagram illustrating a system for remotely turning a shutoff valve on or off by a client device using a valve shutoff device, according to various aspects of the present disclosure. The client device 3005 may be a client device such as the client device 2535 associated with a particular valve shutoff device. In the example of FIG. 30, the valve shutoff device 2902 is provisioned to be associated with the client device 3005.

With reference to FIG. 30, the client device 3005 may send one or more signals 3005 to turn the valve shutoff device 2902 associated with the client device on or off. For example, the user of the client device my wish to turn off the valve shutoff before going to a trip or turn on the valve shutoff after coming back from the trip. The user may, for example, be away from the property where the shutoff valve is installed and may wish to turn off the shutoff valve after hearing news about an earthquake, fire, or other emergency or disaster events.

With further reference to FIG. 30, the signal(s) 3005 may go through the network(s) 1290 and may be received by the valve shutoff device 2902 that may be associated with the client device. The valve shutoff device 2902 may determine that the client device 3005 is authorized to send the signal(s) to the valve shutoff device 2902, and may turn the associated shutoff valve on or off (based on the received signal). The valve shutoff 2902 may send its status and device identification 3010 to the client device 3005. The status may include an indication that the shutoff valve has or has not been successfully turned on or off. The other valve shutoff devices 2901 or 2903 that are not associated with the client device 3005 may ignore the signal(s) 3010 even if the valve shutoff devices 2901 or 2903 receive the signal(s) 3010 from the client device 3005 through the network 1290.

Figure 31:
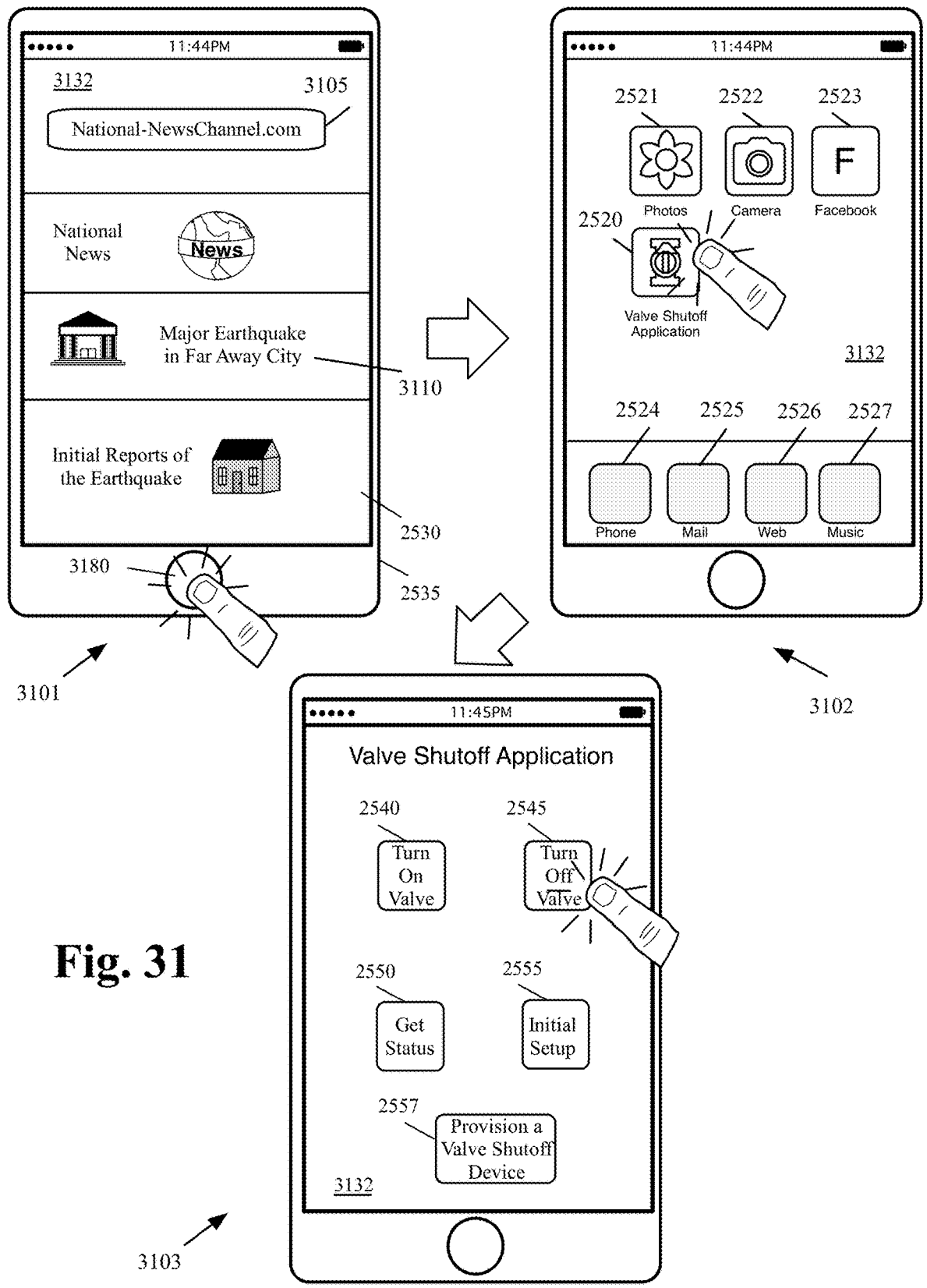
FIG. 31 is a schematic front view of a client device that may include an application program for remotely turning a shutoff valve on or off, according to various aspects of the present disclosure.

FIG. 31 is a schematic front view of a client device that may include an application program for remotely turning a shutoff valve on or off, according to various aspects of the present disclosure. The figure illustrates, through three stages 3101-3103, a client device 2535 using an application program 2520 to remotely turn a shutoff valve on or off.

With reference to FIG. 31, stage 3101 shows a graphical user interface (GUI) 3132 displayed on a display (e.g., a touch screen) 2530 of the client device 2535. In the example of FIG. 31, the client device 2535 in stage 3101 is displaying a news channel 3105 that is unrelated to the valve shutoff application 2520. As shown in this example, the news channel 3105 may display news 3110 regarding an earthquake in a city near the property where a shutoff valve associated with the client device 2535 is installed.

As shown in stage 3101, a control button 3180 is selected to exit the news channel. In response to the selection of the control button 3180, the GUI 3132 may display a list of applications 2520-2527 in stage 2502. As shown, the valve shutoff application 2520 may be selected in stage 3102. In response to the selection of the valve shutoff application 2520, the GUI 3132 in stage 3103 may display several options 2540-2557. In the example of FIG. 31, it is assumed that the valve shutoff device is already provisioned using the provision option 2557.

As shown in step 3103, the turn off valve option 2545 may be selected. As described below with reference to FIG. 32, the client device 2535 may send one or more signals to the processing unit 120 (FIGS. 12A-12C) of the valve shutoff device 100 to turn off the shutoff valve 175. Similarly, a selection of the option 2540 may cause the client device 2535 to send one or more signal to the processing unit 120 of the valve shutoff device 100 to turn on the shutoff valve 175.

Figure 32:
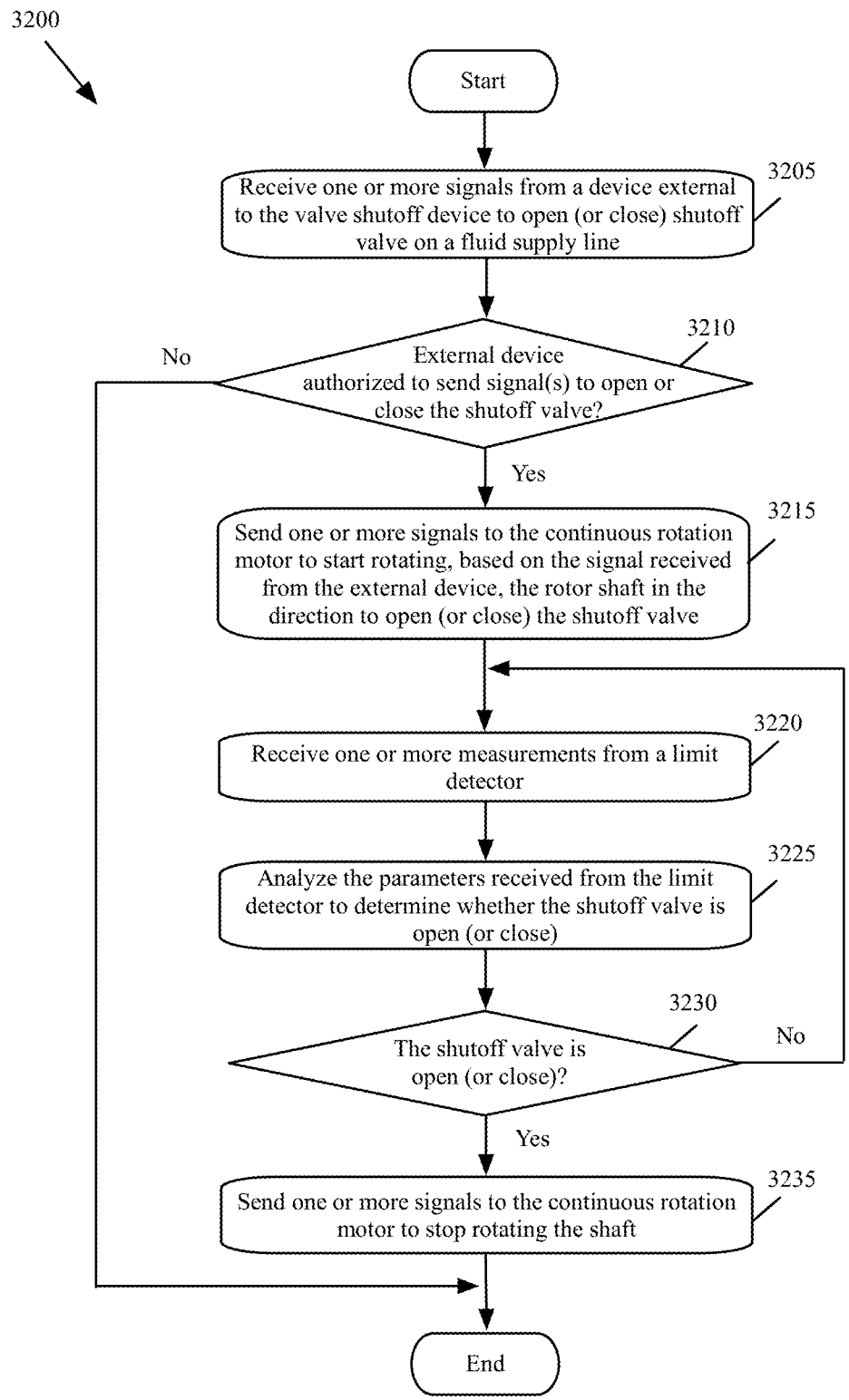
FIG. 32 is a flowchart illustrating an example process for using a continuous rotation motor to open or close a shutoff valve that has a mechanical stop, in response to receiving a signal from a remote device, according to various aspects of the present disclosure.

FIG. 32 is a flowchart illustrating an example process 3200 for using a continuous rotation motor to open or close a shutoff valve that has a mechanical stop, in response to receiving a signal from a remote device, according to various aspects of the present disclosure. A continuous rotation motor may be a motor without an internal feedback loop to control the position of the motor's rotor shaft. In some of the present embodiments, the process 3200 may be performed by the processing unit 120 (FIG. 12A-12C).

With reference to FIG. 32, one or more signals may be received (at block 3205) from a device external to the valve shutoff device to open (or close) a shutoff valve on a fluid supply line. For example, the processing unit 120 (FIGS. 12A-12C) may receive a signal from the client device 2535 (FIG. 31) after one of the options 2540 or 2545 is selected in stage 3103.

With further reference to FIG. 32, a determination may be made (at block) 3210 whether the external device is authorized to request to open or close the shutoff valve. For example, the processing unit 120 of the valve shutoff device 100 may determine whether the external device is authorized to turn the shutoff valve on or off as a part of the provisioning of the valve shutoff device 100. The valve shutoff device 100 may be provisioned to be associated with one or more electronic devices 1205 (FIGS. 12A-12C) such as the client device 2535 (FIG. 25) that are authorized to send signals (e.g., to request for health status and data, request to turn the shutoff valve on or off, perform initial setup, etc.) to the valve shutoff device 100. The valve shutoff device 100 may be provisioned to be associated with one or more cloud or backend servers 1210 (FIGS. 12A-12C) that are authorized to send signals (e.g., to request for health status and data, request to turn the shutoff valve on or off, etc.) to the valve shutoff device 100.

With reference to FIG. 32, when the external device is not authorized to send the signal(s) to turn the shutoff valve on or off, the processing may end. Otherwise, one or more signals may be sent (at block 3215) to the continuous rotation motor to start rotating the rotor shaft in the direction to open (or close) the valve. For example, the processing unit 120 (FIGS. 12A-12B) may send a signal to the motor 150 to start rotating the rotor shaft in to turn off the shutoff valve 175.

At block 3220, one or more parameters from a limit detector may be received. Since the motor in the example of process 3200 is a continuous rotation motor and the shutoff valve actuator 1281 has a mechanical stop, the processing unit 120 has to know when the shutoff valve actuator is no longer rotating in order to turn off the motor. The limit detector, in some of the present embodiments, may be a force or torque limit detector 1261 (FIGS. 12A and 13A) and the parameters received from the limit detector 1261 may include measurements of force and/or torque exerted on the rotor shaft 150.

The limit detector in some embodiments may be a motor current limit detector 1262 (FIGS. 12B, 13B) and the parameters received from the limit detector 1262 may include measurements of electrical current used by the motor 115. The limit detector in some embodiments may be a rotary position encoder 1263 such as the optical rotary position encoder of FIG. 13C or the magnetic rotary position encoder of FIG. 13D and the measurements may include the position and/or the speed of the rotor shaft 150.

With further reference to FIG. 32, the parameters received from the limit detector may be analyzed (at block 3225) to determine whether the shutoff valve actuator has reached the mechanical stop and the shutoff valve is turned on or off. For example, if the limit detector is a force or torque limit detector, the processing unit 120 may determine whether the force or torque exerted on the rotor shaft 150 has exceeded a limit. If the limit detector is a motor current limit detector, the processing unit 120 may determine that the current used by the motor 115 has exceeded a limit. If the limit detector is a rotary encoder, the processing unit 120 may determine that the rotational speed of the rotor shaft 150 has reached zero and/or whether the angular position of the rotor shaft 150 has reached a predetermined angle.

At block 3230, a determination may be made whether the shutoff valve is open (or close). For example, a determination may be made whether shutoff valve actuator 180 has reached the mechanical stop. If not, the processing may proceed to block 3220, which was described above. Otherwise, one or more signals may be sent (at block 3235) to the continuous rotation motor to stop rotating the shaft. The processing may then end.

Figure 33:
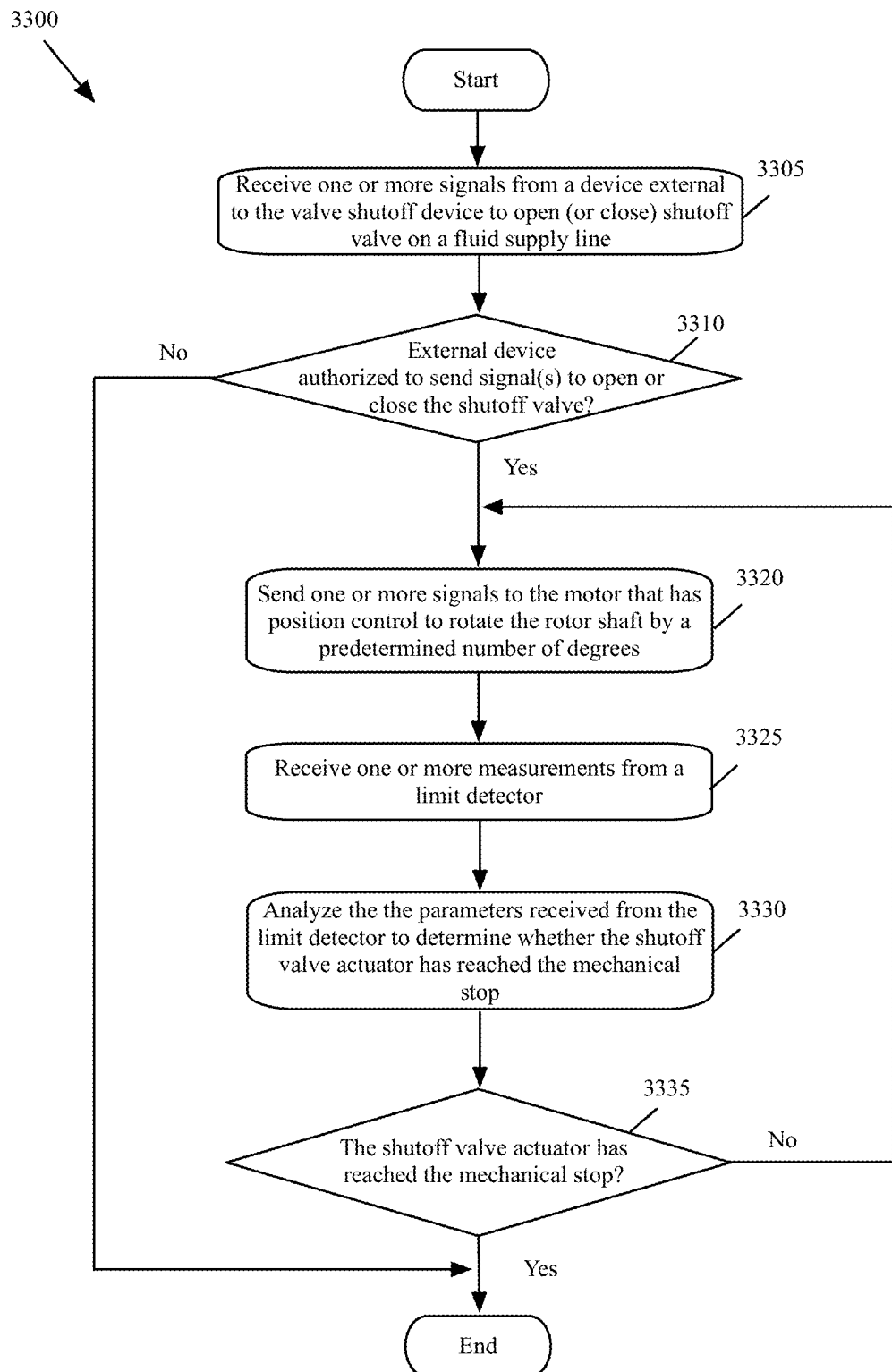
FIG. 33 is a flowchart illustrating an example process for using a motor that has position control to turn a shutoff valve that has a mechanical stop on or off, in response to receiving a signal from a remote device, according to various aspects of the present disclosure.

FIG. 33 is a flowchart illustrating an example process 3300 for using a motor that has position control to turn a shutoff valve that has a mechanical stop on or off, in response to receiving a signal from a remote device, according to various aspects of the present disclosure. In some of the present embodiments, the process 3300 may be performed by the processing unit 120 (FIG. 12A-12C).

With reference to FIG. 33, blocks 3305-3310 are similar to blocks 3205-3210 of FIG. 32 respectively, which were described above. At block 3320, one or more signals may be sent to the motor that has position control to rotate the rotor shaft by a predetermined number of degrees (or number of turns). For example, the processing unit 120 may send one or more signals or commands to the motor 115 to turn the rotor shaft 150 by a number of degrees. The rotor shaft 150 may be connected to the valve coupling key 145, which in turn may be engaged with the shutoff valve level 180.

The shutoff valve actuator 180 may, for example, be the shutoff valve lever 180 (FIG. 2) or the ball valve handle 1005 (FIG. 10) that typically turns 90 degrees from open to close. The processing unit 120 may not know whether the shutoff valve is currently open, closed, or partially closed. The shutoff valve actuator 180 may, for example, be the gate valve handwheel 800 (FIG. 8) that may need to be turned around several times in order to be closed. The processing unit 120 may not know the current position of the handwheel and/or how many turns the handwheel 800 has be turned to close. The processing unit may, therefore, send one or more signals or commands to the motor (at block 3320) to turn the rotor shaft 150 in a direction that closes the valve and check one or more parameters to make sure the shutoff valve actuator 180, the handle 1005, or the handwheel 800 have reached the mechanical stop and the valve is closed.

With further reference to FIG. 33, one or more measurements may be received (at block 3325) from a limit detector. The limit detector may be one of the limit detectors described above with reference to block 2325 of FIG. 23. The limit detector may be external to or an integral part of the motor. For example, the limit detector may be a potentiometer that is integral to the motor.

With continued reference to FIG. 33, the parameters received from the limit detector may be analyzed (at block 3330) to determine whether the shutoff valve actuator has reached the mechanical stop. For example, if the limit detector is a force or torque limit detector, the processing unit 120 may determine whether the force or torque exerted on the rotor shaft 150 has exceeded a limit. If the limit detector is a motor current limit detector, the processing unit 120 may determine that the current used by the motor 115 has exceeded a limit. If the limit detector is a rotary encoder, the processing unit 120 may determine that the rotational speed of the rotor shaft 150 has reached zero and/or whether the angular position of the rotor shaft 150 has reached a predetermined angle.

At block 3335, a determination may be made whether the shutoff valve actuator has reached the mechanical stop. If not, the processing may proceed to block 3320, which was described above. Otherwise, the processing may end.

Figure 34:
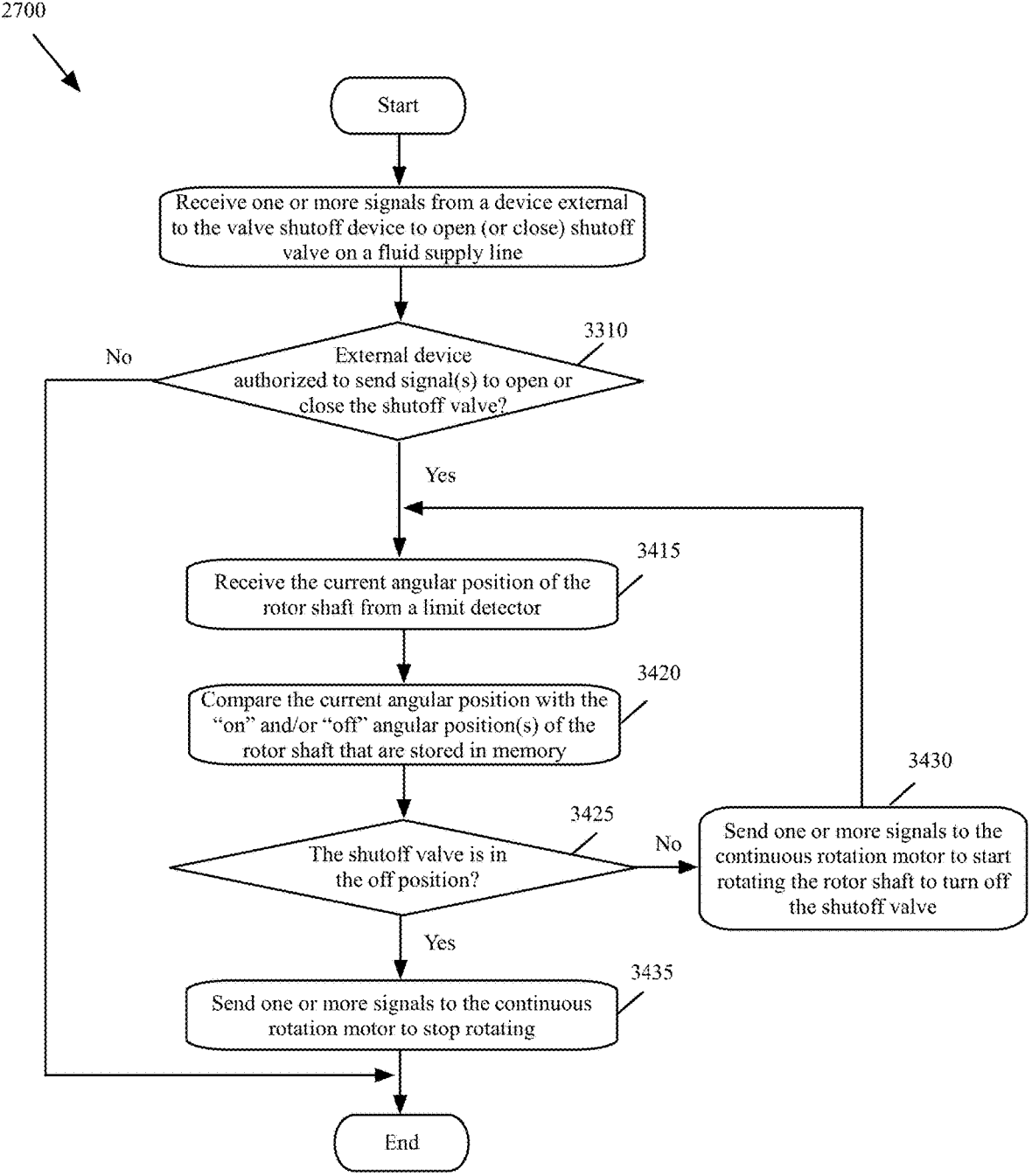
FIG. 34 is a flowchart illustrating an example process for opening or closing a shutoff valve by a continuous rotation motor using the stored angular positions of the rotor shaft that correspond to the open or close positions of the shutoff valve, in response to receiving a signal from a remote device, according to various aspects of the present disclosure.

FIG. 34 is a flowchart illustrating an example process 3400 for opening or closing a shutoff valve by a continuous rotation motor using the stored angular positions of the rotor shaft that correspond to the open or close positions of the shutoff valve, in response to receiving a signal from a remote device, according to various aspects of the present disclosure. In some of the present embodiments, the process 3400 may be performed by a processing unit 120 of a valve shutoff device 100 (FIG. 12C).

With reference to FIG. 34, blocks 3405-3410 are similar to blocks 3205-3210 of FIG. 32, respectively. At block 3415, the current angular position of the rotor shaft may be received. For example, the processing unit 120 of FIG. 12C may receive the angular position of the rotor shaft 150 from the rotary encoder limit detector 1263.

The current angular position of the rotor shaft may then be compared (at block 3420) with the "on" and/or the "off" angular positions of the rotor shaft that are stored in memory. For example, the processing unit 120 may compare the current angular position of the rotor shaft with the on" and/or the "off" angular positions of the rotor shaft that were stored by the valve shutoff device during the initial setup using process 2600 (FIG. 26).

At block 3425 it may be determined whether the shutoff valve is in the off position based on the comparison. When the shutoff valve is not in the off position, one or more signals may be sent (at block 3430) to the continuous rotation motor to start rotating the rotor shaft to turn off the shutoff valve. For example, the processing unit 120 may send one or more signals to the motor 115 to start rotating the rotor shaft 150 in the direction to close the shutoff valve. The processing may proceed back to block 3415 which was described above. Otherwise, when the shutoff valve is in the off position one or more signals may be sent (at block 3435) to the continuous rotation motor to stop rotating. The processing may then end.

Figure 35:
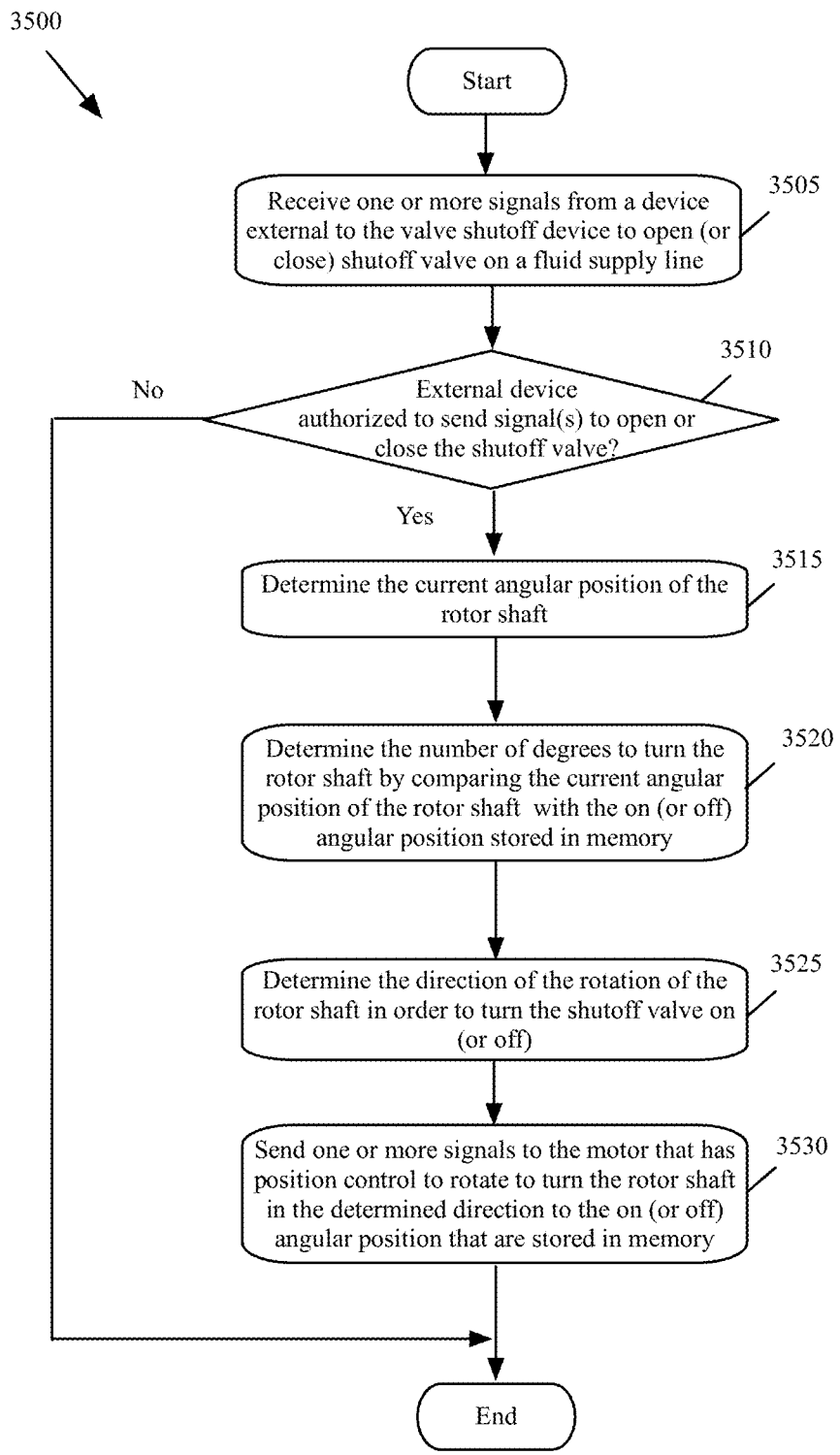
FIG. 35 is a flowchart illustrating an example process for opening or closing a shutoff valve by a motor that has position control using the stored angular positions of the rotor shaft that correspond to the open or close positions of the shutoff valve, in response to receiving a signal from a remote device, according to various aspects of the present disclosure.

FIG. 35 is a flowchart illustrating an example process 3500 for opening or closing a shutoff valve by a motor that has position control using the stored angular positions of the rotor shaft that correspond to the open or close positions of the shutoff valve, in response to receiving a signal from a remote device, according to various aspects of the present disclosure. In some of the present embodiments, the process 3500 may be performed by the processing unit 120 (FIG. 12A-12C).

With reference to FIG. 35, blocks 3505-3510 are similar to blocks 3205-3210 of FIG. 32 respectively, which were described above. At block 3515, the current angular position of the rotor shaft may be determined. For example, the processing unit 120 in FIG. 12C may use a rotary position encoder limit detector (such as the optical rotary position encoder of FIG. 13C or the magnetic rotary position encoder of FIG. 13D) to determine and store the angular position of rotor shaft 150 each time the motor comes to a stop.

With further reference to FIG. 35, the number of degrees to turn the rotor shaft may be determined (at block 3520) by comparing the current angular position of the rotor shaft with the on (or off) angular position of the rotor shaft stored in memory. Next, the direction of the rotation of the rotor shaft may be determined (at block 3525). For example, if the request from the external device is for turning the shutoff valve off, the direction of rotation may be clockwise (or counter clockwise direction depending on the valve design). If the request from the external device is for turning the shutoff valve on, the direction of rotation may be in the opposite direction counter clockwise (or clockwise direction depending on the valve design).

Next, one or more signals may be sent (at block 3530) to the motor that has position control to rotate to turn the rotor shaft in the determined direction to the "on" (or "off")

position that are stored in memory. For example, if the signal received from the external device is for turning off the shutoff valve, the signal(s) sent (at block 3530) to the motor may rotate the rotor shaft by a number of degrees in the direction to turn the shutoff valve off. If the signal received from the external device is for turning on the shutoff valve, the signal) sent (at block 3530) to the motor may rotate the rotor shaft by a number of degrees in the direction to turn the shutoff valve on. The processing may then end.

The valve shutoff devices in some of the present embodiments are compatible with the IoT specification. With the advent of the IoT, it is desirable to collect health status and data by an automatic valve shutoff device and report the health status and data to one or more external devices. The IoT is the extension of the Internet connectivity into physical devices. In some of the present embodiments, the valve shutoff device 100 (FIGS. 12A-12C) may include one or more sensors to collect data from different components of the valve shutoff device 100.

The processing unit 120 of a valve shutoff device 100 may receive and/or store the sensor data. The processing unit 120 may receive and/or store data from different components. The processing unit 120 may measure and/or store voltage and/or current levels received from different components. The processing unit 120 may compare the received and/or stored data with different thresholds to determine the health status of different components. The processing unit 120 may send the health status and/or data to one or more authorized external devices either on a pull basis upon receiving a request or on a push basis after detecting an event such as a component failure, major seismic activities, and/or on a push basis as a periodic report.

Figure 36:
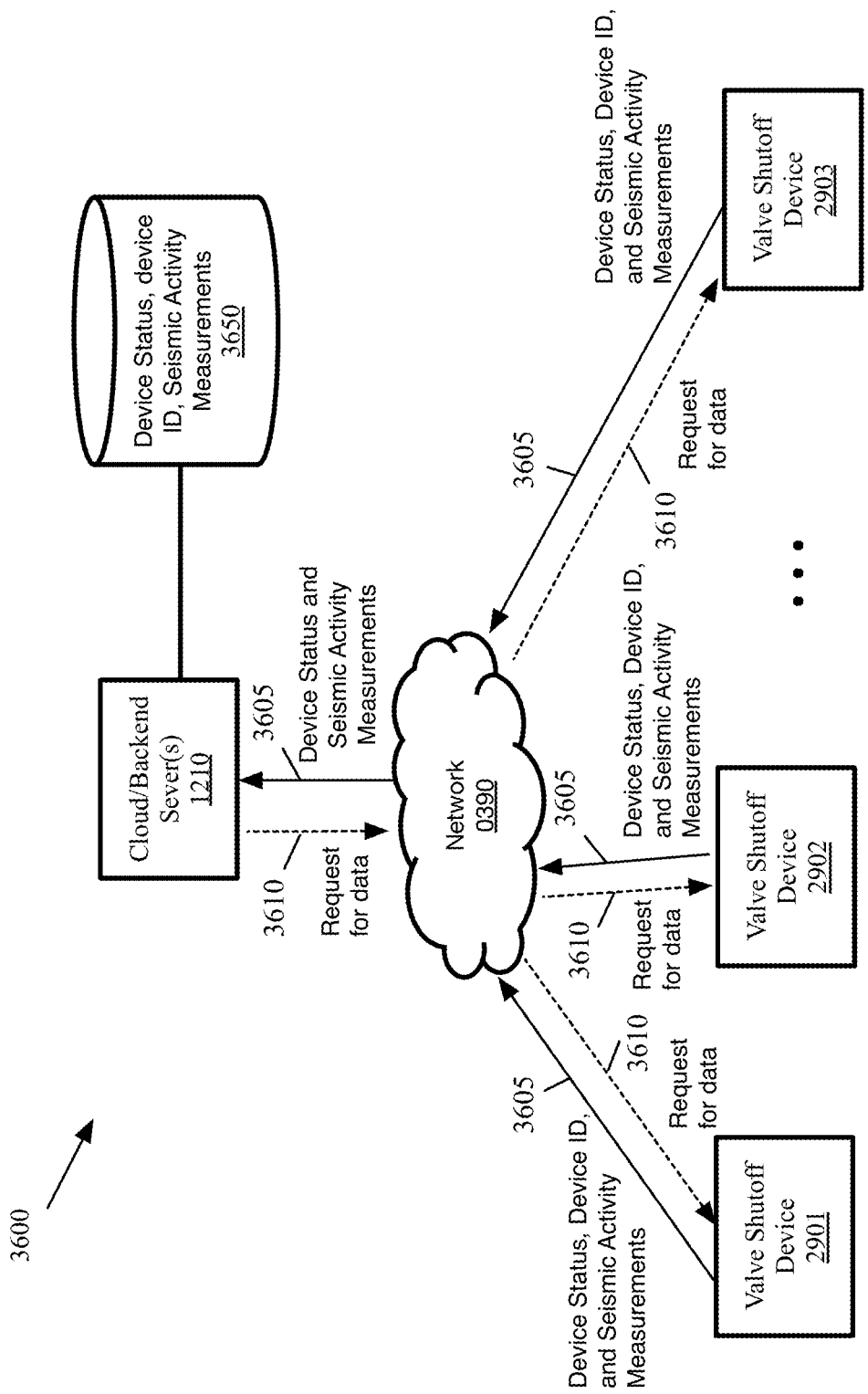
FIG. 36 is a functional block diagram illustrating a system for reporting health status and data by one or more valve shutoff devices to one or more external devices, according to various aspects of the present disclosure.

FIG. 36 is a functional block diagram illustrating a system 3600 for reporting health status and data by one or more valve shutoff devices to one or more external devices, according to various aspects of the present disclosure. With reference to FIG. 36, one or more valve shutoff devices 2901-2903 may collect device status and/or seismic activity measurements. The valve shutoff devices 2901-2903 may be installed at different properties. The valve shutoff devices 2901-2903 may send (as shown by 3605) the device status, seismic activity measurements, and/or device identification to one or more cloud or backend servers 1210.

The cloud or backend servers 1210 may store the device status, seismic activity measurements, and/or device IDs in a database 3650. The cloud or backend servers 1210 may use the collected information to estimate the intensity of seismic activities in specific areas (e.g., where one or more of the valve shutoff devices 2901-2903 are located, may assess the health status of the valve shutoff devices 2901-2903, etc.

Sending of the device status, device ID, and/or seismic activity measurements may be done on a pull basis, e.g., when the cloud or back end server(s) 1210 send(s) (as shown by 3610) a request for data. Sending of the device status, device ID, and/or seismic activity measurements may be done on a push basis after detecting an event such as a component failure, major seismic activities, and/or on a push basis as a periodic report.

Figure 37:
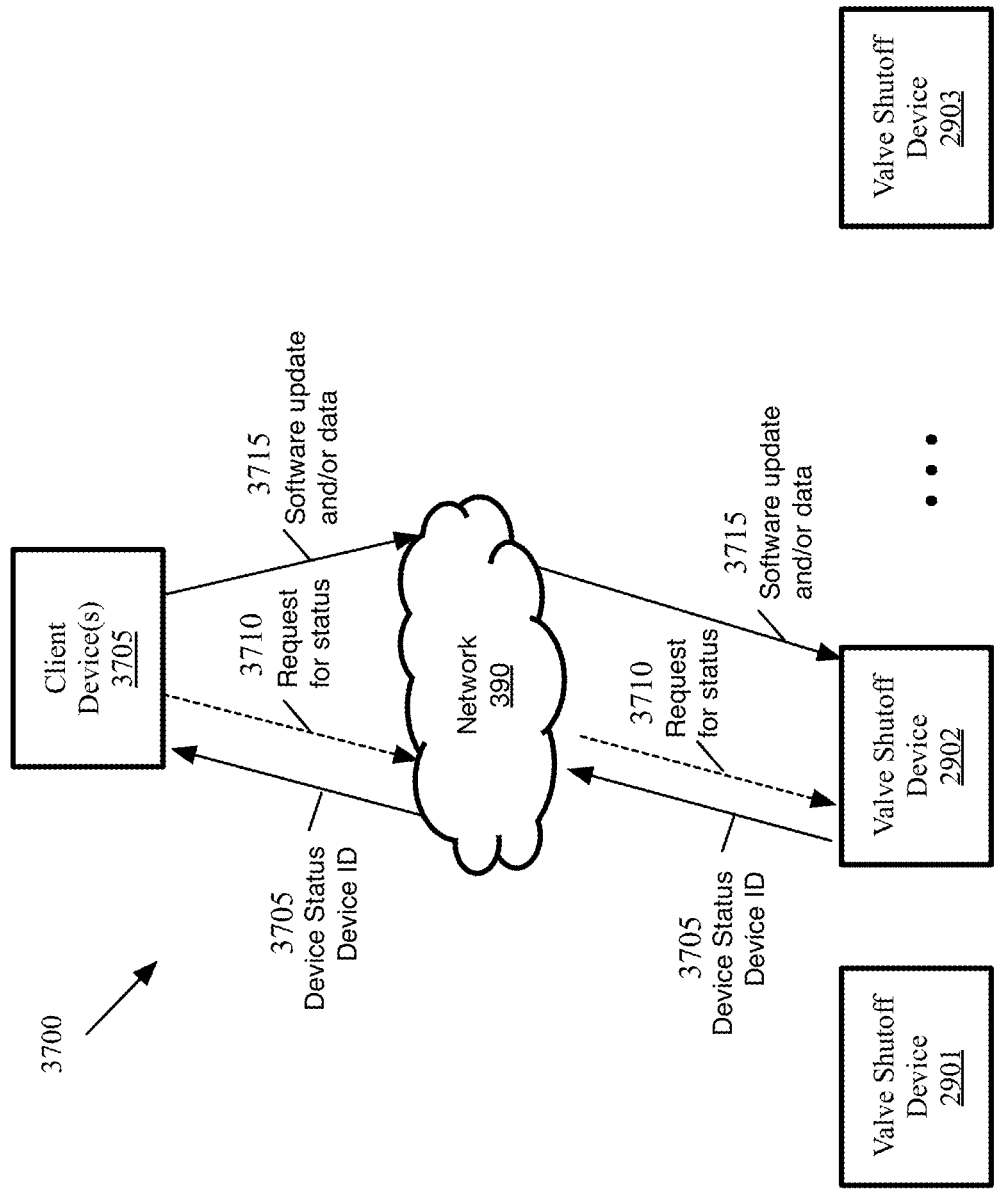
FIG. 37 is a functional block diagram illustrating a system for reporting health status and data by a valve shutoff device to one or more client devices associated with the valve shutoff device, according to various aspects of the present disclosure.

FIG. 37 is a functional block diagram illustrating a system 3700 for reporting health status and data by a valve shutoff device to one or more client devices associated with the valve shutoff device, according to various aspects of the present disclosure. With reference to FIG. 37, a valve shutoff device 2902 may collect device status. The valve shutoff device 2902 may send (as shown by 3705) the device status and/or device identification to one or more client devices 3705.

The client device(s) 3705 may store the device status and/or device ID. The client device(s) 3705 may display the device status and/or device ID on the display of the client device(s), for example, as described below with reference to FIG. 39.

Sending of the device status and/or device ID may be done on a pull basis, e.g., when the client device(s) 3705 send(s) (as shown by 3710) a request for data. Sending of the device status and/or device may be done on a push basis after detecting an event such as a component failure, major seismic activities, and/or on a push basis as a periodic report.

The client device(s) 3705 may send software updates and/or data 3715 to the valve shutoff device 2902. For example, and without limitations, the client device may send software updates for the processing unit 120 (FIGS. 12A-12C). The client device may send data, for example, and without limitations, as described above with reference to FIG. 25, the physical address and/or the geographical coordinates of the location where the valve shutoff device is installed. The client device may send different parameters of the algorithm used for the identification and determination of the intensity of the seismic waves (as described above with reference to FIGS. 17-22) either as a single data item or as a part of a software update.

Figure 38:
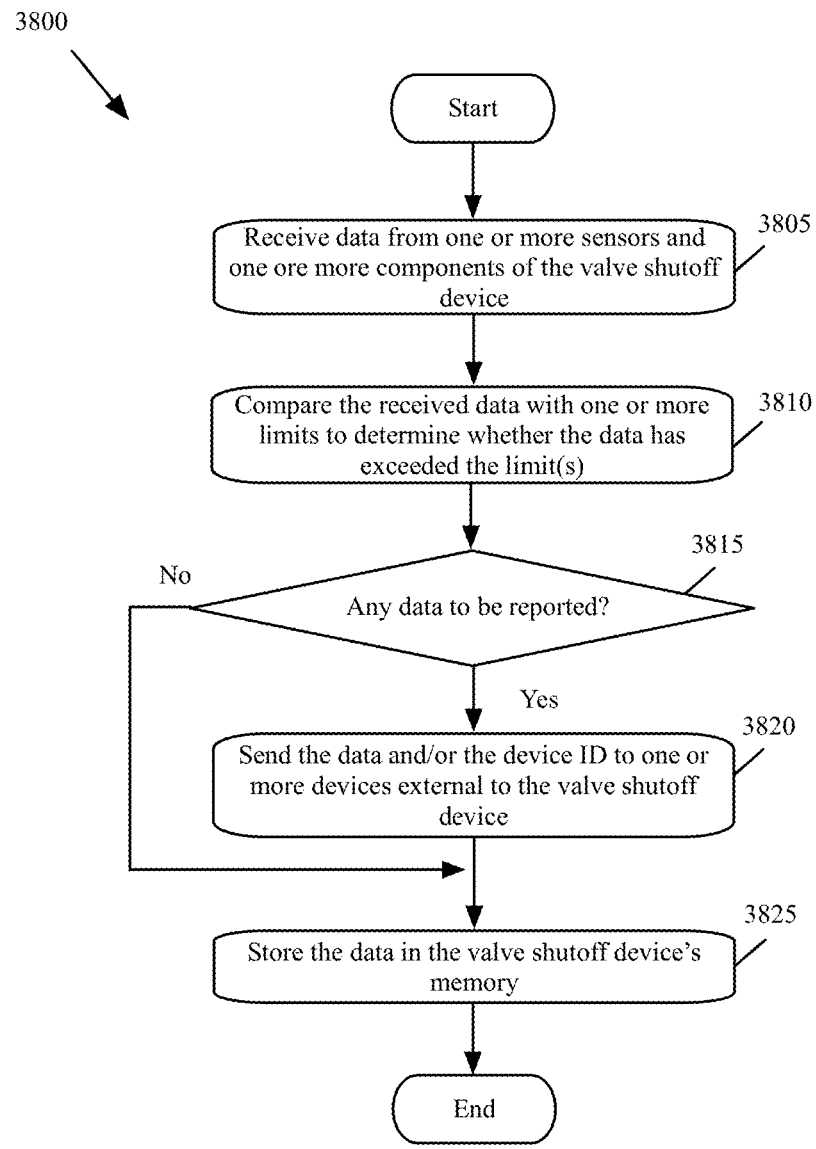
FIG. 38 is a flowchart illustrating an example process for collecting health status and data by a valve shutoff device and reporting the health status and data to one or more external devices, according to various aspects of the present disclosure.

FIG. 38 is a flowchart illustrating an example process 3800 for collecting health status and data by a valve shutoff device and reporting the health status and data to one or more external devices, according to various aspects of the present disclosure. In some of the present embodiments, the process 3800 may be performed by the processing unit 120 (FIG. 12A-12C).

With reference to FIG. 38, data from one or more sensors and one or more components of the valve shutoff device may be received (at block 3805). The sensor and/or component data may include, without any limitations, one or more of the battery charge level, the health status of the processing unit 120 (FIGS. 12A-12C), the health status of the IMU, the health status of the radio transceiver, the health status of the limit detector, the current position of the shutoff valve (determined, for example, from the current angular position of the rotor shaft or from the last time the shutoff valve was automatically turned on or off by the valve shutoff device 100).

The processing unit 120 may, for example, measure the current and/or voltage received from the battery to determine the charge level of the battery. The processing unit 120 may receive internal health status from the IMU, radio transceiver, limit detector circuitry, etc. The processing unit 120 may check its own health status. The processing unit 120 may check the health status of the battery 150 and may determine that the battery has to be replaced. The processing unit 120 may also analyze the parameters received from the IMU and may determine the intensity of seismic activity as a data item to be stored and/or reported.

With further reference to FIG. 38, the received data may be compared (at block 3810) with one or more limits to determine whether the data has exceeded the limit(s). Next, a determination may be made (at block 3815) whether the data has to be reported. If the valve shutoff device data reporting is on a pull basis, the determination (at block 3815) to report data may be based on whether a request for data or status is received from an external device such as an authorized client device or an authorized could or backend server. If the valve shutoff device data reporting is on a pull basis, the determination (at block 3815) to report data may be based on a determination that the received data has exceeded the one or more limits and/or whether a time for a periodic report has reached.

When the determination is made (at block 3815) not to report the data, the processing may proceed to block 3825, which is described below. Otherwise, the data and/or the device ID may be sent (at block 3820) to one or more devices external to the valve shutoff device. The data may be stored (at block 3825) in the valve shutoff device's memory. The processing may then end.

Figure 39:
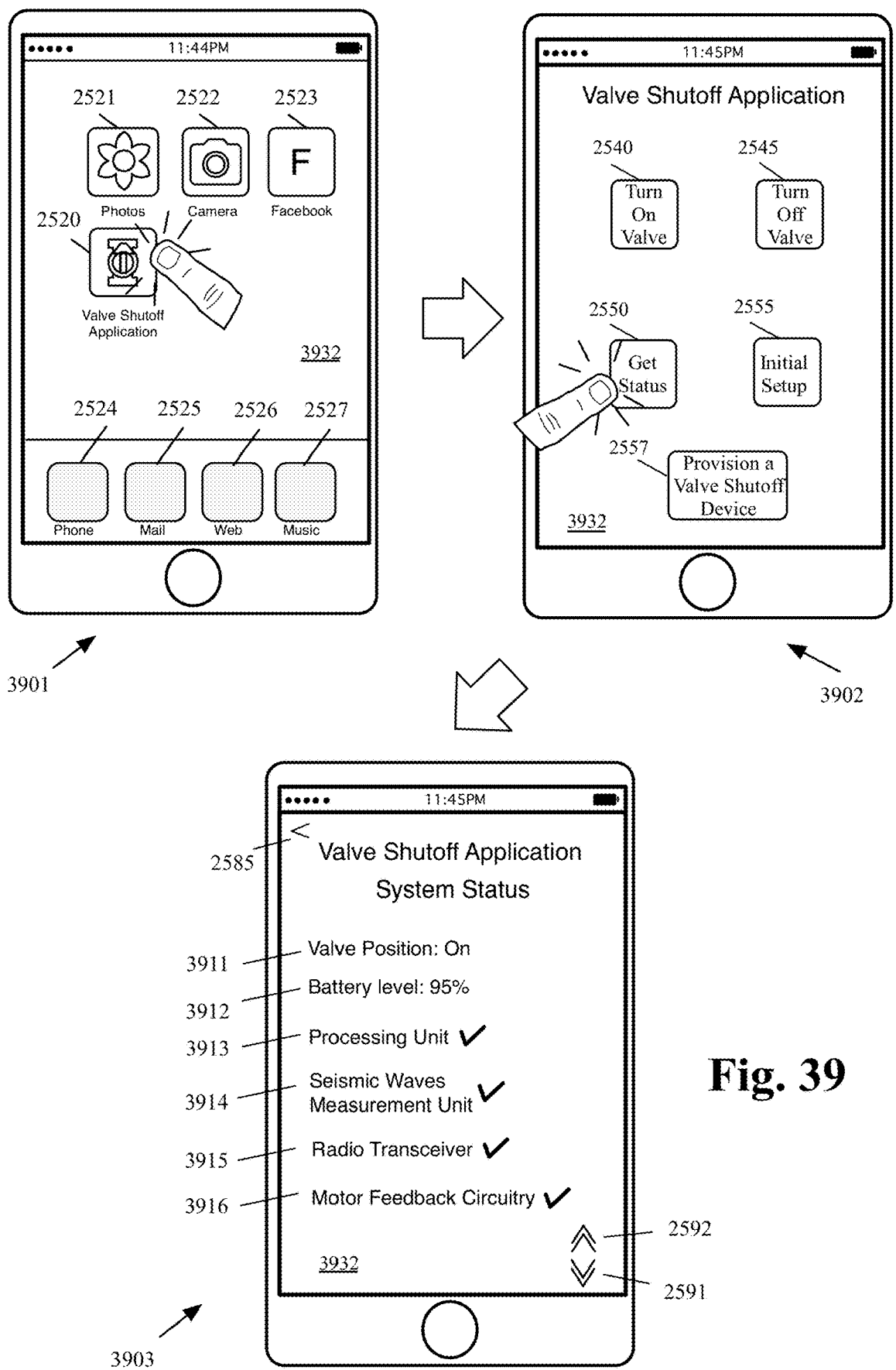
FIG. 39 is a schematic front view of a client device that may include an application program for displaying health and status data collected by a shutoff valve on or off, according to various aspects of the present disclosure.

FIG. 39 is a schematic front view of a client device that may include an application program for displaying health and status data collected by a shutoff valve on or off, according to various aspects of the present disclosure. The figure illustrates, through three stages 3901-3903, a client device 2535 using an application program 2520 to display health status and data received from shutoff valve on or off.

With reference to FIG. 39, stage 3901 shows a graphical user interface (GUI) 3932 displayed on a display (e.g., a touch screen) 2530 of the client device 2535. The GUI 3932 may display a list of applications 2520-2527. As shown, the valve shutoff application 2520 may be selected in stage 3901. In response to the selection of the valve shutoff application 2520, the GUI 3932 in stage 3902 may display several options 2540-2557. In the example of FIG. 39, it is assumed that the valve shutoff device is already provisioned using the provision option 2557.

As shown in step 3902, the get status option 2550 may be selected. In response to the selection of the get status option 2550, the GUI 3932 may display health and status data received from the valve shutoff device 100 in stage 3903. In the example of FIG. 39, the health and status data may include one or more of the valve position 3911, the battery level 3912, the health status 3913 of the processing unit, the health status 3914 of the IMU (displayed as seismic waves measurement unit), the health status 3915 of the radio transceiver, the health status 3915 of the limit detector (displayed as motor feedback circuitry).

The GUI 3932 may provide a scroll down option 3991 and a scroll up option 3992 to display additional health status and data (if any). The GUI 3932 may provide an option 3985 to return to the previous stage.

Figure 40:
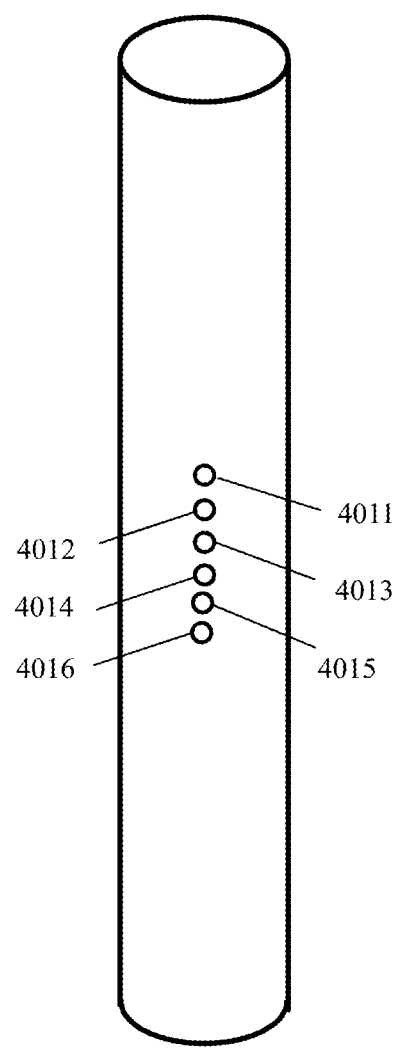
FIG. 40 is a schematic front view of a light panel of an automatic valve shutoff device, according to various aspects of the present disclosure.

In some of the present embodiments, the valve shutoff device 100 may include one or more lights (e.g., one or more LED lights for display the status of different components of the valve shutoff device 100. FIG. 40 is a schematic front view of a set of status lights of an automatic valve shutoff device, according to various aspects of the present disclosure. The lights may, for example be emitted from LED lights that are visible through corresponding holes or glass windows on the automatic valve shutoff device' housing 140 (FIGS. 1A-1B).

As shown, the lights may show the status of different components of the valve shutoff device and/or the valve. The lights may, for example be turned on by the processing unit 120 of the automatic valve shutoff device when the corresponding component has failed a health check or alternatively the lights may be turned on when the corresponding component is healthy. A light may also show whether the shutoff valve is automatically opened or closed by the automatic valve shutoff device.

In the example of FIG. 40, the lights may include one or more of the following lights. A light 4011 to show the valve position, a light 4012 to indicate whether the battery level is low, a light 4013 to indicate the health status of the processing unit, a light 4014 to indicate the health status of the IMU, a light 4015 to indicate the health status of the radio transceiver, a light 4016 to indicate the health status of the limit detector.

In some of the present embodiments, the automatic valve shutoff device may have a display and keyboard panel (e.g., a touchscreen or a screen and a separate set of buttons). The display may be used to provision, to perform initial setup, to turn on or off, and/or to display the health status of the automatic valve shutoff device. The display and the keyboard panel may function similar to the functions performed by the client device 2535 in stages 2502-2504 (FIG. 25), stage 3103 (FIG. 31), and/or stages 3902-3903 (FIG. 39).

The electronic devices such as the valve shutoff devices, the electronic devices, the client devices, and/or the servers described above may include memory. The memory 1250 in the above examples may be one or more units of similar or different memories. For example, the electronic devices' memory may include, without any limitations, random access memory (RAM), read-only-memory (ROM), read-only compact discs (CD-ROM), erasable programmable read-only memories (EPROMs), electrically erasable programmable read-only memories (EEPROMs), flash memory (e.g., secured digital (SD) cards, mini-SD cards, micro-SD cards, etc.), magnetic and/or solid state hard drives, ultra-density optical discs, any other optical or magnetic media, and floppy disks.

Electronic devices such as the valve shutoff device, the client devices, and the servers described above may include one or more processing units. For example, the processing unit 120 in above examples may be a single processor or a multi-core processor in different embodiments. The electronic devices in some of the present embodiments may store computer program instructions in the memory, which may be a machine-readable or computer-readable medium (alternatively referred to as computer-readable storage medium, machine-readable medium, or machine-readable storage medium). The computer-readable medium may store a program that is executable by at least one processing unit and includes sets of instructions for performing various operations. Examples of programs or computer code include machine code, such as is produced by a compiler, and files including higher-level code that are executed by a computer, an electronic component, or a microprocessor using an interpreter. From these various memory units, the processing unit may retrieve instructions to execute and data to process in order to execute the processes of the present embodiments.

As used in this disclosure and any claims of this disclosure, the terms such as "processing unit," "processor," "controller," "microcontroller," "server", and "memory" all refer to electronic or other technological devices. These terms exclude people or groups of people. For the purposes of this disclosure, the terms display or displaying means displaying on an electronic device. As used in this disclosure and any claims of this disclosure, the terms "computer readable medium," "computer readable media," and "machine readable medium" are entirely restricted to tangible, physical objects that store information in a form that is readable by a processing unit. These terms exclude any wireless signals, wired download signals, and any other ephemeral signals.

In a first aspect, a valve shutoff device, comprises: a coupling key for coupling with an actuator of a shutoff valve on a fluid supply line; an accelerometer for making acceleration measurements in three directions comprising acceleration measurements in a vertical direction; a motor for rotating the coupling key and the actuator of the shutoff valve; a processing unit for: receiving a first plurality of acceleration measurements made by the accelerometer; using the first plurality of measurements, determining an arrival of seismic primary waves (P-waves) when a ratio of vibrations' power in the vertical direction with respect to a sum of the vibrations' power in the three directions exceeds a first threshold; after determining the arrival of the P-waves, receiving a second plurality of acceleration measurements made by the accelerometer; using the second plurality of measurements, determining an arrival of seismic secondary waves (S-waves) when the sum of the vibrations' power in the three directions exceeds a second threshold; after determining the arrival of the S-waves, receiving a third plurality of acceleration measurements made by the accelerometer; using the third plurality of measurements, determining an arrival of seismic surface waves when the sum of the vibrations' power in the three directions exceeds a third threshold, the third threshold larger than the second threshold; and after determining the arrival of the surface waves, sending a signal to the motor to rotate the coupling key and the actuator of the shutoff valve to close the shutoff valve.

In an embodiment of the first aspect, the processing unit is for determining that the ratio of vibrations' power in the vertical direction with respect to the sum of the vibrations' power in the three directions exceeds the first threshold for a time period prior to determining the arrival of the P-waves.

In another embodiment of the first aspect, the processing unit is for: performing a Fourier transform on the first plurality of acceleration measurements; filtering the acceleration measurements to eliminate acceleration measurements with frequencies that are outside a range of frequencies associated with the P-waves; and determining the ratio of vibrations' power in the vertical direction with respect to the sum of the vibrations' power in the three directions using the filtered acceleration measurements.

In another embodiment of the first aspect, determining the arrival of the P-waves further comprises determining that the sum of the vibrations' power in the three directions is less than a third threshold for a time period after determining that the ratio of the vibrations' power in the vertical direction with respect to the sum of the vibrations' power in the three directions exceeds the first threshold.

In another embodiment of the first aspect, the valve shutoff device further comprises a firmware, the firmware for: receiving the acceleration measurements from the accelerometer relative to a coordinate system used by the accelerometer; and computing the acceleration measurements relative to a coordinate system used by the valve shutoff device by performing a coordinate rotation from the coordinate system used by the accelerometer to the coordinate system used by the valve shutoff device, wherein the first, second, and third plurality of acceleration measurements comprise the acceleration measurements relative to the coordinate system used by the valve shutoff device.

In another embodiment of the first aspect, the processing unit is for: receiving the first, second, and third plurality of acceleration measurements from the accelerometer relative to a coordinate system used by the accelerometer; and performing a coordinate rotation of the acceleration measurements from the coordinate system used by the accelerometer to a coordinate system used by the valve shutoff device.

In another embodiment of the first aspect, the processing unit is for: performing a Fourier transform on the second plurality of acceleration measurements; filtering acceleration measurements to eliminate acceleration measurements with frequencies that are outside a range of frequencies associated with the seismic P-waves, S-waves, and surface waves; and determining the sum of the vibrations' power in the three directions using the filtered acceleration measurements.

In another embodiment of the first aspect, the processing unit is for: performing a Fourier transform on the third plurality of acceleration measurements; filtering acceleration measurements to eliminate acceleration measurements with frequencies that are outside a range of frequencies associated with the seismic P-waves, S-waves, and surface waves; and determining the sum of the vibrations' power in the three directions using the filtered acceleration measurements.

In another embodiment of the first aspect, the valve shutoff device further comprises: a rotor shaft connected to the coupling key, wherein the motor rotates the coupling key by turning the rotor shaft; and a sensor for: measuring one or more parameters associated with the rotor shaft; sending the measured parameters to the processing unit; wherein the processing unit is further for: receiving, after sending the signal to the motor to rotate the coupling key to close the shutoff valve, the parameters associated with the rotor shaft from the sensor; analyzing the parameters associated with the rotor shaft; and sending a signal to the motor to stop rotating the rotor shaft based on the analyses of the parameters.

In another embodiment of the first aspect, the processing unit is for: receiving, after sending the signal to the motor to rotate the coupling key, a level of an electric current used by the motor; and sending a signal to the motor to stop rotating the coupling key when the level of the electric current used by the motor exceeds a threshold.

In a second aspect, a method of closing a shutoff valve of a fluid supply line by a valve shutoff device comprising a coupling key for coupling with an actuator of the shutoff valve is provided, the method comprises: by a processing unit of the valve shutoff device: receiving a first plurality of acceleration measurements made by an accelerometer of the valve shutoff device in three directions comprising a vertical direction; using the first plurality of measurements, determining an arrival of seismic primary waves (P-waves) when a ratio of the vibrations' power in the vertical direction with respect to a sum of the vibrations' power in the three directions exceeds a first threshold; after determining the arrival of the P-waves, receiving a second plurality of acceleration measurements made by the accelerometer; using the second plurality of measurements, determining an arrival of seismic secondary waves (S-waves) when the sum of the vibrations' power in the three directions exceeds a second threshold; after determining the arrival of the S-waves, receiving a third plurality of acceleration measurements made by the accelerometer; using the third plurality of measurements, determining an arrival of seismic surface waves when the sum of the vibrations' power in the three directions exceeds a third threshold, the third threshold larger than the second threshold; and after determining the arrival of the surface waves, sending a signal to a motor of the valve shutoff device to rotate the coupling key and the actuator of the shutoff valve to close the shutoff valve.

An embodiment of the second aspect further comprises: by the processing unit, determining that the ratio of the vibrations' power in the vertical direction with respect to the sum of the vibrations' power in the three directions exceeds the first threshold for a time period prior to determining the arrival of the P-waves.

Another embodiment of the second aspect further comprises: performing a Fourier transform on the first plurality of acceleration measurements; filtering the acceleration measurements to eliminate acceleration measurements with frequencies that are outside a range of frequencies associated with the P-waves; and determining the ratio of the vibrations' power in the vertical direction with respect to a sum of the vibrations' power in the three directions using the filtered acceleration measurements.

In an embodiment of the second aspect, determining the arrival of the P-waves further comprises determining that the sum of the vibrations' power in the three directions is less than a third threshold for a time period after determining that the ratio of the vibrations' power in the vertical direction with respect to the sum of the vibrations' power in the three directions exceeds the first threshold.

Another embodiment of the second aspect further comprises: by a firmware of the valve shutoff device: receiving the acceleration measurements from the accelerometer relative to a coordinate system used by the accelerometer; and computing the acceleration measurements relative to a coordinate system used by the valve shutoff device by performing a coordinate rotation from the coordinate system used by the accelerometer to the coordinate system used by the valve shutoff device, wherein the first, second, and third plurality of acceleration measurements comprise the acceleration measurements relative to the coordinate system used by the valve shutoff device.

Another embodiment of the second aspect further comprises: at the processing unit of the valve shutoff device, receiving the first, second, and third plurality of acceleration measurements from the accelerometer relative to a coordinate system used by the accelerometer; and performing a coordinate rotation of the acceleration measurements from the coordinate system used by the accelerometer to a coordinate system used by the valve shutoff device.

Another embodiment of the second aspect further comprises: performing a Fourier transform on the second plurality of acceleration measurements; filtering acceleration measurements to eliminate acceleration measurements with frequencies that are outside a range of frequencies associated with the seismic P-waves, S-waves, and surface waves; and determining the sum of the vibrations' power in the three directions using the filtered acceleration measurements.

Another embodiment of the second aspect further comprises: performing a Fourier transform on the third plurality of acceleration measurements; filtering acceleration measurements to eliminate acceleration measurements with frequencies that are outside a range of frequencies associated with the seismic P-waves, S-waves, and surface waves; and determining the sum of the vibrations' power in the three directions using the filtered acceleration measurements.

In another embodiment of the second aspect, the valve shutoff device comprises a rotor shaft connected to the coupling key, wherein the motor rotates the coupling key by turning the rotor shaft the method further comprising: by a sensor of the valve shutoff device, measuring one or more parameters associated with the rotor shaft; after sending the signal to the motor to rotate the coupling key to close the shutoff valve, receiving the parameters associated with the rotor shaft at the processing unit from the sensor; by the processing unit, analyzing the parameters associated with the rotor shaft; and sending a signal from the processing unit to the motor to stop rotating the rotor shaft based on the analyses of the parameters.

Another embodiment of the second aspect further comprises: after sending the signal to the motor to rotate the coupling key, receiving a level of an electric current used by the motor at the processing unit; and sending a signal from the processing unit to the motor to stop rotating the coupling key when the level of the electric current used by the motor exceeds a threshold.

In a third aspect, a valve shutoff device, comprises: a coupling key for coupling with an actuator of a shutoff valve on a fluid supply line; an accelerometer for making acceleration measurements in three directions comprising acceleration measurements in a vertical direction; a motor for rotating the coupling key and the actuator of the shutoff valve; a processing unit for: receiving a first plurality of acceleration measurements made by the accelerometer; using the first plurality of measurements, determining an arrival of a first set of seismic waves comprising primary waves (P-waves) when a ratio of the vibrations' power in the vertical direction with respect to a sum of the vibrations' power in the three directions exceeds a first threshold; after determining the arrival of the P-waves, receiving a second plurality of acceleration measurements made by the accelerometer; using the second plurality of measurements, determining an arrival of second set of seismic waves when the sum of the vibrations' power in the three directions exceeds a second threshold; and after determining the arrival of the second set of seismic waves, sending a signal to the motor to rotate the coupling key and the actuator of the shutoff valve to close the shutoff valve.

In an embodiment of the third aspect, the second set of seismic waves comprises secondary waves (S-waves).

In another embodiment of the third aspect, the second set of seismic waves comprises surface waves, the processing unit further for: prior to determining the arrival of the surface waves, receiving a third plurality of acceleration measurements made by the accelerometer; and using the third plurality of measurements, determining an arrival of seismic secondary waves (S-waves) waves when the sum of the vibrations' power in the three directions exceeds a third threshold, the third threshold less than the second threshold.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A valve shutoff device, comprising:
a coupling key for coupling with an actuator of a shutoff valve on a fluid supply line;
an accelerometer for making acceleration measurements in three directions comprising acceleration measurements in a vertical direction;
a motor for rotating the coupling key and the actuator of the shutoff valve;

a processing unit for:
- receiving a first plurality of acceleration measurements made by the accelerometer;
- using the first plurality of measurements, determining an arrival of seismic primary waves (P-waves) when a ratio of vibrations' power in the vertical direction with respect to a sum of the vibrations' power in the three directions exceeds a first threshold;
- after determining the arrival of the P-waves, receiving a second plurality of acceleration measurements made by the accelerometer;
- using the second plurality of measurements, determining an arrival of seismic secondary waves (S-waves) when the sum of the vibrations' power in the three directions exceeds a second threshold;
- after determining the arrival of the S-waves, receiving a third plurality of acceleration measurements made by the accelerometer;
- using the third plurality of measurements, determining an arrival of seismic surface waves when the sum of the vibrations' power in the three directions exceeds a third threshold, the third threshold larger than the second threshold; and
- after determining the arrival of the surface waves, sending a signal to the motor to rotate the coupling key and the actuator of the shutoff valve to close the shutoff valve,
- wherein the processing unit is one of a microprocessor, a controller, a microcontroller, a single processor, and a multi-core processor.

2. The valve shutoff device of claim 1, wherein the processing unit is for determining that the ratio of vibrations' power in the vertical direction with respect to the sum of the vibrations' power in the three directions exceeds the first threshold for a time period prior to determining the arrival of the P-waves.

3. The valve shutoff device of claim 1, wherein the processing unit is for:
- performing a Fourier transform on the first plurality of acceleration measurements;
- filtering the acceleration measurements to eliminate acceleration measurements with frequencies that are outside a range of frequencies associated with the P-waves; and
- determining the ratio of vibrations' power in the vertical direction with respect to the sum of the vibrations' power in the three directions using the filtered acceleration measurements.

4. The valve shutoff device of claim 1, wherein determining the arrival of the P-waves further comprises determining that the sum of the vibrations' power in the three directions is less than a third threshold for a time period after determining that ratio of vibrations' power in the vertical direction with respect to the sum of the vibrations' power in the three directions exceeds the first threshold.

5. The valve shutoff device of claim 1 further comprising a firmware, the firmware for:
- receiving the acceleration measurements from the accelerometer relative to a coordinate system used by the accelerometer; and
- computing the acceleration measurements relative to a coordinate system used by the valve shutoff device by performing a coordinate rotation from the coordinate system used by the accelerometer to the coordinate system used by the valve shutoff device, wherein the first, second, and third plurality of acceleration measurements comprise the acceleration measurements relative to the coordinate system used by the valve shutoff device.

6. The valve shutoff device of claim 1, wherein the processing unit is for:
- receiving the first, second, and third plurality of acceleration measurements from the accelerometer relative to a coordinate system used by the accelerometer; and
- performing a coordinate rotation of the acceleration measurements from the coordinate system used by the accelerometer to a coordinate system used by the valve shutoff device.

7. The valve shutoff device of claim 1, wherein the processing unit is for:
- performing a Fourier transform on the second plurality of acceleration measurements;
- filtering acceleration measurements to eliminate acceleration measurements with frequencies that are outside a range of frequencies associated with the seismic P-waves, S-waves, and surface waves; and
- determining the sum of the vibrations' power in the three directions using the filtered acceleration measurements.

8. The valve shutoff device of claim 1, wherein the processing unit is for:
- performing a Fourier transform on the third plurality of acceleration measurements;
- filtering acceleration measurements to eliminate acceleration measurements with frequencies that are outside a range of frequencies associated with the seismic P-waves, S-waves, and surface waves; and
- determining the sum of the vibrations' power in the three directions using the filtered acceleration measurements.

9. The valve shutoff device of claim 1 further comprising:
- a rotor shaft connected to the coupling key, wherein the motor rotates the coupling key by turning the rotor shaft; and
- a sensor for:
  - measuring one or more parameters associated with the rotor shaft;
  - sending the measured parameters to the processing unit;
- wherein the processing unit is further for:
  - receiving, after sending the signal to the motor to rotate the coupling key to close the shutoff valve, the parameters associated with the rotor shaft from the sensor;
  - analyzing the parameters associated with the rotor shaft; and
  - sending a signal to the motor to stop rotating the rotor shaft based on the analyses of the parameters.

10. The valve shutoff device of claim 1, wherein the processing unit is for:
- receiving, after sending the signal to the motor to rotate the coupling key, a level of an electric current used by the motor; and
- sending a signal to the motor to stop rotating the coupling key when the level of the electric current used by the motor exceeds a threshold.

11. A method of closing a shutoff valve of a fluid supply line by a valve shutoff device comprising a coupling key for coupling with an actuator of the shutoff valve, the method comprising:
by a processing unit of the valve shutoff device:
- receiving a first plurality of acceleration measurements made by an accelerometer of the valve shutoff device in three directions comprising a vertical direction;

using the first plurality of measurements, determining an arrival of seismic primary waves (P-waves) when a ratio of vibrations' power in the vertical direction with respect to a sum of the vibrations' power in the three directions exceeds a first threshold;

after determining the arrival of the P-waves, receiving a second plurality of acceleration measurements made by the accelerometer;

using the second plurality of measurements, determining an arrival of seismic secondary waves (S-waves) when the sum of the vibrations' power in the three directions exceeds a second threshold;

after determining the arrival of the S-waves, receiving a third plurality of acceleration measurements made by the accelerometer;

using the third plurality of measurements, determining an arrival of seismic surface waves when the sum of the vibrations' power in the three directions exceeds a third threshold, the third threshold larger than the second threshold; and after determining the arrival of the surface waves, sending a signal to a motor of the valve shutoff device to rotate the coupling key and the actuator of the shutoff valve to close the shutoff valve, wherein the processing unit is one of a microprocessor, a controller, a microcontroller, a single processor, and a multi-core processor.

12. The method of claim 11 further comprising:
by the processing unit, determining that the ratio of vibrations' power in the vertical direction with respect to the sum of the vibrations' power in the three directions exceeds the first threshold for a time period prior to determining the arrival of the P-waves.

13. The method of claim 11 further comprising:
performing a Fourier transform on the first plurality of acceleration measurements;
filtering the acceleration measurements to eliminate acceleration measurements with frequencies that are outside a range of frequencies associated with the P-waves; and
determining the ratio of vibrations' power in the vertical direction with respect to the sum of the vibrations' power in the three directions using the filtered acceleration measurements.

14. The method of claim 11, wherein determining the arrival of the P-waves further comprises determining that the sum of the vibrations' power in the three directions is less than a third threshold for a time period after determining that the ratio of vibrations' power in the vertical direction with respect to the sum of the vibrations' power in the three directions exceeds the first threshold.

15. The method of claim 11 further comprising:
by a firmware of the valve shutoff device:
receiving the acceleration measurements from the accelerometer relative to a coordinate system used by the accelerometer; and
computing the acceleration measurements relative to a coordinate system used by the valve shutoff device by performing a coordinate rotation from the coordinate system used by the accelerometer to the coordinate system used by the valve shutoff device,
wherein the first, second, and third plurality of acceleration measurements comprise the acceleration measurements relative to the coordinate system used by the valve shutoff device.

16. The method of claim 11 further comprising:
at the processing unit of the valve shutoff device, receiving the first, second, and third plurality of acceleration measurements from the accelerometer relative to a coordinate system used by the accelerometer; and
performing a coordinate rotation of the acceleration measurements from the coordinate system used by the accelerometer to a coordinate system used by the valve shutoff device.

17. The method of claim 11 further comprising:
performing a Fourier transform on the second plurality of acceleration measurements;
filtering acceleration measurements to eliminate acceleration measurements with frequencies that are outside a range of frequencies associated with the seismic P-waves, S-waves, and surface waves; and
determining the sum of the vibrations' power in the three directions using the filtered acceleration measurements.

18. The method of claim 11 further comprising:
performing a Fourier transform on the third plurality of acceleration measurements;
filtering acceleration measurements to eliminate acceleration measurements with frequencies that are outside a range of frequencies associated with the seismic P-waves, S-waves, and surface waves; and
determining the sum of the vibrations' power in the three directions using the filtered acceleration measurements.

19. The method of claim 11, the valve shutoff device comprising a rotor shaft connected to the coupling key, wherein the motor rotates the coupling key by turning the rotor shaft the method further comprising:
by a sensor of the valve shutoff device, measuring one or more parameters associated with the rotor shaft;
after sending the signal to the motor to rotate the coupling key to close the shutoff valve, receiving the parameters associated with the rotor shaft at the processing unit from the sensor;
by the processing unit, analyzing the parameters associated with the rotor shaft; and
sending a signal from the processing unit to the motor to stop rotating the rotor shaft based on the analyses of the parameters.

20. The method of claim 11 further comprising:
after sending the signal to the motor to rotate the coupling key, receiving a level of an electric current used by the motor at the processing unit; and
sending a signal from the processing unit to the motor to stop rotating the coupling key when the level of the electric current used by the motor exceeds a threshold.

21. A valve shutoff device, comprising:
a coupling key for coupling with an actuator of a shutoff valve on a fluid supply line;
an accelerometer for making acceleration measurements in three directions comprising acceleration measurements in a vertical direction;
a motor for rotating the coupling key and the actuator of the shutoff valve;
a processing unit for:
receiving a first plurality of acceleration measurements made by the accelerometer;
using the first plurality of measurements, determining an arrival of a first set of seismic waves comprising primary waves (P-waves) when a ratio of vibrations' power in the vertical direction with respect to a sum of the vibrations' power in the three directions exceeds a first threshold;

after determining the arrival of the P-waves, receiving a second plurality of acceleration measurements made by the accelerometer;

using the second plurality of measurements, determining an arrival of second set of seismic waves when the sum of the vibrations' power in the three directions exceeds a second threshold; and after determining the arrival of the second set of seismic waves, sending a signal to the motor to rotate the coupling key and the actuator of the shutoff valve to close the shutoff valve, wherein the processing unit is one of a microprocessor, a controller, a microcontroller, a single processor, and a multi-core processor.

22. The method valve shutoff device of claim 21, wherein the second set of seismic waves comprises secondary waves (S-waves).

23. The method valve shutoff device of claim 21, wherein the second set of seismic waves comprises surface waves, the processing unit further for:

prior to determining the arrival of the surface waves, receiving a third plurality of acceleration measurements made by the accelerometer; and using the third plurality of measurements, determining an arrival of seismic secondary waves (S-waves) waves when the sum of the vibrations' power in the three directions exceeds a third threshold, the third threshold less than the second threshold.

24. The valve shutoff device of claim 21, wherein the processing unit is for:

performing a Fourier transform on the first plurality of acceleration measurements;

filtering the acceleration measurements to eliminate acceleration measurements with frequencies that are outside a range of frequencies associated with the P-waves; and determining the ratio of vibrations' power in the vertical direction with respect to the sum of the vibrations' power in the three directions using the filtered acceleration measurements.

25. The valve shutoff device of claim 21 further comprising:

a rotor shaft connected to the coupling key, wherein the motor rotates the coupling key by turning the rotor shaft; and a sensor for:

measuring one or more parameters associated with the rotor shaft;

sending the measured parameters to the processing unit;

wherein the processing unit is further for:

receiving, after sending the signal to the motor to rotate the coupling key to close the shutoff valve, the parameters associated with the rotor shaft from the sensor;

analyzing the parameters associated with the rotor shaft; and sending a signal to the motor to stop rotating the rotor shaft based on the analyses of the parameters.

26. The valve shutoff device of claim 21, wherein the processing unit is for:

receiving, after sending the signal to the motor to rotate the coupling key, a level of an electric current used by the motor; and sending a signal to the motor to stop rotating the coupling key when the level of the electric current used by the motor exceeds a threshold.

\* \* \* \* \*